US009723453B2

(12) United States Patent
Smith et al.

(10) Patent No.: US 9,723,453 B2
(45) Date of Patent: *Aug. 1, 2017

(54) METHOD AND SYSTEM FOR PROVIDING ENHANCED LOCATION BASED TRILATERATION

(71) Applicant: Rivada Research, LLC, Colorado Springs, CO (US)

(72) Inventors: Clint Smith, Warwick, NY (US); Purnima Surampudi, Katy, TX (US)

(73) Assignee: Rivada Research, LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,806

(22) Filed: Oct. 4, 2016

(65) Prior Publication Data
US 2017/0026805 A1 Jan. 26, 2017

Related U.S. Application Data

(63) Continuation of application No. 14/993,618, filed on Jan. 12, 2016, now Pat. No. 9,485,623, which is a
(Continued)

(51) Int. Cl.
*H04W 24/00* (2009.01)
*H04W 4/02* (2009.01)
(Continued)

(52) U.S. Cl.
CPC .............. *H04W 4/028* (2013.01); *G01C 5/06* (2013.01); *G01C 17/02* (2013.01); *G01C 21/00* (2013.01);
(Continued)

(58) Field of Classification Search
CPC ..... H04W 4/22; H04W 76/007; H04W 64/00; H04W 4/02; H04W 4/025;
(Continued)

(56) References Cited

U.S. PATENT DOCUMENTS 6,990,351 B2  1/2006  Tsunehara et al.
7,764,231 B1  7/2010  Karr et al.
(Continued)

FOREIGN PATENT DOCUMENTS

CN  1688892 A  10/2005
CN  101305567 A  11/2008
(Continued)

OTHER PUBLICATIONS

First Office Action Issued by State Intellectual Property Office for Chinese Application No. 201280050710.4 on Oct. 31, 2014.
(Continued)

*Primary Examiner* — Nhan Le
(74) *Attorney, Agent, or Firm* — The Marbury Law Group, PLLC

(57) ABSTRACT

Method, systems and devices for determining for performing enhanced location based trilateration include receiving location information (e.g., waypoints) from one or more external devices, determining the validity of the received location information, performing normalization operations to normalize the received location information, assigning an overall ranking and a device-specific ranking to the location information, and storing the validated and normalized location information in memory. The enhanced location based trilateration may also include selecting four locations (e.g., waypoints) from the memory based on a combination of the overall ranking and the device-specific ranking, and generating a final location value or waypoint based on a result of applying the four selected waypoints to a kalman filter. The output of the kalman filter may also be reported and/or used as the device's current location.

18 Claims, 53 Drawing Sheets

Related U.S. Application Data continuation-in-part of application No. 14/950,595, filed on Nov. 24, 2015, now Pat. No. 9,344,848, which is a continuation of application No. 14/823,244, filed on Aug. 11, 2015, now Pat. No. 9,332,386, which is a continuation of application No. 14/293,056, filed on Jun. 2, 2014, now Pat. No. 9,232,354, which is a continuation of application No. 13/585,125, filed on Aug. 14, 2012, now Pat. No. 8,787,944.

(60) Provisional application No. 62/102,853, filed on Jan. 13, 2015, provisional application No. 61/575,300, filed on Aug. 18, 2011, provisional application No. 61/573,636, filed on Sep. 9, 2011.

(51) Int. Cl.

| | | |
|---|---|---|
| G01S 19/42 | (2010.01) | |
| G01C 21/00 | (2006.01) | |
| G01S 1/02 | (2010.01) | |
| G01C 5/06 | (2006.01) | |
| G01C 17/02 | (2006.01) | |
| G01S 5/00 | (2006.01) | |
| H04M 1/725 | (2006.01) | |
| H04W 4/22 | (2009.01) | |
| H04W 64/00 | (2009.01) | |
| H04W 4/00 | (2009.01) | |
| G01S 19/48 | (2010.01) | |
| G01S 5/02 | (2010.01) | |
| G01S 19/13 | (2010.01) | |

(52) U.S. Cl.
CPC ............ *G01S 1/02* (2013.01); *G01S 5/0072* (2013.01); *G01S 5/0284* (2013.01); *G01S 5/0289* (2013.01); *G01S 5/0294* (2013.01); *G01S 19/42* (2013.01); *H04M 1/72538* (2013.01); *H04M 1/72572* (2013.01); *H04W 4/008* (2013.01); *H04W 4/02* (2013.01); *H04W 4/023* (2013.01); *H04W 4/025* (2013.01); *H04W 4/026* (2013.01); *H04W 4/027* (2013.01); *H04W 4/22* (2013.01); *H04W 64/00* (2013.01); *G01S 5/0263* (2013.01); *G01S 19/13* (2013.01); *G01S 19/48* (2013.01)

(58) Field of Classification Search
CPC ... H04L 29/08657; G01S 5/02; G01S 5/0252; G01S 19/42; G01S 1/02
USPC .... 455/404.1, 404.2, 418–420, 422.1, 432.1, 455/432.5, 456.1, 550.1
See application file for complete search history.

(56) References Cited

U.S. PATENT DOCUMENTS

| | | | |
|---|---|---|---|
| 8,359,643 | B2 | 1/2013 | Low et al. |
| 9,161,175 | B1 | 10/2015 | Smith |
| 9,485,623 | B2* | 11/2016 | Smith .................. H04W 4/025 |
| 2002/0005804 | A1 | 1/2002 | Suprunov |
| 2007/0232319 | A1 | 10/2007 | Bells et al. |
| 2007/0239348 | A1 | 10/2007 | Cheung |
| 2007/0275730 | A1 | 11/2007 | Bienas et al. |
| 2008/0002190 | A1* | 1/2008 | Romain ............... G01C 21/005 356/139.01 |
| 2009/0047973 | A1 | 2/2009 | MacNaughtan et al. |
| 2009/0073045 | A1 | 3/2009 | Supino et al. |
| 2009/0079622 | A1 | 3/2009 | Seshadri et al. |
| 2009/0149202 | A1 | 6/2009 | Hill et al. |
| 2010/0062792 | A1 | 3/2010 | Han et al. |
| 2010/0076968 | A1* | 3/2010 | Boyns ............... G06F 17/30241 707/732 |
| 2010/0291973 | A1 | 11/2010 | Nakahara |
| 2010/0318322 | A1 | 12/2010 | Brauer et al. |
| 2011/0009130 | A1 | 1/2011 | Wu |
| 2011/0117934 | A1 | 5/2011 | Mate |
| 2011/0124347 | A1 | 5/2011 | Chen et al. |
| 2011/0151892 | A1 | 6/2011 | Vengroff et al. |
| 2011/0171973 | A1 | 7/2011 | Beck et al. |
| 2011/0227788 | A1 | 9/2011 | Lundgren et al. |
| 2011/0276556 | A1 | 11/2011 | Meier et al. |
| 2012/0129545 | A1 | 5/2012 | Hodis |
| 2012/0286997 | A1 | 11/2012 | Lin et al. |
| 2013/0030931 | A1 | 1/2013 | Moshfeghi |
| 2014/0273920 | A1 | 9/2014 | Smith |
| 2014/0334463 | A1 | 11/2014 | Lipman et al. |
| 2015/0055492 | A1* | 2/2015 | Gao, Jr. ............... H04W 4/023 370/252 |
| 2015/0346313 | A1* | 12/2015 | Smith ................... G01S 5/0252 342/465 |

FOREIGN PATENT DOCUMENTS

| | | |
|---|---|---|
| CN | 101720058 A | 6/2010 |
| JP | 2005-331423 A | 12/2005 |
| JP | 2010-69910 A | 4/2010 |
| WO | 2004008171 A1 | 1/2004 |
| WO | 2011/037214 A1 | 3/2011 |

OTHER PUBLICATIONS

Mexican Office Action Issued by the Mexican Patent Office for Mexican Application No. MX/a/2014/001745 on May 19, 2015.
Japanese Office Action Issued by the Japanese Patent Office for Japanese Application No. 2014-526179 on May 12, 2015 corresponding to PCT/US2012/050981.
Russian Office Action Issued by the Russian Patent Office for Russian Application No. 2014109421/01(014916) on May 16, 2015 corresponding to PCT/US2012/050981.
Chinese Office Action Issued by the Chinese Patent Office for Chinese Application No. 201280050710.4 on Mar. 20, 2015.
Communication Pursuant to Rules 70(2) and 70a(2) EPC Issued by the European Patent Office for European Application No. 12824068.6 on Mar. 5, 2015.
Extended European Search Report Issued by the European Patent Office for European Application No. 12824068.6-1812 on Feb. 16, 2015.
International Search Report and Written Opinion issued in PCT Application No. PCT/US2012/050981 mailed on Jan. 29, 2013.
International Preliminary Report on Patentability and Written Opinion for PCT/US2012/050981 issued on Feb. 18, 2014.
Zyren, "Overview of the 3GPP Long Term Evolution Physical Layer", Freescale Semiconductor, 3GPPEVOLUTIONWPP, pp. 1-27, (Jul. 2007).
Keithley, "OFDM.MIMO Master CLass Understanding the Physical Layer Principles of WPLAN, WiMAX and LTE", www.keithley.com, pp. 1-119, (2004).
Xiong, et al. "SecureAngle: Improving Wireless Security Using Angle-of-Arrival Information", Hotnets, pp. 1-6, (Oct. 20-21, 2010).
3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305, V9.3.0, pp. 1-52, (Jun. 2010).
MultiService Forum , MSF Whitepaper on Location Services in LTE Networks, MultiService Forum, MSF-TR-SERVICES-005-FINAL, pp. 1-19, (2009).
"Comments of Motorola Mobility, Inc. and Motorola Solutions, Inc." before the Federal Communications Commission, Washington, DC 20554, Matter of Wireless E911 Location Accuracy Requirements (PS Docket No. 07-114) vs E911 Requirements for IP-Enabled Service Providers (WC Docket No. 05-196), pp. 1-20, (Jan. 19, 2011).

(56) References Cited

OTHER PUBLICATIONS

3GPP, "3rd Generation Partnership Project; Technical Specification Group Core Network; Universal Geographical Area Description (GAD) , (Release 1999)", 3G TS 23.032, V3.1.0 pp. 1-29, (Mar. 2000).
3GPP, "LTE; Evolved Universal Terrestrial Radio Access (E-UTRA); Physical Layer Procedures (3GPP TS 36.213 version 10.1.0 Release 10)", ETSI TS 136 213 V10.1.0 pp. 1-117 (Apr. 2011).
3GPP, "LTE; Evolved Universal Terrestrial Radio Access (E-UTRA); LTE Positioning Protocol (LPP) (3GPP TS 36.355 version 10.1.0 Release 10)", ETSI TS 136 355, V10.0.0 pp. 1-115 (Jan. 2011).
3GPP, LTE; NAS Signaling for Control Plane LCS in Evolved Packet System (EPS), (3GPP TS 24.141 version 9.0.0 Release 9) ETSI TS 124 171, v9.0.0, pp. 1-19, (Apr. 2010).
Notification of Transmittal of International Search Report and the Written Opinion of the International Searching Authority, or the Declaration, International Application No. PCT/US2016/013235, mailing date Apr. 29, 2016.

\* cited by examiner

Multiple Layer
Antenna

METHOD AND SYSTEM FOR PROVIDING ENHANCED LOCATION BASED TRILATERATION

RELATED APPLICATIONS

This application is a Continuation of U.S. Non-Provisional application Ser. No. 14/993,618 entitled "Method and System for Providing Enhanced Location Based Trilateration" filed Jan. 12, 2016, which claims benefit of priority to U.S. Provisional Application No. 62/102,853 entitled "Method and System for Providing Enhanced Location Based Trilateration" filed Jan. 13, 2015, and is a continuation in part of U.S. patent application Ser. No. 14/950,595 entitled "Method and System for Providing Enhanced Location Based Information for Wireless Handsets" filed on Nov. 24, 2015, and issued May 17, 2016 as U.S. Pat. No. 9,344,848, which is a continuation of U.S. patent application Ser. No. 14/823,244, entitled "Method and System for Providing Enhanced Location Based Information for Wireless Handsets" filed on Aug. 11, 2015, and issued May 3, 2016 as U.S. Pat. No. 9,332,386, which is a continuation of U.S. patent application Ser. No. 14/293,056 entitled "Method and System for Providing Enhanced Location Based Information for Wireless Handsets" filed Jun. 2, 2014, and issued Jan. 5, 2016 as U.S. Pat. No. 9,232,354, which is a continuation of U.S. patent application Ser. No. 13/585,125 entitled "Method and System for Providing Enhanced Location Based Information for Wireless Handsets" filed Aug. 14, 2012, and issued Jul. 22, 2014 as U.S. Pat. No. 8,787,944, which claims the benefit of priority of U.S. Provisional Application No. 61/575,300, entitled "Method and System for Providing Enhanced Location Based Information for Wireless Handsets" filed Aug. 18, 2011, and U.S. Provisional Application No. 61/573,636, entitled "Method and System for Providing Enhanced Location Based Information for Wireless Handsets" filed Sep. 9, 2011, the entire contents of all of which are hereby incorporated by reference. This application is also related to U.S. patent application Ser. No. 14/961,088 entitled Method and System for Providing Enhanced Location Based Server Trilateration using a Single Device filed on Dec. 7, 2015, the entire contents of which is hereby incorporated by reference.

FIELD OF INVENTION

The present application relates generally to a wireless mobile communication system, and more particularly to methods and systems that provide enhanced location information for wireless mobile devices.

BACKGROUND

Wireless communication technologies and mobile electronic devices (e.g., cellular phones, tablets, laptops, etc.) have grown in popularity and use over the past several years. To keep pace with increased consumer demands, mobile electronic devices have become more powerful and feature rich, and now commonly include global positioning system (GPS) receivers, sensors, and many other components for connecting users to friends, work, leisure activities and entertainment. However, despite these advancements, mobile devices remain lacking in their ability to provide effective location based services, information, or communications. As mobile devices and technologies continue to grow in popularity and use, generating enhanced location information for mobile devices is expected to become an important and challenging design criterion for mobile device manufactures and network engineers.

SUMMARY

The various aspects include methods of determining a location of a mobile device via enhanced location based trilateration, the method including receiving, via a processor of the mobile device, location information from one or more external devices, the received location information including a waypoint from each of the one or more external devices, each waypoint including a coordinate value, an altitude value and a range value, the range value identifying a distance from a external device to the mobile device, determining the validity of each of the received waypoints, performing normalization operations to normalize the received valid waypoints, assigning an overall ranking to each of the normalized waypoints, assigning an device-specific ranking to each of the normalized waypoints, and storing the normalized waypoints in memory, selecting four waypoints from memory based on a combination of the overall ranking and the device-specific ranking associated with each waypoint, applying the four selected waypoints to a kalman filter to generate a final location waypoint, and using the generated final location waypoint to provide a location based service.

In an embodiment, receiving location information from one or more external devices may include receiving location information from one or more of a mobile device, a device having a Cell ID, a WiFi device, a Bluetooth device, an RFID device, a GPS device, a location beacon transmitting device, and external trilateration location information. In a further embodiment, determining the validity of each of the received waypoints may include determining a range value for each waypoint included in the received location information, and determining the validity of each of the received waypoints based on its corresponding range value. In a further embodiment, determining the validity of each of the received waypoints may include determining a confidence value for each waypoint included in the received location information, and determining the validity of each of the received waypoints based on its corresponding confidence value. In a further embodiment, receiving location information from one or more external devices may include establishing communication links to each of a plurality of external devices in a communication group, and receiving location information from only the external devices in the communication group.

In a further embodiment, selecting four waypoints from memory based on a combination of the overall ranking and the device-specific ranking associated with each waypoint may includes selecting one of the waypoints included in the received location information and three previously generated waypoints from the memory. In a further embodiment, selecting four waypoints from memory based on a combination of the overall ranking and the device-specific ranking associated with each waypoint may include selecting two of the waypoints included in the received location information and two previously generated waypoints from the memory. In a further embodiment, selecting four waypoints from memory based on a combination of the overall ranking and the device-specific ranking associated with each waypoint may includes selecting three of the waypoints included in the received location information and one previously generated waypoints from the memory.

Further embodiments may include a computing device having a processor configured with processor-executable instructions to perform various operations corresponding to the methods discussed above. Further embodiments may include a computing device having various means for performing functions corresponding to the method operations discussed above. Further embodiment may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
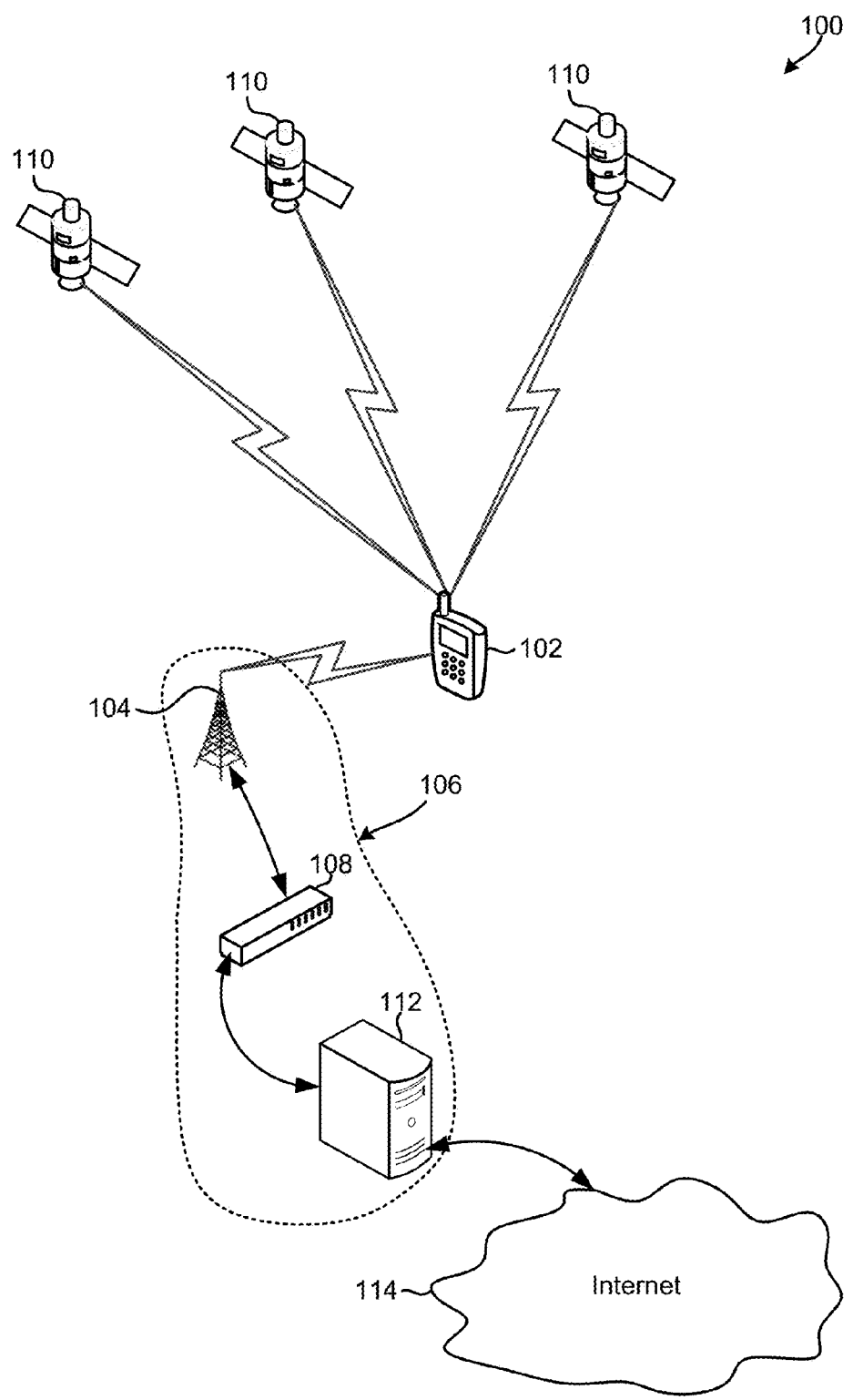
FIG. 1 is a communication system block diagram illustrating network components of an example telecommunication system suitable for use in a mobile-device centric approach for determining the location of a mobile device in accordance with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "cellular telephone," and "cell phone" are used interchangeably herein to refer to any one or all of cellular telephones, smartphones, personal data assistants (PDA's), laptop computers, tablet computers, ultrabooks, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in mobile devices, such as cellular telephones, which have limited battery life, the embodiments are generally useful in any computing device that may be used to wirelessly communicate information.

The terms "wireless network", "network", "cellular system", "cell tower" and "radio access point" may be used generically and interchangeably to refer to any one of various wireless mobile systems. In an embodiment, wireless network may be a radio access point (e.g., a cell tower), which provides the radio link to the mobile device so that the mobile device can communicate with the core network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (herein collectively "solutions") are currently available for determining the location of mobile device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OT-DOA), advanced forward link trilateration (AFLT), and angle of arrival (AOA). In various embodiments, such solutions may implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

Various embodiments discussed herein may generate, compute, and/or make use of location information pertaining to one or more mobile devices. Such location information may be useful for providing and/or implementing a variety of location-based services, including emergency location services, commercial location services, internal location services, and lawful intercept location services. By way of example: emergency location services may include services relating to the provision of location and/or identification information to emergency service personal and/or emergency systems (e.g., to 911 system); commercial location services may include any general or value-added service (e.g., asset tracking services, navigation services, location-based advertising services, etc); internal location services may include services pertaining to the management of the wireless service provider network (e.g., radio resource management services, message delivery services, paging services, call delivery services, services for providing position/location network enhancements, etc.); and lawful intercept location services may include any service that provides public safety and/or law enforcement agencies with identification and/or location information pertaining to a mobile device or a mobile device user. While the various embodiments are particularly useful in applications that fall within one or more of the categories/types of location based services discussed above, the embodiments are generally useful in any application or service that benefits from location information.

Modern mobile electronic devices (e.g., mobile phones) typically include one or more geospatial positioning systems/components for determining the geographic location of the mobile device. Location information obtained by these geospatial systems may be used by location-aware mobile software applications (e.g., Google® Maps, Yelp®, Twitter® Places, "Find my Friends" on Apple®, etc.) to provide users with information regarding the mobile device's physical location at a given point in time. In recent years, such location-based services and software applications have increased in popularity, and now enable mobile device users to navigate cities, read reviews of nearby restaurants and services, track assets or friends, obtain location-based safety advice, and/or take advantage of many other location-based services on their mobile devices.

Consumers of modern mobile devices now demand more advanced, robust, and feature-rich location-based services than that which is currently available on their mobile devices. However, despite many recent advances in mobile and wireless technologies, mobile devices remain lacking in their ability to provide their users/consumers with location based services that are accurate or powerful enough to meet the demands of these consumers. For example, while existing location-aware mobile software applications (e.g., "Find my Friends" on Apple®, Google® Latitude, etc.) enable a mobile device user to view the approximate geographical position of other mobile devices on a two-dimensional map, they lack the capability to accurately, efficiently and consistently pin point the precise location and/or position of the other mobile devices in all three dimensions and/or within a wireless communication network. The various embodiments overcome these and other limitations of existing solutions by collecting information from multiple mobile devices, generated more precise location information on or about one or more mobile devices, generating advanced three-dimensional location and position information on or about one or more mobile devices, and using the generated location/position information to provide mobile device users with more accurate, more powerful, and more reliable location based services.

One of the challenges associated with using geo-spatial positioning technology on a mobile device is that the mobile device's ability to acquire satellite signals and navigation data to calculate its geospatial location (called "performing a fix") may be hindered when the mobile device is indoors, below grade, and/or when the satellites are obstructed (e.g., by tall buildings, etc.). The presence of physical obstacles, such as metal beams or walls, may cause multipath interference and signal degradation of the wireless communication signals when the mobile device is indoors or in urban environments that include tall buildings or skyscrapers. In rural environments, the mobile device may not have sufficient access to satellite communications (e.g., to a global positioning system satellite) to effectively ascertain the mobile device's current location. These and other factors often cause existing geo-spatial technologies to function inaccurately and/or inconsistently on mobile devices, and hinder the mobile device user's ability to fully utilize location-aware mobile software applications and/or other location based services and applications on his/her mobile device.

Another problem with using existing geo-spatial positioning technologies is that position accuracy afforded by existing technologies is not sufficient for use in emergency services due to the relatively high level of position accuracy required by these services.

The various embodiments include improved location determination solutions that determine the location of a mobile device at the level of position accuracy which is suitable for use in emergency location services, commercial location services, internal location services, and lawful intercept location services.

Generally, there are three basic approaches for determining the location of mobile devices in a communication network: a mobile-device centric approach, a network centric approach and a hybrid approach that may include aspects of both the mobile device centric approach and the network centric approach.

FIG. 1 illustrates an example communication system 100 suitable for implementing a mobile-device centric approach for determining the location of a mobile device 102 in accordance with various embodiments. The mobile device 102 may include a global positioning system (GPS) receiver in communication with multiple geo-spatial positioning and navigation satellites 110 and a base tower 104 of a communication network 106. The mobile device 102 may receive (e.g., via the GPS receiver) radio signals emitted by the navigation satellites 110, measure the time required for the signals to reach the mobile device 102, and use trilateration techniques to determine the geographical coordinates (e.g., latitude and longitude coordinates) of the mobile device 102. The mobile device 102 may send the geographical coordinates to the communication network 106 at various times and/or in response to various conditions or events, such as upon initial acquisition with the communication network 106, in response to network-based requests, in response to third party requests, etc.

In an embodiment, the communication network may be a cellular telephone network. A typical cellular telephone network includes a plurality of cellular base stations/base towers 104 coupled to a network operations center 108, which operates to connect voice and data calls between mobile devices 102 (e.g., mobile phones) and other network destinations, such as via telephone land lines (e.g., a POTS network, not shown) and the Internet 114. Communications between the mobile devices 102 and the cellular telephone network may be accomplished via two-way wireless communication links, such as 4G, 3G, CDMA, TDMA, and other cellular telephone communication technologies. The communication network 106 may also include one or more servers 112 coupled to or within the network operations center 108 that provide connections to the Internet 114.

In various embodiments, the mobile device 102 may be configured to communicate with a radio access node, which can include any wireless base station or radio access point such as LTE, CDMA2000/EVDO, WCDMA/HSPA, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnecting to the Internet and PSTN.

Figure 2:
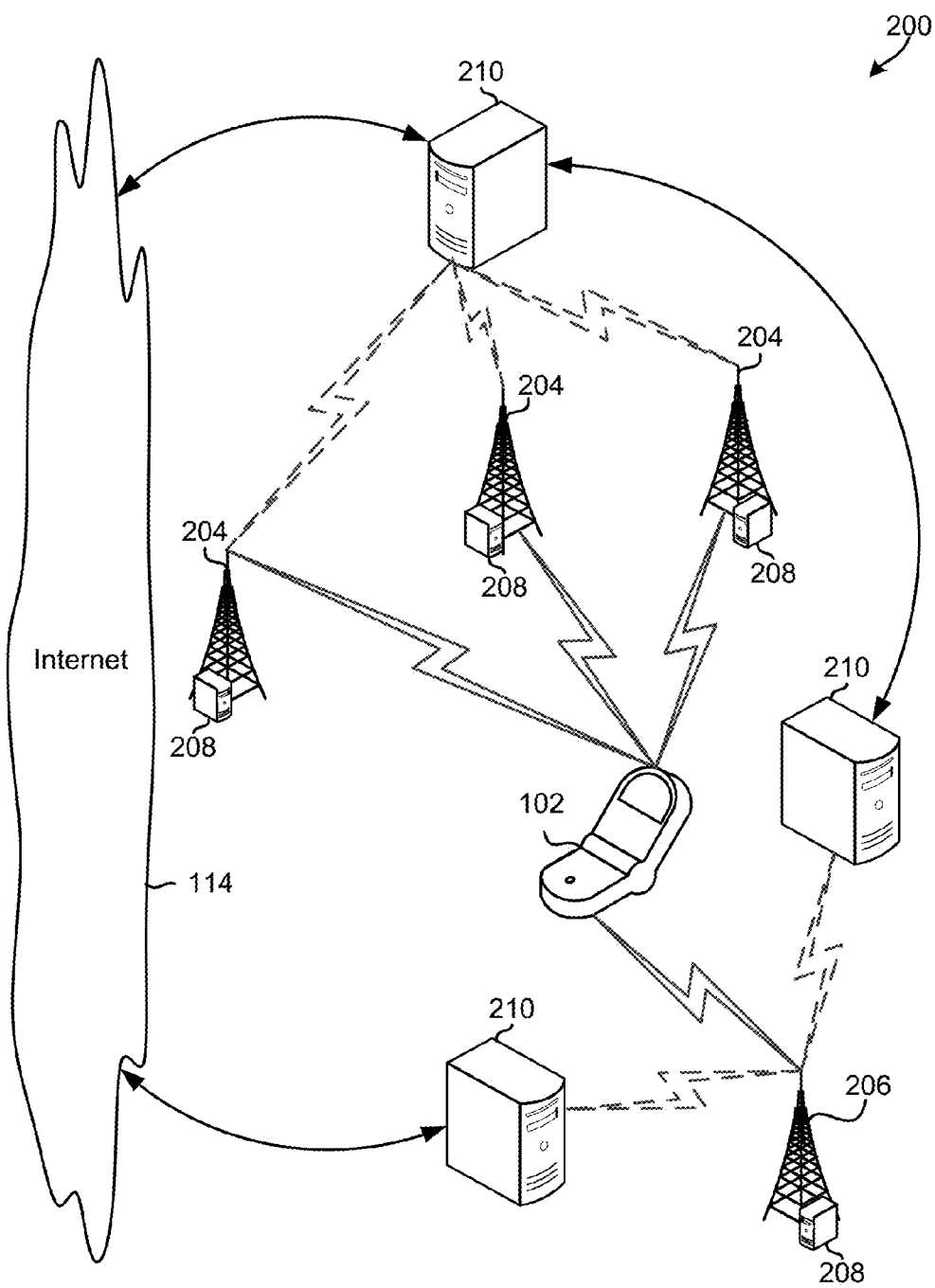
FIG. 2 is a communication system block diagram illustrating network components of an example telecommunication system suitable for use in a network centric approach for determining the location of a mobile device in accordance with various embodiments.

FIG. 2 illustrates an example communication system 200 suitable for implementing a network centric approach for determining the location of a mobile device 102 in accordance with various embodiments. The mobile device 102 may include a circuitry for wirelessly sending and receiving radio signals. The communication system 200 may include a plurality of radio access points 204, 206 having installed thereon additional radio equipment 208 for measuring the location of the mobile devices in the communication system. For example, the mobile device 102 may transmit radio signals for reception by one or more (e.g., typically three) radio access points 204, and the radio access points may receive the transmitted signals and measure the signal strength and/or radio energy of the received signals to identify the location of the mobile device 102.

In an embodiment, the radio access points 204 may be configured to determine the location of the mobile device relative to a known location of a network component, such as the illustrated radio access point 206. In this manner, the additional radio equipment 208 installed on the radio access points 204, 206 provides the communication system 200 with similar functionality as is provided by a GPS receiver for signals received from the mobile device. For example, the radio equipment on one or more of the radio access points 204 may measure how long it takes for the radio signal to travel from the mobile device 102 to another radio access point 206, and using trilateration techniques (e.g., time of arrival, angle of arrival, or a combination thereof), the mobile device 102 or a network server 210 may estimate the location of the mobile device 102 to within an accuracy of 100 to 300 meters. Once the network has estimated the latitude and longitude coordinates of the mobile device 102, this information can be used to determine the geo-spatial location of the mobile device 102, which may be communicated to other systems, servers or components via the Internet 114.

Various embodiments may implement and/or make use of a hybrid approach for determining the location of mobile devices in a communication network, which may include aspects of both the device-centric and the network-centric approaches discussed above with reference to FIGS. 1 and 2. For example, an embodiment may implement a hybrid approach in which the GPS capabilities of mobile devices, the measured signal strengths and/or radio energy of radio signals transmitted from the mobile devices, and known locations of network components are used in combination to estimate the locations of one or more mobile devices in a network. In a further embodiment, the mobile devices and/or network components (e.g., severs, radio access points, etc.) may be configured to dynamically determine which factors (e.g., radio signal strength, GPS, etc.) to measure and/or use in determining the location of the mobile devices.

Figure 3:
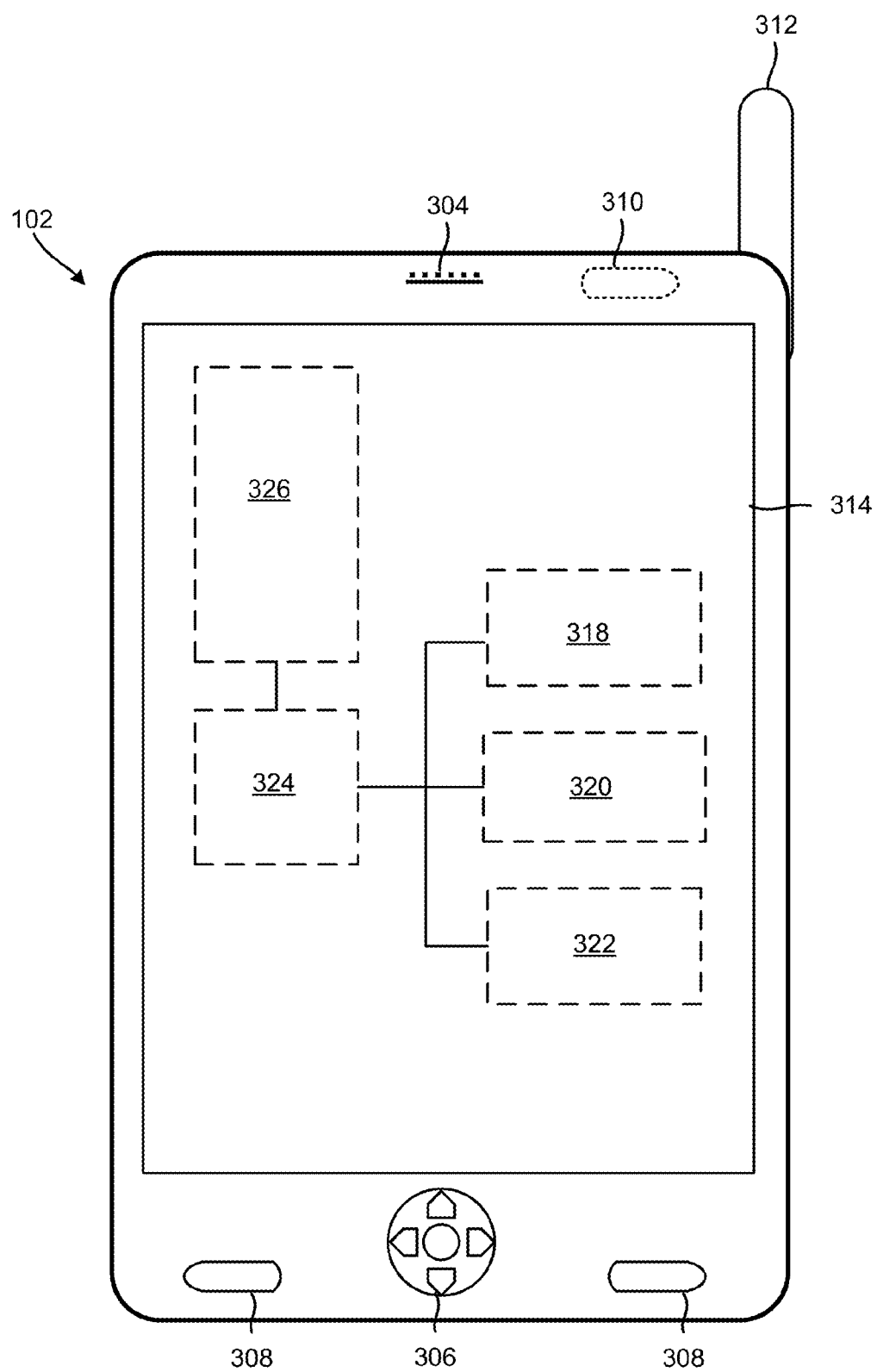
FIG. 3 is an illustration of an example mobile device suitable for use in grouping with other mobile devices and computing precise location information in accordance with the various embodiments.

FIG. 3 illustrates sample components of a mobile device 102 in the form of a phone that may be used with the various embodiments. The mobile device/phone 102 may include a speaker 304, user input elements 306, microphones 308, an antenna 312 for sending and receiving electromagnetic radiation, an electronic display 314, a processor 324, a memory 326 and other well known components of modern electronic devices.

The phone 102 may also include one or more sensors 310 for monitoring physical conditions (e.g., location, motion, acceleration, orientation, altitude, etc.). The sensors may include any or all of a gyroscope, an accelerometer, a magnetometer, a magnetic compass, an altimeter, an odometer, and a pressure sensor. The sensors may also include various bio-sensors (e.g., heart rate monitor, body temperature sensor, carbon sensor, oxygen sensor, etc.) for collecting information pertaining to environment and/or user conditions. The sensors may also be external to the mobile device and paired or grouped to the mobile device via a wired or wireless connection (e.g., Bluetooth®, etc.). In embodiment, the mobile device 102 may include two or more of the same type of sensor (e.g., two accelerometers, etc.).

The phone 102 may also include a GPS receiver 318 configured to receive GPS signals from GPS satellites to determine the geographic location of the phone 102. The phone 102 may also include circuitry 320 for transmitting wireless signals to radio access points and/or other network components. The phone 102 may further include other components/sensors 322 for determining the geographic position/location of the phone 102, such as components for determining the radio signal delays (e.g., with respect to cell-phone towers and/or cell sites), performing trilateration and/or multilateration operations, identifying proximity to known networks (e.g., Bluetooth® networks, WLAN networks, WiFi, etc.), and/or for implementing other known geographic location technologies.

The phone 102 may also include a system acquisition function configured to access and use information contained in a subscriber identity module (SIM), universal subscriber identity module (USIM), and/or preferred roaming list (PRL) to, for example, determine the order in which listed frequencies or channels will be attempted when the phone 102 is to acquire/connect to a wireless network or system. In various embodiments, the phone 102 may be configured to attempt to acquire network access (i.e., attempt to locate a channel or frequency with which it can access the wireless/communication network) at initial power-on and/or when a current channel or frequency is lost (which may occur for a variety of reasons).

The mobile device 102 may include pre-built in USIM, SIM, PRL or access point information. In an embodiment, the mobile device may be configured for first responders and/or public safety network by, for example, setting the incident radio system as the default and/or preferred communication system.

As mentioned above, despite recent advances in mobile and wireless communication technologies, determining the specific location of a mobile device in a wireless network remains a challenging task for a variety of reasons, including the variability of environmental conditions in which mobile devices are often used by consumers, deficiencies in existing technologies for computing and/or measuring location information on mobile devices, and the lack of uniform standards. For example, there is currently no universally accepted standard for implementing or providing location-based services. As a result, mobile device designers and wireless network operators, in conjunction with local public safety and third party providers, are using a variety of inefficient, incoherent, and sometimes incompatible methods, technologies, solutions, and/or techniques to determine the location of a mobile device and/or to provide location based services.

While there are no universally accepted standards for implementing or providing location-based services, there are certain requirements or standards associated with determining the location of a mobile device that may be of use in various embodiments. The U.S. Congress has mandated that cellular service providers configure their networks, communication systems and/or mobile devices so that the locations of mobile devices can be determined when a 911 call is placed. To implement Congress's mandate, the Federal Communications Commission (FCC) requested cellular service providers upgrade their systems in two phases (herein "Phase I" and "Phase II" respectively). While the level of precision/accuracy provided by these Phase I and II upgrades are generally inadequate for providing effective location based services that meet the demands of modern users of mobile devices, these upgrades provide a foundation from which more effective location based solutions may be built.

As mentioned above, the FCC requested cellular service providers upgrade their systems in two phases. In the first phase (Phase I), cellular service providers were to upgrade their systems so that emergency calls (e.g., 911 calls) are routed to the public service answering point (PSAP) closest to the cell-tower antenna with which the mobile device is connected, and so that PSAP call-takers can view the phone number of the mobile device and the location of the connecting cell-tower. The location of the connecting cell-tower may be used to identify the general location of the mobile device within a 3-6 mile radius.

In the second phase (Phase II), cellular service providers were to upgrade their systems so that PSAP call-takers could identify the location of the mobile device to within 300 meters. To meet these Phase II requirements, wireless service providers have implemented a variety of technologies, and depending on the technology used, can generally identify the location of the mobile device to within 50-300 meters. For example, on systems that have implemented a network-based solution (e.g., triangulation of nearby cell towers, etc.), the location of a mobile device can be determined within an accuracy of 100 meters 67% of the time, and to within an accuracy of 300 meters 95% of the time. On systems that have adopted a mobile device-based solution (e.g., embedded global positioning system receivers, etc.), the location of the mobile device may be determined to within 50 meters 67% of the time, and to within 150 meters 95% of the time.

Existing phase I and II solutions, alone, are not adequate for generating location information having sufficient accuracy or detail for use in providing accurate, powerful, and reliable location based services. Various embodiments may use some or all of the capabilities built into existing systems (e.g., as part of phase I and II upgrades, device-centric systems, network-centric systems, etc.), in conjunction with more advanced location determination techniques, to compute location information suitable for the advanced location based services demanded by today's consumers.

In addition to the three basic approaches discussed above, a number of different solutions are currently available for determining the location of mobile device, any or all of which may be implemented by and/or included in the various embodiments.

Most conventional location determination solutions use distance estimation techniques that are based on single-carrier signals, and one of the fundamental operations in ground-based (or network-centric) location determination solutions is timing estimation of a first-arrival path of a signal. That is, a single-carrier signal transmitted between a transceiver and a mobile device can be received via multiple paths (i.e., multipath), and the multiple paths of the signal can have different received powers and arrival times. The received signal may be cross-correlated to distinguish the multiple paths of the received signal. In this method it is generally assumed that the first-arrival path (e.g., first detected signal, strongest signal, etc.) is associated with the path traveling the shortest distance, and hence is the right value to use in estimating distance between the mobile device and the transceiver. Often, this first-arrival path is the strongest path due to zero or fewer reflections, relative to the other paths, between the transceiver and the mobile device.

In various embodiments, the first-arrival time of the identified first-arrival path may be used in addition to other parameters (e.g., an estimated signal transmission time and/or a time offset between clocks of the transceiver and the mobile device, etc.) to estimate distance between a mobile device and a network component (e.g., another mobile device, a transceiver, an access point, a base station, etc.). The first-arrival time may be estimated by the mobile device (e.g., based on the downlink received signal) or by the network component (e.g., based on an uplink received signal).

The location of the mobile device may also be determined by estimating the distance between the mobile device and a network component or other signal sources (e.g., a transceiver, ground or satellite-based signal sources, etc.). For example, the location of the mobile device may be determined by performing trilateration using estimated distances between multiple (e.g., three or more) transceivers and the mobile device.

Another location determination solution may include computing an observed time difference of arrival (OTDOA) value by measuring the timing of signals received from three network components (e.g., mobile devices, transceivers, access points, etc.). For example, a mobile device may be configured to compute two hyperbolas based on a time difference of arrival between a reference transceiver signal and signals of two neighbor transceivers. The intersection of the computed hyperbolas may define a position on the surface of the earth that may be used by various embodiments to determine the location of the mobile device.

The accuracy of such OTDOA solutions may be a function of the resolution of the time difference measurements and the geometry of the neighboring transceivers. As such, implementing an OTDOA solution may require determining the precise timing relationship between the neighboring transceivers. However, in existing asynchronous networks, this precise timing relationship may be difficult to ascertain.

In various embodiments, location measurement units (LMUs) may be added throughout a deployment region of an asynchronous network to measure/compute timing information for one or more network components (e.g., transceivers) relative to a high quality timing reference signal. For example, a mobile device or an LMU may determine the observed time difference between frame timing of transceiver signals, and the observed time difference may be sent to the transceiver or a radio network controller of the communication network to determine the location of the mobile device. The location of the mobile device may also be determined based on the observed time difference and assistance data (e.g., position of the reference and neighbor transceivers) received from the communication network.

Another location determination solution may include computing an uplink-time difference of arrival (U-TDOA) based on network measurements of the time of arrival of a known signal sent from the mobile device and received at multiple (e.g., four or more) LMUs. For example, LMUs may be positioned in the geographic vicinity of the mobile device to accurately measure the time of arrival of known signal bursts, and the location of the mobile device may be determined using hyperbolic trilateration based on the known geographical coordinates of the LMUs and the measured time-of-arrival values.

As discussed above, conventional location determination solutions are typically based on single-carrier signals. The various embodiments include a ground-based location determination solution based on multi-carrier signals. A location determination solution based on multi-carrier signals may improve the accuracy of the computed location information by, for example, improving the accuracy of the timing estimation (e.g., by expanding the bandwidth of cellular signals). Location determination solutions based on multiple carriers may be used in both the device-centric (e.g., mobile device-based) and network-centric (e.g., base station-based) approaches, and may be applied to both 3GPP and 3GPP2 wireless communication technologies.

In various embodiments, a mobile device may be configured to determine its geospatial location based on information collected from mobile device sensors (e.g. gyroscope, accelerometer, magnetometer, pressure sensor, etc.), information received from other mobile devices, and information received from network components in a communication system.

Figure 4A:
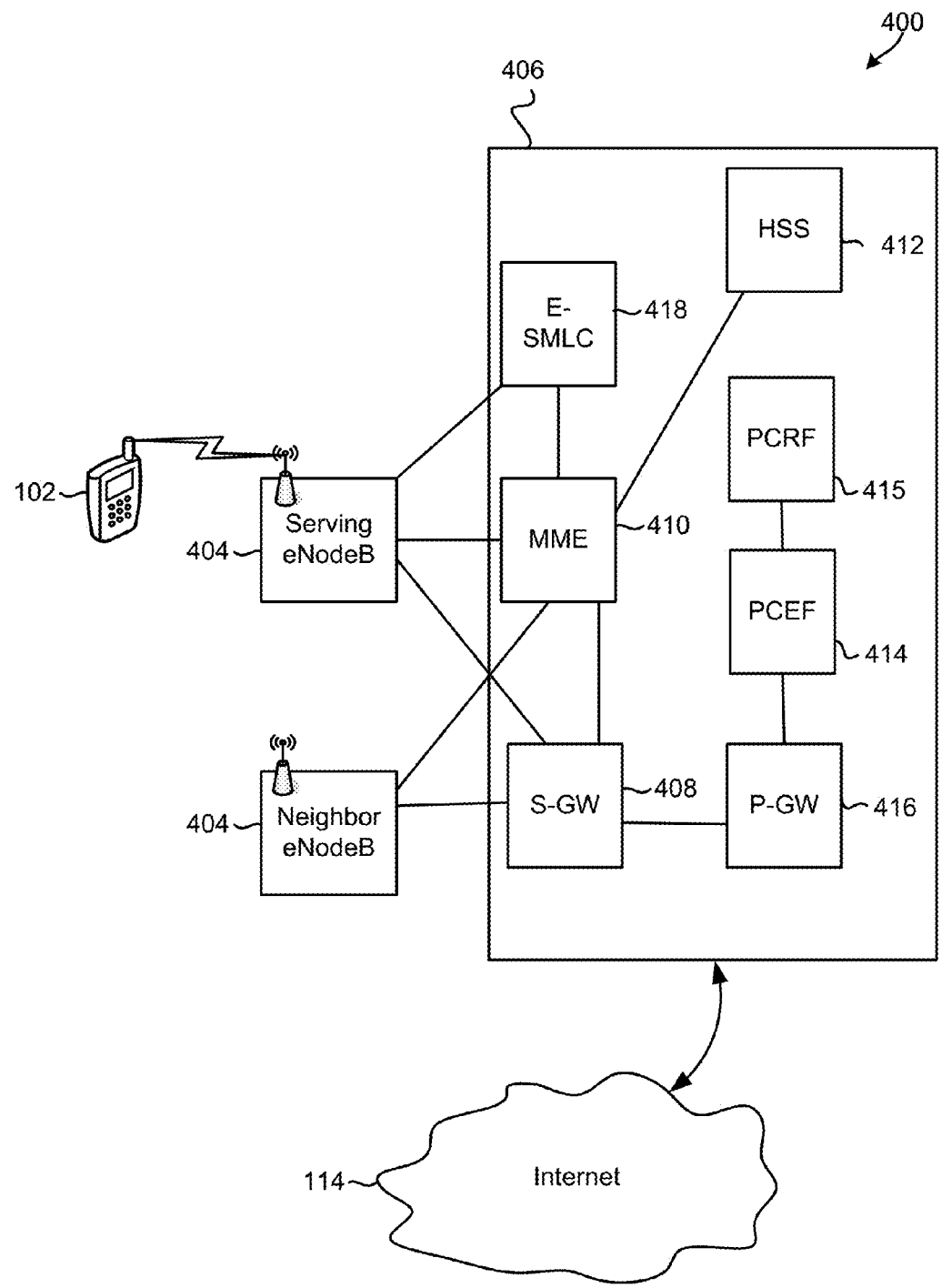
FIG. 4A is a communication system block diagram illustrating network components of an example LTE communication system suitable for use with various embodiments

FIG. 4A illustrates an example communication system within which the various embodiments may be implemented. Generally, the mobile device 102 may be configured to send and receive communication signals to and from a network 406, and ultimately the Internet 114, using a variety of communication systems/technologies (e.g., GPRS, UMTS, LTE, cdmaOne, CDMA2000™). In the example illustrated in FIG. 4, long term evolution (LTE) data transmitted from the mobile device 102 is received by a eNodeB (eNB) 404 and sent to a serving gateway (S-GW) 408 located within the core network 406. The mobile device 102 or serving gateway 408 may also send signaling (control plane) information (e.g., information pertaining to security, authentication, etc.) to a mobility management entity (MME) 410.

The MME 410 may request user and subscription information from a home subscriber server (HSS) 412, perform various administrative tasks (e.g., user authentication, enforcement of roaming restrictions, etc.), and send various user and control information to the S-GW 408. The S-GW 408 may receive and store the information sent by the MME 410 (e.g., parameters of the IP bearer service, network internal routing information, etc.), generate data packets, and forward the data packets to a packet data network gateway (P-GW) 416. The P-GW 416 may process and forward the packets to a policy and control enforcement function (PCEF) 414 which receives the packets and requests charging/control policies for the connection from a policy and charging rules function (PCRF) 415. The PCRF 415 provides the PCEF 414 with policy rules that it enforces to control the bandwidth, the quality of service (QoS), and the characteristics of the data and services being communicated between the network (e.g., Internet, service network, etc.) and the mobile device 102. In an embodiment, the PCEF 414 may be a part of, or perform operations typically associated with, the P-GW 416. Detailed information about policy and charging enforcement function operations may be found in "3rd Generation Partnership Project Technical Specification Group Services and System Aspects, Policy and Charging Control Architecture," TS 23.203, the entire contents of which are incorporated herein by reference.

In an embodiment, the network 406 may also include an Evolved Serving Mobile Location Center (E-SMLC) 418. Generally, the E-SMLC 418 collects and maintains tracking information about the mobile device 102. The E-SMLC 418 may be configured to provide location services via a lightweight presentation protocol (LPP), which supports the provision of application services on top of TCP/IP networks. The E-SMLC 418 may send or receive (e.g., via LPP) almanac and/or assistance data to and from the MME 410 and/or eNB 404. The E-SMLC 418 may also forward external or network initiated location service requests to the MME 410.

In addition, the mobile device 102 may receive information from the serving eNodeB 404 via System Information Blocks that includes the neighbor cells to scan that are on the same system using the same frequencies or different frequencies, Home eNB (HeNB), in addition to CDMA, GERAN and UTRA cells.

Figure 4B:
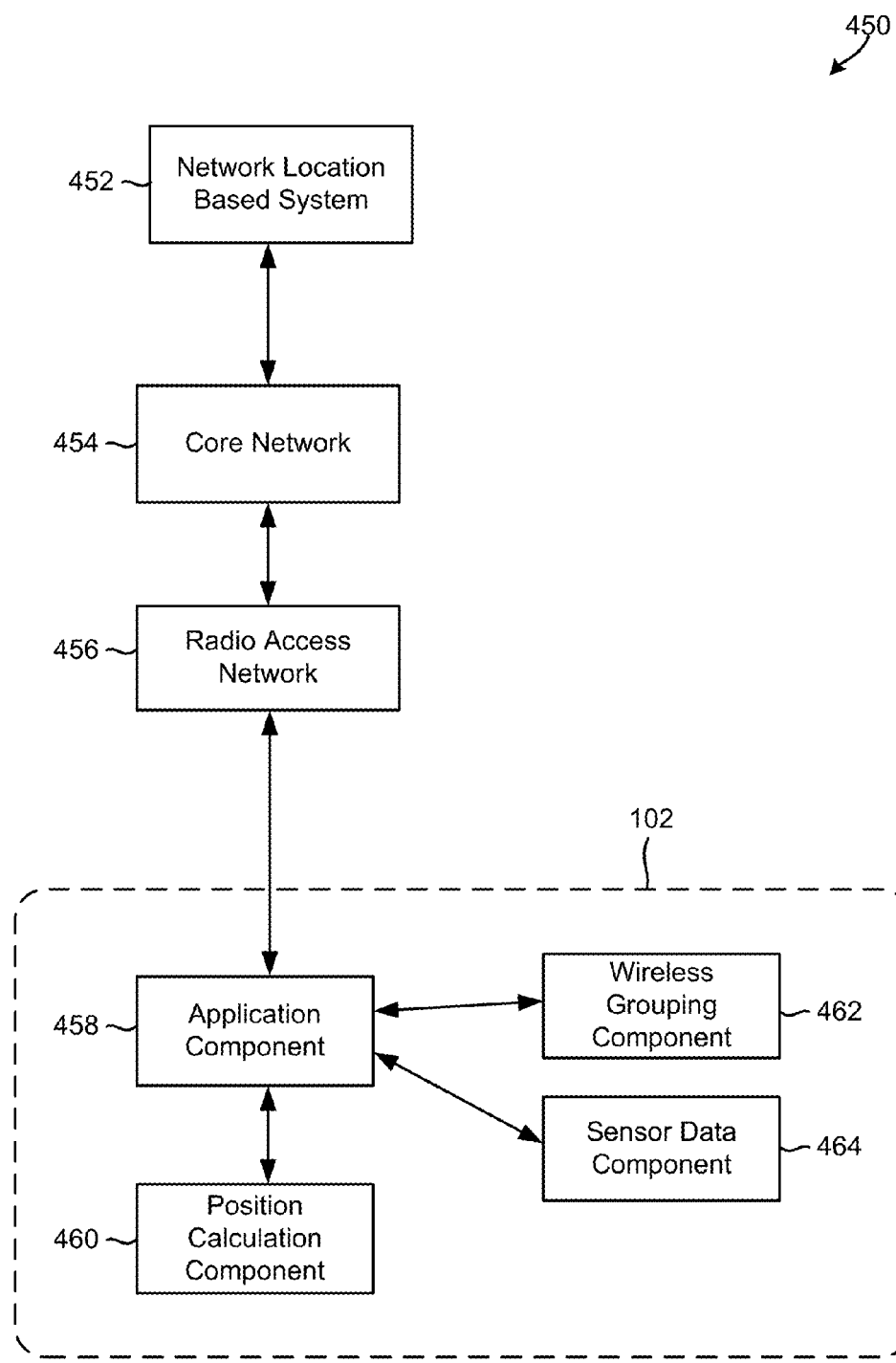
FIG. 4B is a block diagram illustrating logical components, communication links and information flows in an embodiment communication system.

FIG. 4B illustrates logical components, communication links, and information flows in an embodiment communication system 450 suitable for use in determining the location of the mobile device. The communication system 450 may include a network location based system 452, a core network 454, and a radio access network 456. The communication system 450 may also include an application component 458, a position calculation component 460, a wireless grouping component 462, and a sensor data component 464, any or all of which may be included in a mobile device 102. The application component 458 (e.g., client software) may request and receive location information from the network location based system 452 (e.g., through the core network 454 and the radio access network 456). Likewise, the network location based system 452 (or another client attached to, or within, the core network 454) may request and receive location information from the application component 458.

In various embodiments, the mobile device 102 may be configured to determine its geospatial location based on information collected from mobile device sensors (e.g. gyroscope, accelerometer, magnetometer, pressure sensor, etc.), information received from other mobile devices, and information received from network components in a communication system. In an embodiment, the collection and reporting of sensor information may be controlled/performed by the sensor data component 464. For example, the application component 458 may retrieve/receive sensor information from the sensor data component 464 and send the sensor information to the position calculation component 460 to compute the location of the mobile device locally for position updates and/or position augmentation. The application component 458 may also send the computed location information to the network location based system 452 and/or other mobile devices.

As mentioned above, in various embodiments, the mobile device 102 may be configured to determine its geospatial location based on information collected from other mobile devices. In these embodiments, two or more mobile devices may be organized into groups. Each mobile device may also share its location information with the other mobile devices with which the mobile device is grouped. For example, mobile devices may be configured to share their current location and/or position information (e.g., latitude, longitude, altitude, velocity, etc.) and an estimate of a distance between themselves and a target mobile device with other mobile devices in their group.

In an embodiment, the grouping of mobile devices may be controlled by the wireless grouping component 462. For example, the application component 458 may retrieve wireless group information (e.g., information pertaining to the locations of other mobile devices) from the wireless grouping component 462, and send the group information to the position calculation component 460 to perform local calculations for position updates and/or position augmentation. In an embodiment, the position calculation component 460 may perform the local calculations based on both sensor information received from the sensor data component 464 and group information received from the wireless grouping component 462.

In an embodiment, the mobile device 102 may be configured to automatically share its location information with other mobile devices upon discovery of the other mobile devices. Mobile devices may augment their location information (e.g., position coordinates) with information received from other mobile devices within same geographic location, and in a controlled pseudo ad-hoc environment. Since the shared location information (e.g., latitude, longitude, altitude, velocity, etc.) involves a relatively small amount of data, in an embodiment the mobile devices may receive such information from a network server by in-band and/or out-of-band signaling.

When implemented in a 3GPP-LTE network, the various embodiments may include an E-SMLC 418 component configured to send and receive location information (e.g., latitude, longitude, altitude, velocity, etc.) to and from the mobile devices, which may be achieved both on-net and off-net. The location information may be delivered in standard formats, such as those for cell-based or geographical coordinates, together with the estimated errors (uncertainty) of the location, position, altitude, and velocity of a mobile device and, if available, the positioning method (or the list of the methods) used to obtain the position estimate To aid in the determination of the locations of mobile devices, 3GPP-LTE networks have standardized several reference signals. Various embodiments may use these reference signals for timing based location and positioning solutions. Such reference signals may include the primary and secondary synchronization signals and the cell specific reference signals.

As mentioned above, two or more mobile devices may be organized into groups. Mobile devices within the same group may be part of the same network, or may be associated with different networks and/or network technologies. The mobile devices within the same group may also operate on different network operating systems (NOSs) and/or radio access networks (RANs).

Figure 5A:
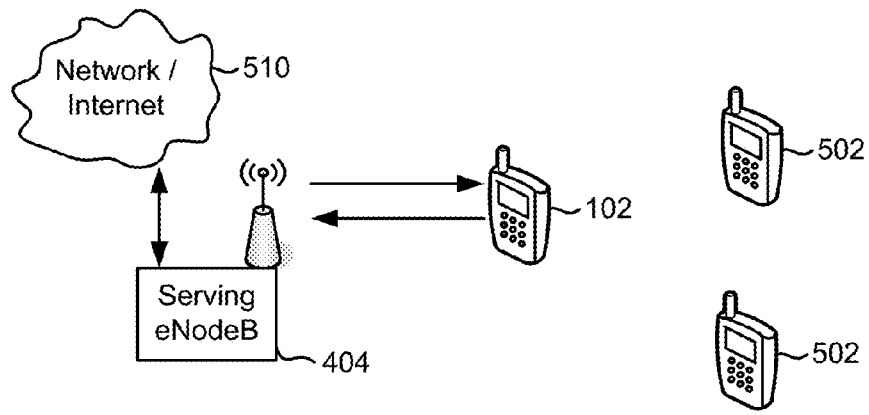
FIGS. 5A-5C are component block diagrams illustrating functional components, communication links, and information flows in an embodiment method of grouping mobile devices and sharing location information between grouped mobile devices.
Figure 5B:
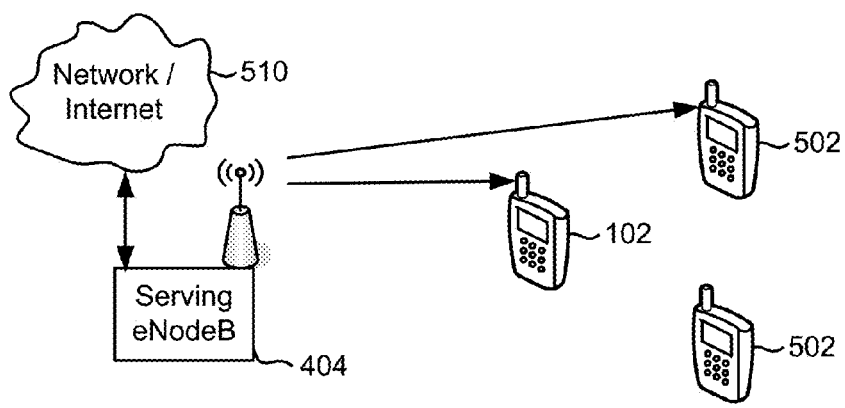
Figure 5C:
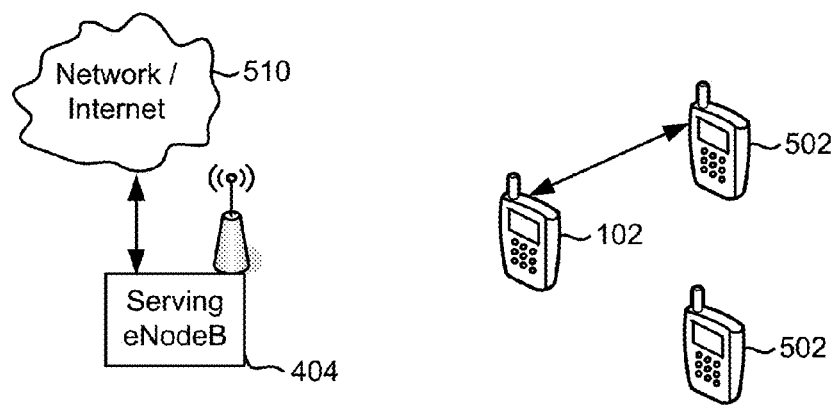

FIGS. 5A-5C illustrate functional components, communication links, and information flows in an embodiment method of grouping mobile devices and sharing location information between grouped mobile devices. With reference to FIG. 5A, after a mobile device 102 is powered on, the mobile device 102 may scan the airwaves for predefined and/or preferred radio frequency carriers and/or systems with which the mobile device 102 may connect to the network. If the mobile device 102 does not find an appropriate network with which it may connect (or loses its connection) the mobile device 102 may scan the airwaves for other radio access systems (e.g., mobile network, radio access point associated with a mobile device, etc.) to acquire (i.e., connect to) until a connection to a network/Internet 510 is established. These operations may also be performed in the event of a dropped call or power interruption.

The mobile device 102 may also begin acquiring GPS signals while scanning the airwaves for radio frequency carriers and/or systems. If the mobile device 102 cannot acquire GPS signals, a network component (not illustrated) may help determine the relative position of the mobile device 102 based on one or more of the location determination solutions discussed herein (e.g., based on the antenna used for the radio access point, the time delay, angle of arrival, etc.).

The mobile device 102 may acquire (i.e., connect to) an appropriate radio access system, radio frequency carrier and/or system via the mobile device's system acquisition system. In the examples illustrated in FIGS. 5A-5C, the mobile device 102 establishes a connection to a network 510 via an eNodeB 404. However, it should be understood that any or all of the communication technologies discussed above are contemplated and within the scope of the various embodiments.

After the mobile device 102 acquires the radio access system, the network 510 (i.e., a component in the network such as a server) will know the approximate location of the mobile device 102 (e.g., via one or more of the location determination solutions discussed above, such as proximity to base towers). In addition, the mobile device 102 may compute its current location (e.g., via GPS and/or the location determination solutions discussed above), store the computations in a memory of the mobile device, and report its current location to the network 510.

In addition to knowing the approximate location of the mobile device 102, the network 510 may also be informed of the locations of other mobile devices 502 and the proximity of the other mobile devices 502 to the recently acquired mobile device 102.

FIG. 5B illustrates that the network 510 may send instructions/commands to the mobile devices 102, 502 to cause the mobile devices 102, 502 to group with mobile devices 102, 502 and possibly others. In an embodiment, the network 510 may be configured to automatically group the mobile devices 102, 502 based on the proximity of the mobile devices 102, 502 with respect to one another. In an embodiment, the network 510 may be configured to allow an incident command system (ICS) commander to group the devices. In an embodiment, the network 510 may be configured to allow the mobile devices to form groups based on their proximity to one another.

FIG. 5C illustrates that the mobile device 102 may pair/group with another mobile device 502 and/or establish communication links so that the mobile devices 102, 502 may share real-time relative location information with each other. Two or more grouped/paired mobile devices 102 and 502 may identify their relative positions to each other by sending relative location information over the established communication links. The relative location information may include time-to-arrival, angle-of-arrival, and existing or self-aware location information.

The mobile devices 102, 502 may be configured report sensor information to each other and/or the network 510. The sensor information may include x, y, z coordinate information and velocity information. The sensor information may be polled on a continuous basis, may be requested periodically, and/or made available on demand in response to network/system requests.

In an embodiment, a mobile device 102, 502 may be configured to report sensor information in response to determining that there is a high likelihood that there has been change in a location of the mobile device 102, 502 (e.g., in response to detecting motion). The mobile devices 102, 502 may also be configured collect and report sensor information to the network 510 in response to receiving an instruction/command from the network 510 (i.e., a component in the network such as a server or E-SLMC 418 illustrated in FIG. 4). The network 510 (i.e., a component in the network) may be configured to receive the sensor and location information from the mobile devices 102, 502, and compute and store information about the distances (e.g., in time delay and angle of arrival with respect to the mobile devices 102, 502).

In an embodiment, the reporting of sensor information may be based on local parameter settings. For example, the mobile devices 102, 502 may be configured to transmit sensor information when any of the measured parameters (e.g., x, y, z, and velocity information) meet or exceed a threshold value (e.g., exceed a rate-of-change, meet a timeout limit), which may be identified by local parameter settings stored in a memory of the mobile devices 102, 502. In an embodiment, the mobile devices 102, 502 may be configured to re-compute and/or update their location information in response to determining that the measured parameters (e.g., x, y, and z coordinates and velocity information) meet or exceed a threshold value.

In an embodiment, a mobile device 102 and/or the network 510 (i.e., a component in the network) may be configured to compare collected sensor information to computed latitude and longitude coordinates, relative altitude information, and other available information to determine if there is a discrepancy between the collected/measured values and the expected values. When it is determined that there exists a discrepancy between the expected and measured values, the mobile device 102 and/or network 510 may perform additional measurements to improve the location accuracy of the measurements/location information.

Figure 5D:
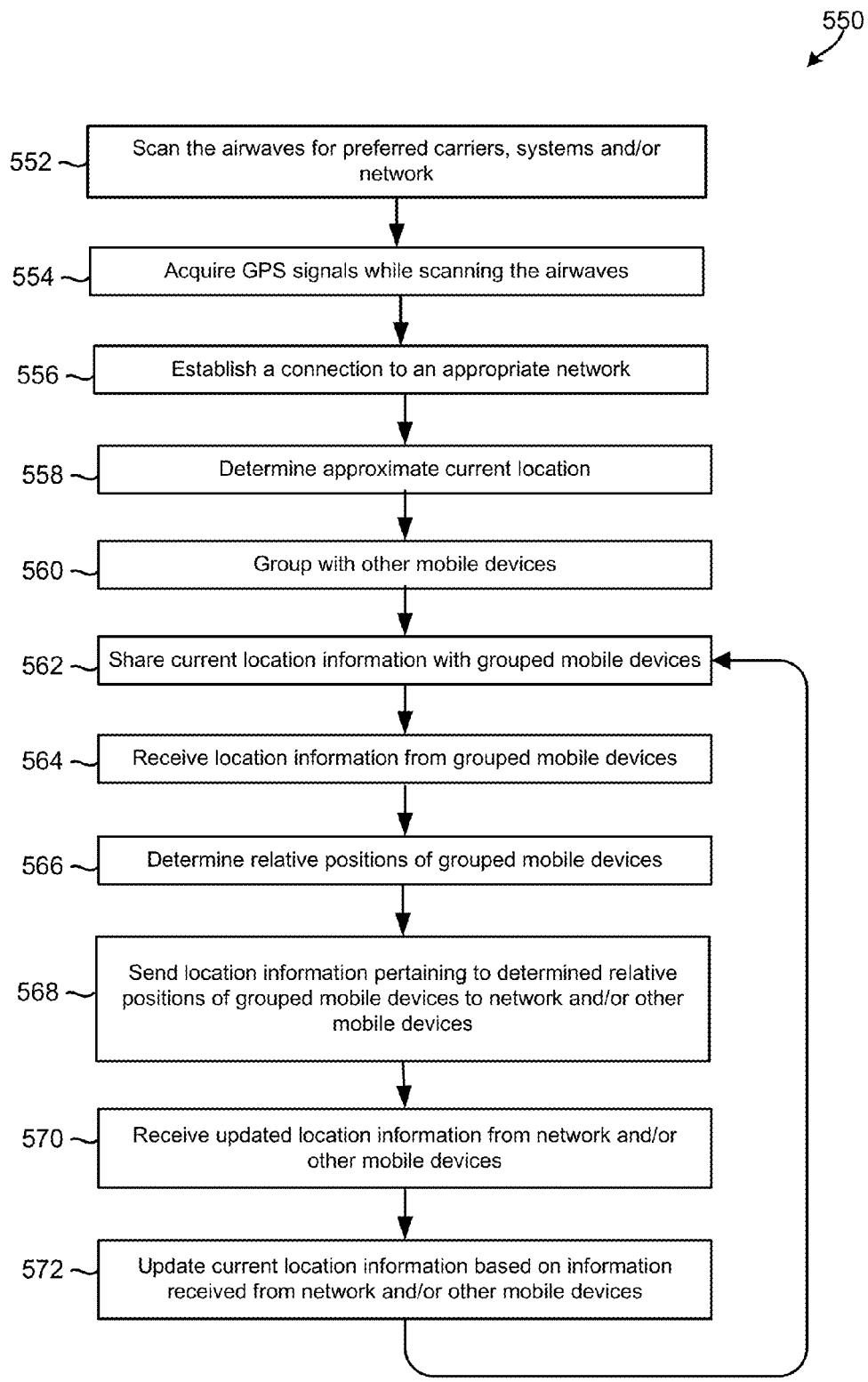
FIG. 5D is a process flow diagram illustrating an embodiment mobile device method for grouping mobile devices and sharing location information between grouped mobile devices and the network to compute enhanced location information.

FIG. 5D illustrates an embodiment mobile device method 550 for grouping mobile devices and sharing location information between grouped mobile devices and the network to compute enhanced location information. After a mobile device is powered on, in block 552, the mobile device may scan the airwaves for predefined and/or preferred radio frequency carriers and/or systems with which the mobile device may connect. In block 554, the mobile device may begin acquiring GPS signals while scanning the airwaves for radio frequency carriers and/or systems. If the mobile device cannot acquire GPS signals, the mobile device or a network component may, as part of block 554, determine the relative position of the mobile device based on one or more of the location determination solutions discussed herein. In block 556, the mobile device may acquire (i.e., connect to) an appropriate radio access system, radio frequency carrier, system and/or network.

In block 558, the mobile device may compute its current location (e.g., via GPS and/or the location determination solutions discussed above), store the computations in a memory, and report its current location to the network. In block 560, the mobile device may group with other mobile devices in response to receiving instructions/commands from a network component and/or in response to detecting that the other mobile devices are within a predefined proximity to the mobile device (i.e., within a threshold distance). In block 562, the mobile device may share its current location information, as well as information collected from sensors, with the grouped mobile devices. In block 564, the mobile device may receive location and/or sensor information from the grouped mobile devices. The sensor information may include x, y, z coordinate information and velocity information.

In block 566, the mobile device may identify the relative positions of the other mobile devices, which may be achieve by evaluating the location and sensor information received from the other mobile devices and/or via any or all of the location determination solutions discussed herein. In block 568, the mobile device may send the relative location information, its current location information, and/or sensor information to a network component and/or the other mobile devices, which may receive the sensor and location information and compute updated location information (e.g., based on distance in time delay and angle of arrival, relative altitude information, etc.). In block 570, the mobile device may receive updated location information from the network component and/or the other grouped mobile devices. In block 572, the mobile device may update its current location calculation and/or information based on the information received from the network component and/or the other grouped mobile devices. The operations of blocks 562-572 may be repeated until the desired level of precision is achieved for the location information.

FIGS. 6A-6D illustrate functional components, communication links, and information flows in an embodiment method for computing location information in which the grouped/paired mobile devices 102, 502 are updated with their respective location information.

Figure 6A:
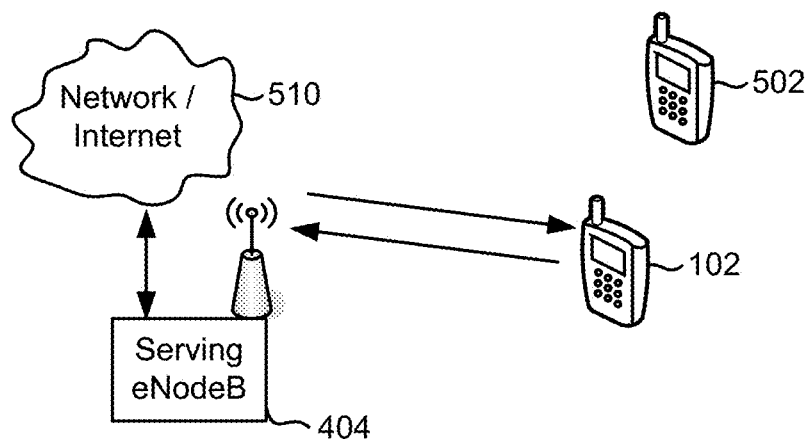
FIGS. 6A-6D are component block diagrams illustrating functional components, communication links, and information flows in an embodiment method for computing location information in which the grouped/paired mobile devices are updated with their respective location information.

FIG. 6A illustrates that the mobile device 102 may communicate with a serving eNodeB 404 to relay its location information to the network 510 and/or to receive location information from the network 510.

Figure 6B:
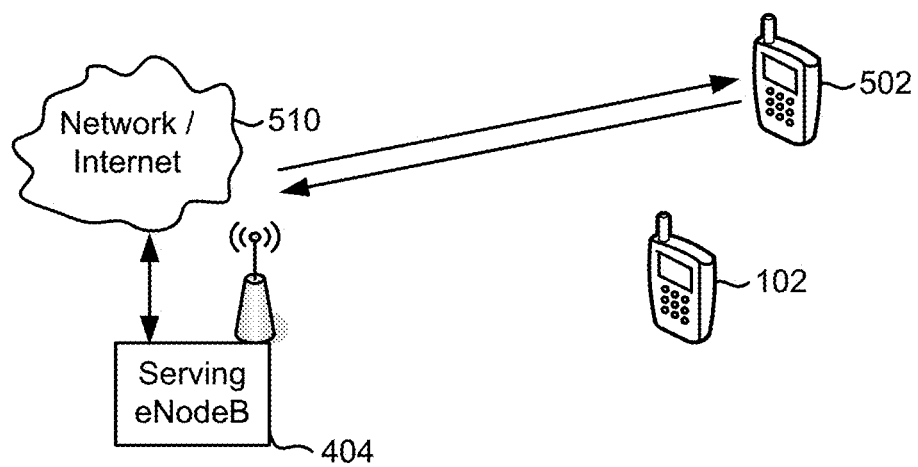

FIG. 6B illustrates that another mobile device 502 may also communicate with the serving eNodeB 404 to relay its location information to the network 510 and/or to receive location information from the network 510.

Figure 6C:
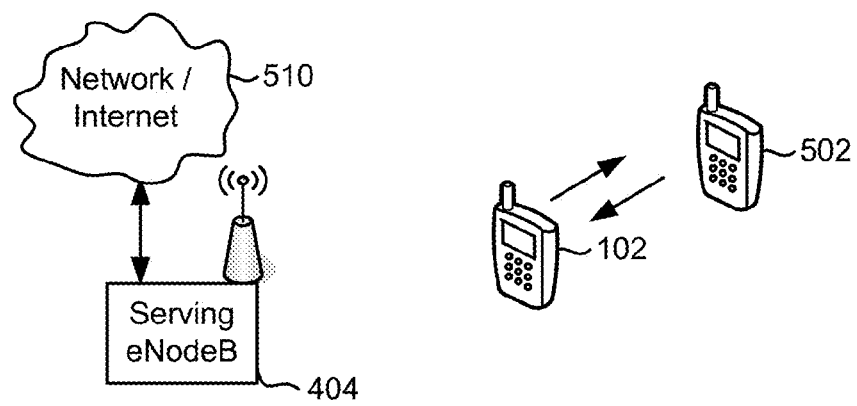

FIG. 6C illustrates that the grouped/paired mobile devices 102, 502 may communicate with each other to determine the distance between each other, which may be achieved by the mobile devices 102, 502 communicating various types of information, such as time-of-arrival, relative position with angle-of-arrival measurements, and other similar values, measurements, or computations. The mobile devices 102, 502 may then re-compute, refine, and/or update their current location calculations and/or location information based on information received from the other mobile devices 102, 502.

Figure 6D:
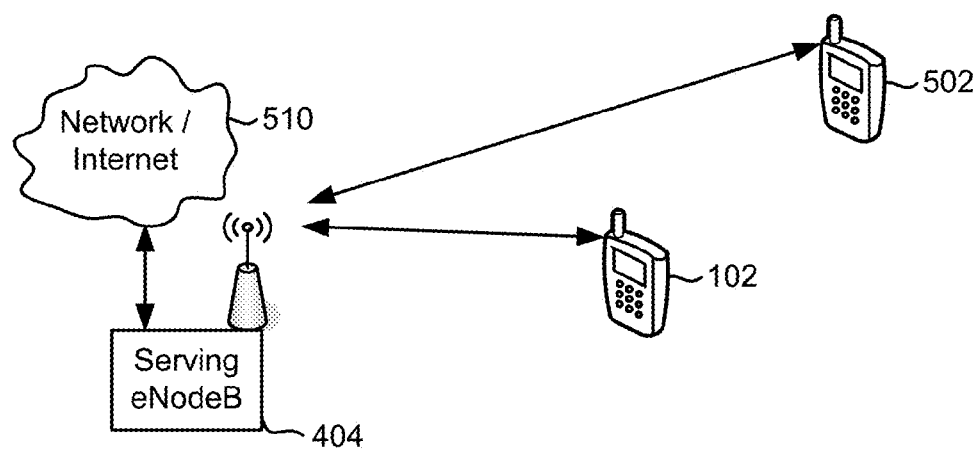

FIG. 6D illustrates that the grouped/paired mobile devices 102 and 502 may send their self-aware location information and/or relative location information to the network 510 (via the serving eNodeB 404), and receive updated location information from the network 510. For example, the mobile devices 102 and 502 may send their present location coordinates, distances between mobile device (e.g., distance to each other), altitude, and bearings (e.g., where mobile device 102 is with respect to mobile device 502) to the network 220. The network may compute updated location information based on the received information (e.g., coordinates, sensor information, proximity information, etc.), and send the updated location information to the mobile devices 102, 502. The mobile devices 102, 502 may then re-compute, refine, and/or update their current location calculations and/or location information based on information received from the network.

The operations discussed above with respect to FIGS. 6A-6D may be repeated so that the mobile devices 102, 502 recursively, continuously, and/or periodically re-compute, refine, and/or update their current location calculations and/or location information based on updated information received from the other mobile devices and/or the network 510 until the desired level of precision is achieved for the location information.

Figure 6E:
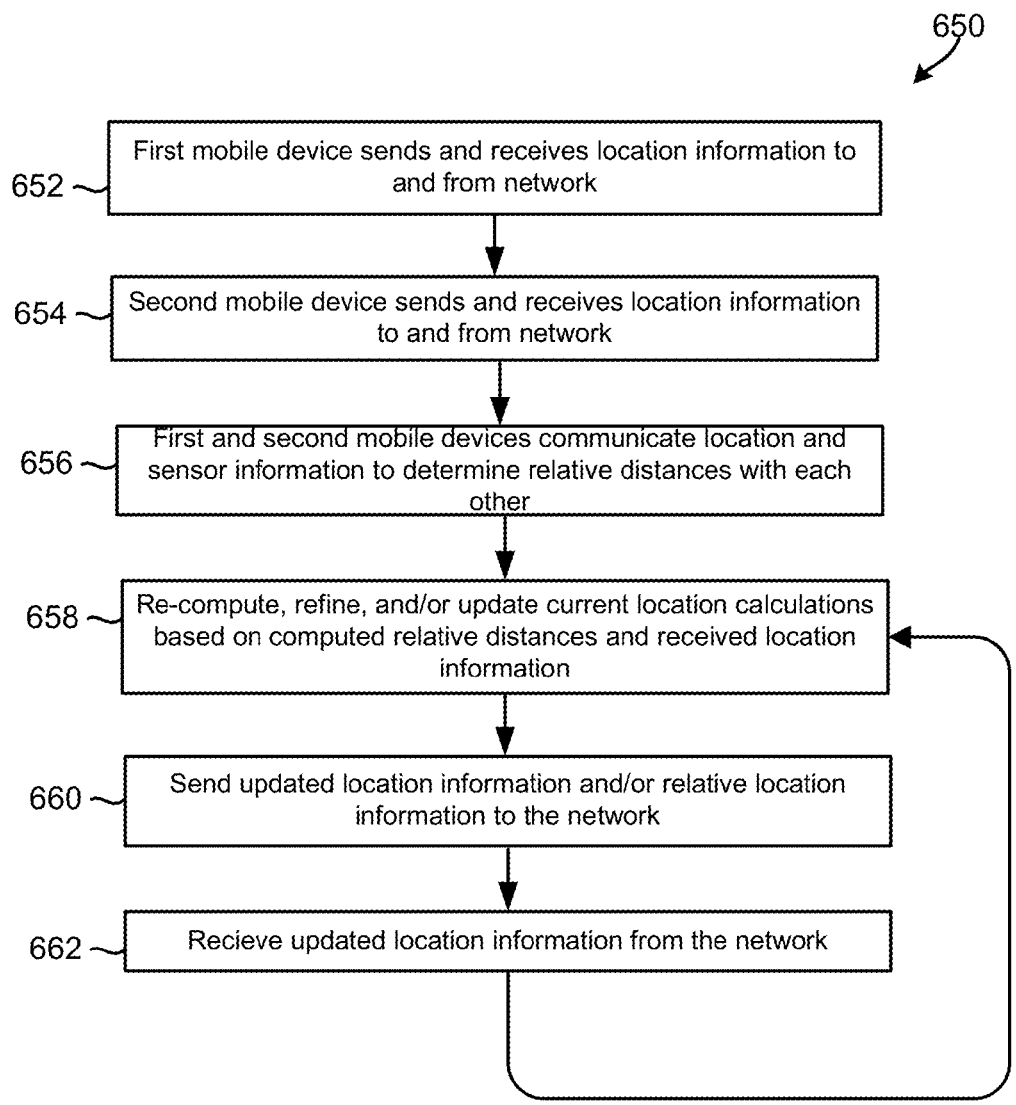
FIG. 6E is a process flow diagram illustrating an embodiment system method of determining the location of two or more grouped mobile devices.

FIG. 6E illustrates an embodiment system method 650 of determining the location of two or more grouped mobile devices. In block 652, a first mobile device may send and/or receive current location information to and from a network component. In block 654, a second mobile device may send and/or receive current location information to and from a network component. In block 656, the first and second mobile devices may communicate with each other to determine the relative distances between each other, which may be achieved by communicating various types of information, including time-of-arrival, relative position with angle-of-arrival measurements, velocity, altitude, etc.

In block 658, the first and/or second mobile devices may re-compute, refine, and/or update their current location calculations and/or location information based on information received from the other mobile devices and/or the network. In block 660, the first and/or second mobile devices may send their updated current location calculations and/or location information to the network component, which may receive the calculations/information and compute updated location information (e.g., based on distance in time delay and angle of arrival, relative altitude information, etc.). In block 662, the first and/or second mobile devices may receive updated location information from the network. The operations in blocks 658-662 may be repeated until the desired level of precision is achieved for the location information.

It should be understood that the methods and operations discussed above with reference to FIGS. 5A-5D and 6A-6F may also be performed such that they include more than two devices. For example, in an embodiment, the mobile devices may be grouped into units of four (4) such that each mobile device may triangulate its position relative to the other mobile devices in the same group.

In an embodiment, a mobile device 102 and/or a network component may store relative location information for all the mobile devices within each group, based on the type of grouping. For example, a network component may store relative location information for all the mobile devices grouped/paired by an incident command system (ICS) commander. Likewise, the network component may store relative location information for all the mobile devices grouped/paired based on their proximity to each another.

In an embodiment, the mobile device 102 may be configured to detect a low battery condition, and initiate operations to conserve battery. For example, a mobile device 102 may be configured to turn off its radio and/or terminate or reduce its participation in the group/pairing information exchange. As another example, a mobile device 102 may be flagged or identified as having a low battery condition, and the other grouped/paired mobiles devices may be informed of the low battery situation so that update intervals may be adjusted to reduce battery consumption.

Figure 6F:
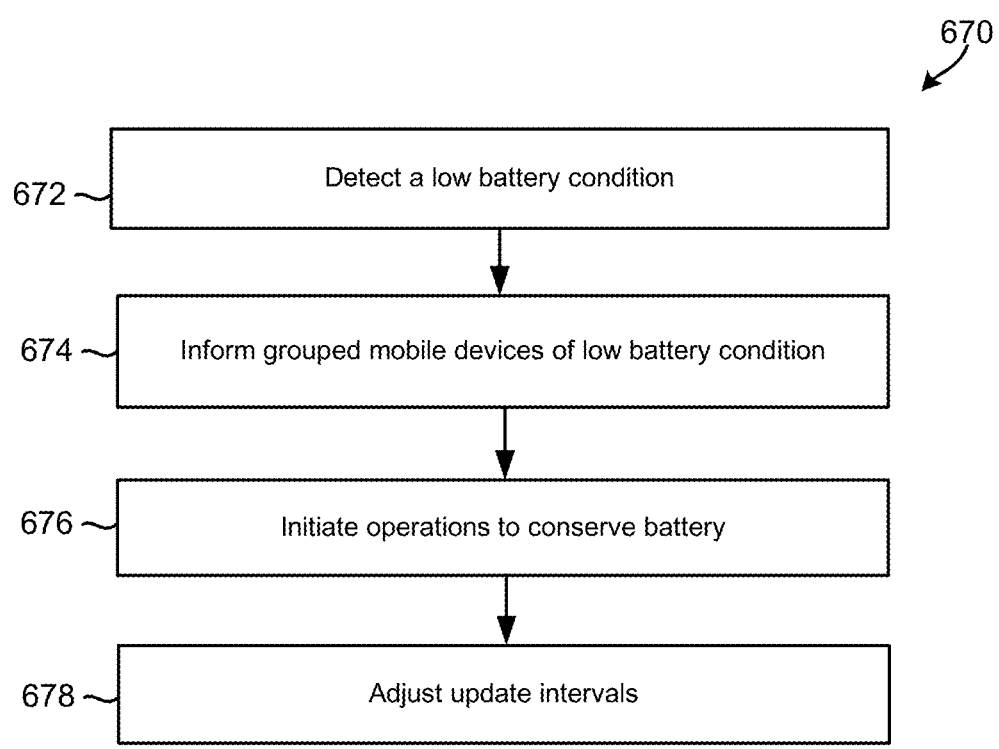
FIG. 6F is a process flow diagram illustrating an embodiment mobile device method of adjusting the update intervals in response to detecting a low battery condition.

FIG. 6F illustrates an embodiment method 670 of adjusting the update intervals in a mobile device in response to detecting a low battery condition. In block 672, the mobile device may detect/determine that the amount of power remaining in the mobile device battery is below a predetermined threshold. In block 674, the mobile device may transmit a signal or otherwise inform grouped mobile devices of the detected low battery condition. In block 676, may initiate operations to converse power, such as by turn off its radio and/or reducing its participation in exchanging information with grouped mobile devices. In block 678, the mobile device and/or the informed grouped mobile devices may adjust the update intervals with respect to the mobile device to reduce the load on the mobile device.

As discussed above, grouped mobile devices may share various types of information to improve the accuracy of the location determination calculations. For the information shared between grouped/paired mobile devices, a comparison may be made for the path, range, between the mobile devices using any or all of the information available to the mobile devices (e.g., location coordinates, sensor information, proximity information, etc.). If the two mobile devices report relative positional information that is within a user or network defined range tolerance as being acceptable this is information may be forwarded to the network. If the relative positional information is not within the user or network defined range tolerance, additional polling operations may be performed to improve the accuracy of the measurements or location information. The above mentioned operations may be repeated until the desired level of accuracy is achieved. In an embodiment, the number of times the above-mentioned operations are repeated may determined based on a user-definable values which can be set by the network, user or algorithm used.

As mentioned above, a mobile device 102 may include two or more of the same type of sensor. In the embodiments in which the mobile device 102 includes more than one of the same type of sensor (e.g., includes two accelerometers), one of the sensors (e.g., one the two accelerometers) may be identified as a master sensor. The values measures by each sensor may be compared, and if the difference between the values falls within a tolerance range, the values measured by the master sensor may be used to compute the sensor parameters (e.g., x, y, z, and velocity parameters). If the difference between the values falls outside a tolerance range, the mobile device may use information collected from other sensors (of the same or different types) to determine if the values measured by the master sensor are consistent with expected values. For example, the mobile device may use information collected from various other types of sensors to compute sensor parameters (e.g., x, y, z, and velocity parameters), and compare the computed sensor parameters to similar sensor parameters computed based on the values measured on the master sensor to determine if the master sensor is functioning correctly. Values measured on the master sensor may also be compared to information stored in the network or other mobile devices to determine if the master sensor is functioning correctly. If it is determined that the master sensor is not functioning correctly, a secondary sensor may be designated as the master sensor. The previous master sensor may be demoted to standby status (i.e., for use if the primary sensor has a failure) and not used for immediate positional calculations.

As mobile devices move into an area, the mobile devices may be asked to group/pair with more devices. The number of devices that a mobile device can group/pair with may be restricted by user configuration, through the system, and/or user intervention so as to conserve battery and computational efforts (e.g., when the mobile device detects a low battery condition).

In an embodiment, proximity grouping may be used in the x, y, and z coordinates/fields and/or for velocity information.

In the event that a mobile device is unable to group with another mobile device with which it is instructed to group/pair with (e.g., due to a RF path problems), the mobile device may group with yet another mobile device in an ad-hoc fashion. If no mobile device is pairable with the mobile device, it may rely on its own geographic and/or and sensor information to report to the network.

When a mobile device 102 is undetected as being within a given proximity of a grouping radius, other mobile devices in the same group as the mobile device 102 may be informed of the decision to degroup/depair them from the mobile device 102. In an embodiment, the system may be configured so that an approval from the incident commander or user is required before the mobile is degrouped/depaired. In an embodiment, this may be achieved may transmitting a signal to a mobile device of the incident commander or user requesting approval, to which the incident commander or user may send a reply approving or disapproving of the request to degroup/depair. In an embodiment, the degrouping/depairing process may be transparent to the mobile device users.

In the event that a mobile device is unable to communicate with the network, the mobile device may send telemetry information pertaining to location services (and other telemetry information) to a grouped mobile device for relaying to the network.

In an embodiment, polling for information may be performed once the network has lost communication with the mobile device. Mobile devices that and known to be grouped to the mobile device may be instructed to communicate with the disconnected mobile even when it is trying to reacquire the network. A logical sequence based on proximity, signal quality to the network, and/or battery strength may be used to determine which mobile device will be used as a relay for communicating with the network.

The relayed telemetry information may include more than just positional information. For example, the telemetry information may also include bio sensor and user bio information reporting on the environment and user conditions, including heart rate and temperature, CO, O2 and other sensor information.

In an embodiment, the network may continuously measure/monitor the connected mobile devices. Knowing their location and relative location to each of the other mobile devices enables the network to continuously measure the uplink and downlink communication paths. If communication path degradation occurs and begins to fall within a defined system quality range (which may be user defined), a mobile device may be instructed to either handover to another radio access node for the same network and/or network technology, or be instructed to initiate to perform relay operations to relay communications though a defined mobile device as a secondary signal path.

In the event that a communication link is lost with the network the mobile device may attempt to acquire itself on another network. While the acquisition process is underway, a mobile device may act as a mesh device. Other mobile devices in the proximity group may also connect as a mesh network.

In an embodiment, the mobile devices may utilize dead reckoning (also called deducted reckoning) techniques to compute updated location information. Mobile devices may store the updated information for eventual relay to another mobile device which has network access or until one of the mobile devices or both devices have access to the initial network or another network and granted access to whether it is public or a private network.

Figure 7:
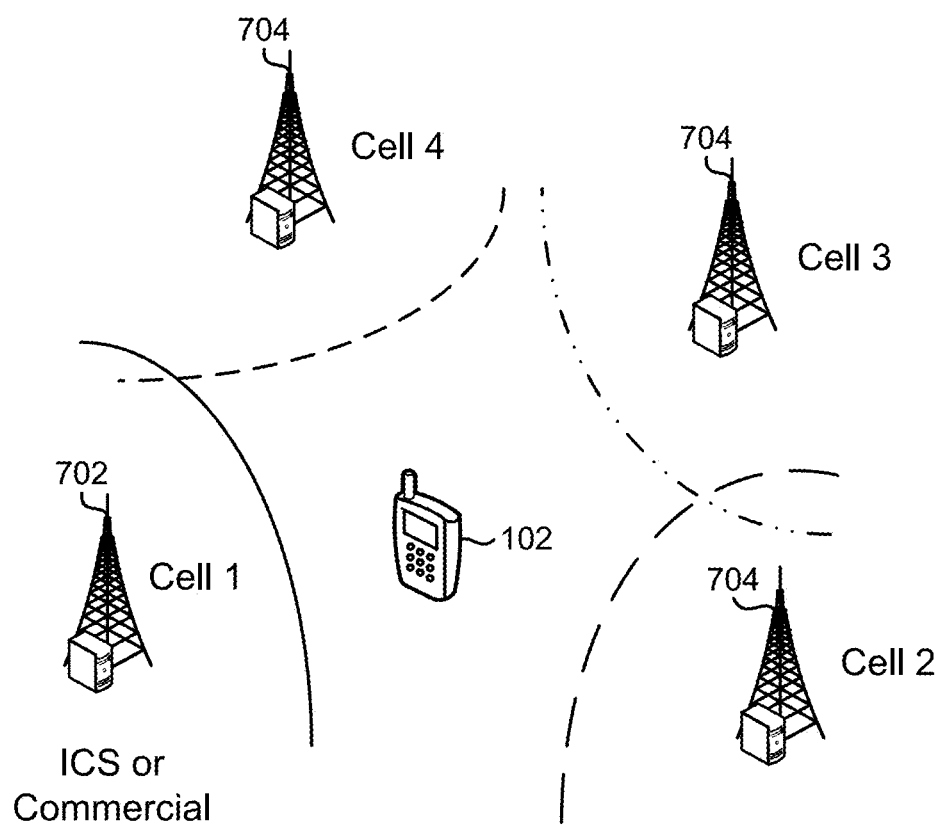
FIG. 7 is a component block diagram illustrating functional components, communication links, and information flows in embodiment method of periodically scan for cells.

FIG. 7 illustrates normal operating conditions in which a mobile device 102 will periodically scan for other cells 704, including its serving cell 903. If the radio access points are part of the network then the mobile device will report the identity and signaling information required by the existing network to determine (e.g., via triangulating and/or trilateration) the mobile device's location based on a network approach. If the mobile device detects a radio access point is not part of its preferred cell selection process, it may attempt to read the coordinates and positional information from the access point that is broadcast.

Once synched with the access point the mobile device may determine the timing difference and other requisite information to help determine its relative location and distance from the access point. This information may be related to the location system used by the mobile device to help refine its current location calculations.

Additionally the mobile device may be configured to compare each cell read to its own coordinate and using bearing and time difference for all the cells it reads. The mobile device may then triangulate on its own position.

During a 911 call a software application on the distressed mobile device may be executed. The software application may access an active neighbor list, read the overhead of each cell, and use that information to triangulate on the mobile device's own position. The mobile device may also read the time offset for each of the cells.

In this case the system begins to try and locate the distressed mobile's position with more precision an accuracy to assist First Responders with triangulating on the distressed mobile's position and sending the information to the incident commander and/or public service answering point (PSAP) with a relative distance to target indication that is updated on pre-defined intervals. If the mobile device has lost contact with the 911 center, PSAP then the last location is continuously displayed and any velocity information is also relayed to assist the first responders.

In an emergency, the mobile device 102 may be configured to send its location information to the network. The mobile device 102 may be configured to automatically send its location information in response to detecting the emergency, or may provide the user with an option to send the location information. In an embodiment, the mobile device 102 may be configured to send its location information in response to a network initiated command.

Each mobile device may become an access point (AP). The decision to be the access point may be periodically updated while still in communication with the network, or when no network is found. Upon powering up, each mobile device may act as a client, and on a pseudo random time interval, the mobile devices may become an access point and then a client.

The location based methodology may be the same for a frequency-division duplexing (FDD) and a time-division duplexing (TDD) system. However in the event that the communication link between the mobile device and the network is lost, the mobile device may be configured to relay its telemetry information through another mobile device having network access.

In an embodiment, all information sent via wireless communication links may be digital. In an embodiment, the information may be encrypted to a requisite advanced encryption standard (AES) standards level or the appropriate encryption level needed for the requisite communication system and access method used.

Generally, the location based systems (LBS) may utilize reactive or proactive based methods. In a reactive location based system, the mobile devices may synchronously interact with each other on a time basis or some other predetermined update method. In a proactive location based system, the mobile devices may update their location information based on a set of predetermined event conditions using an algorithm. The various embodiments may include both reactive and proactive aspects, taking the best of both approaches to enhance location accuracy and precision.

Various embodiments may include location determination solutions that utilize horizontal data (i.e., a set of reference points on the Earth's surface against which position measurements are made) and/or vertical data. Horizontal data define the origin and orientation of the coordinate system and are prerequisites for referring a position relative to the Earth's surface. Vertical data are based on geoids, which primarily serves as a basis to determine the height of a position relative to mean sea level for which the geoids act as a benchmark for origin and orientation. Various embodiments may utilize horizontal and vertical data to provide/generate enhanced three dimensional location information. The horizontal and vertical data can be global, national, local or custom depending on the locality and positioning reference system utilized.

Traditionally global data are used for position/location as compared to a local datum. Global data are used for initial position fixing if possible and are based on GPS coordinates. Local data are based on a particular position on the surface of the earth, which allows for a non GPS based location based services to take place. The various embodiments may use global data, local data, or both. In an embodiment, GPS may be used to help identify the initial positional fix, and may be augmented by dead reckoning and a hybrid trilateration solution that utilizes both network and terminal based positioning. In this embodiment, both local and global data may be used.

Generally, a hybrid lateration and trilateration solution includes a mobile device performing a measurement and sending it to the network, and a network component performing the location determination calculations. The various embodiments include a hybrid lateration and trilateration solution in which the mobile device performs the location determination calculations, with and without the support of the network components.

Various embodiments may include sensor fusion operations in which a collaborative approach is used so that the sensors do not act as individual sensors, but as a collective team. As discussed above, the mobile device may include various sensors (e.g., accelerometer, gyros, magnetic compass, altimeters, odometers, etc.) capable of generating heading, orientation, distance traveled, and velocity as part of the sensor information collected on the mobile device. In various embodiments, information collected from any or all the internal sensors may be used for improving location or positioning accuracy and/or confidence improvements. Various embodiments may compute location information based on information from multiple sensors, with or without the aid of radio frequency propagation information.

The sensor fusion operations may include the sharing of telemetry including sensor data indicating relative movement of the individual mobile device, which enables temporal readings to assist in the location estimate, either with external assistance or dead reckoning.

Figure 8:
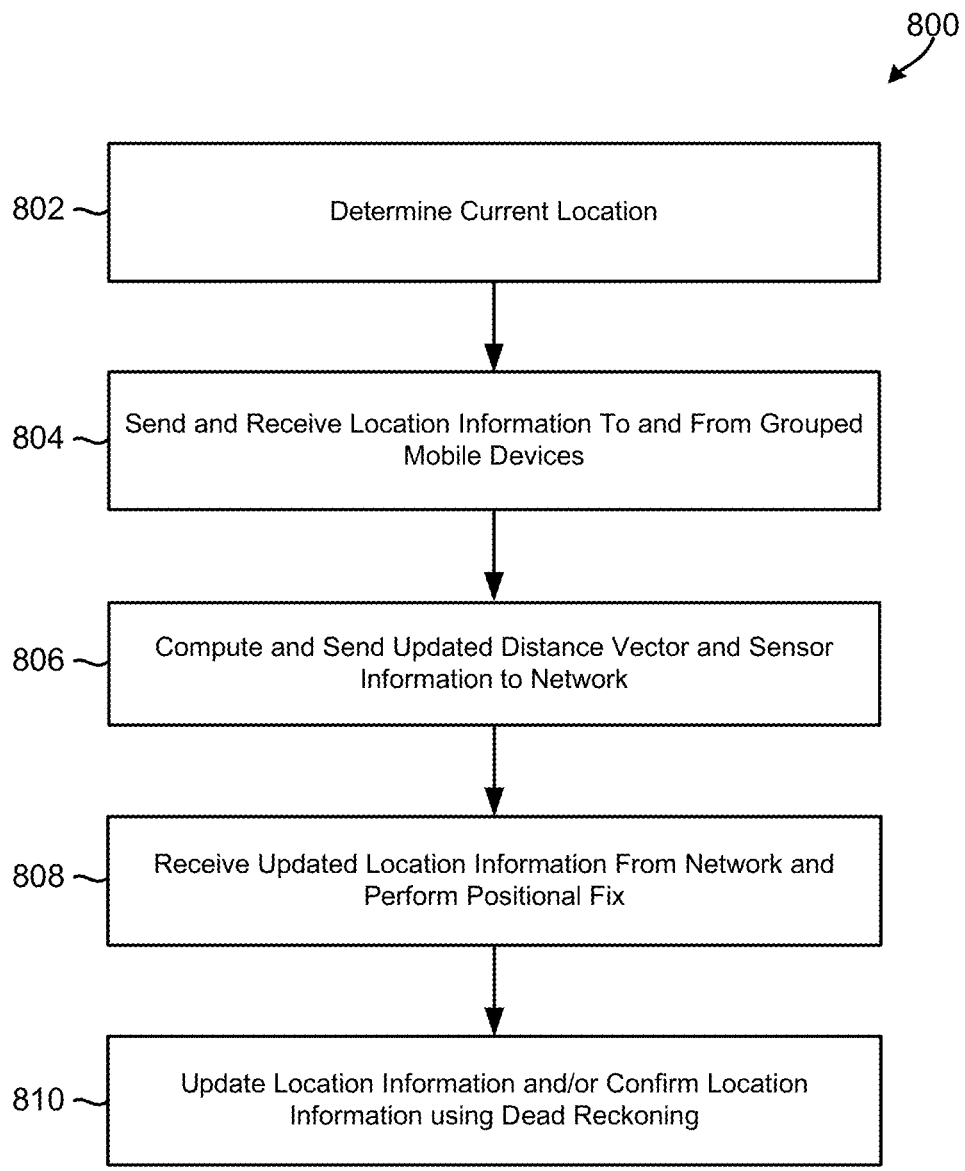
FIG. 8 is a process flow diagram illustrating an embodiment mobile device method for determining the location of a mobile device in a wireless network.

FIG. 8 illustrates an embodiment mobile device method 800 for determining the location of a mobile device in a wireless network. In block 802, a mobile device may determine its current location using any of the above mentioned location determination solutions. In block 804, the mobile device may share its location information with other grouped mobile devices and/or receive location information from other grouped mobile devices. In block 806, the mobile device may compute and send updated distance vector and sensor information to a network component for improved positional fix. In block 808, the mobile device may receive updated location information from the network component, and perform its own positional fix based on mobile data information received from the network. In block 810, the mobile device may update its location information and/or confirm its location information using dead reckoning to enhance positional accuracy.

Dead reckoning may provide the needed positional corrections as a local datum method for positioning when GPS or other network related positioning solutions are not available. Additionally dead reckoning may enhance the location position accuracy and precision calculations by providing additional horizontal and vertical datum comparisons.

With dead reckoning, the current position may be deduced (or extrapolated) from the last known position. The dead reckoning accuracy requires a known starting point which either can be provided by the network, GPS, near field communication link, RF beacon, or via another mobile device.

A dead reckoning system may be dependent upon the accuracy of measured distance and heading, and the accuracy of the known origin. However the problem with relying on dead reckoning alone to assist in positional improvement is error accumulation caused by sensor drift (i.e., differences or errors in values computed/collected from one or more sensors). In particular, magnetic, accelerometers and gyroscopes are susceptible to sensor drift. The error accumulation for any of the sensors may increase over undulating terrain, as compared to flat terrain. Bias error and step size error are leading contributors to dead reckoning errors.

Various embodiments may tightly couple the mobile device sensors and continuously recalibrate the sensors to reduce any drift problems caused by unaided dead reckoning. Additionally, as part of the tightly coupling the sensors, any bias drift associated with the sensors (e.g., a gyroscope) may be address by utilizing a kalman filter to reduce the errors from the primary and/or secondary sensors (e.g., gyroscopes).

In various embodiments, the mobile device may be configured to include velocity computations as part of the location determination computations to account for position changes that occur. When a GPS signal is available, the step size (via velocity computation) and compass bias errors may be estimated by an enhanced kalman filter (EKF). Additionally if GPS is available, the compass may also be able to identify slow motion changes due to changes in magnetic inclination. The compass may be relied upon for motion computations in addition to that of accelerometers and gyroscopes, with and without the availability of GPS.

Dead reckoning accuracy degrades with time, requiring regular position updates or positional corrections. Therefore, the mobile device may be configured to not only use its own internal sensors to compute the location/positional information, but may also communicate with other mobile devices to leverage their location/positional information to enhance its own location/positional information. In essence, the mobile devices may act as RF base stations, providing the lateration capability to improve the positional accuracy of other mobile devices.

In an embodiment, a mobile device may be configured to poll one or more other mobile devices to gain a better positional fix on its location.

Mobile devices may be grouped together, either through assignment by the network or through the mobile device acquiring/detecting/connecting to other mobile devices (which may or may not be in the same network) as part of a discovery method for sharing location information.

Location information may be shared via the use of a near field communications system (e.g., Bluetooth®, ultrawideband, peanut radios, etc.), infrared, ultrasonic, and other similar technologies, such as via the use of WiFi. The wireless communications may also be ad hoc or infrastructure based, or based on a TDD system, such as LTE, SD-CDMA, TD-CDMA, or any other TDD methods.

In an embodiment, the mobile device may be configured to initiate the sharing of location/position information in response to receiving a network-driven grouping request from a network component.

In an embodiment, when the mobile device has lost contact with the network, it may attempt to find a suitable mobile device to help in its location determination computations, and for possible connection to the network (e.g., via a relay).

In an embodiment, the mobile device may be configured to send a request for location information to another mobile device. The request may be sent after the authentication process between mobile devices, and may include a time stamp which may be sub-seconds in size (milliseconds). Another mobile device may respond with a message that also has its time stamp and when it received the time stamp from the initiating mobile device.

Several messages (e.g., three messages) may be exchanged quickly between the mobile devices to establish time synchronization and share location/positional information that includes x, y, and z coordinates and a velocity component in each message. The time differences along with the x, y, and z coordinates may be compared with possible pulses or pings to establish an estimated distance vector between the devices.

When the distance vector and the x, y, z coordinates of two mobile devices are known, a point-to-point fix may be established. This process may be repeated for all the mobile devices in a group that has been assigned or created by the mobile device itself. Having multiple distance vectors from other points to the mobile will enhance the positioning accuracy.

A mobile device may be configured to report back to the network location server the distance vectors it has found between different mobiles. The other mobile devices also involved with the positioning enhancement may also report their distance vectors to the network to have their overall position accuracy improved as well.

The positional accuracy is meant to be done in incremental steps and the process will continue until no more positional improvements will be achievable. The positional accuracy improvement threshold may be operator defined, and may be stored in a mobile device memory.

When collecting the distance vectors and other positional information, if the error in position is greater than x % for a lower positional confidence level then no update may be required. As the mobile device receives other sensor data and more than a pre-described distance in any direction or a combined distance vector than the positional update process begins again. However if the x % of positional confidence level is less than desired, additional positional updates may be made with the mobile devices grouped together in an interactive process to improve the confidence level of the positional information.

It is important to note that typical positional location methods that are used currently by the network are not necessarily replaced with above-described positional lateration. Instead, the hybrid lateration method may be used in various embodiments to augment the positioning accuracy and confidence for network based position request due to boundary changes or paging requests or other position/location triggered events.

Figure 9A:
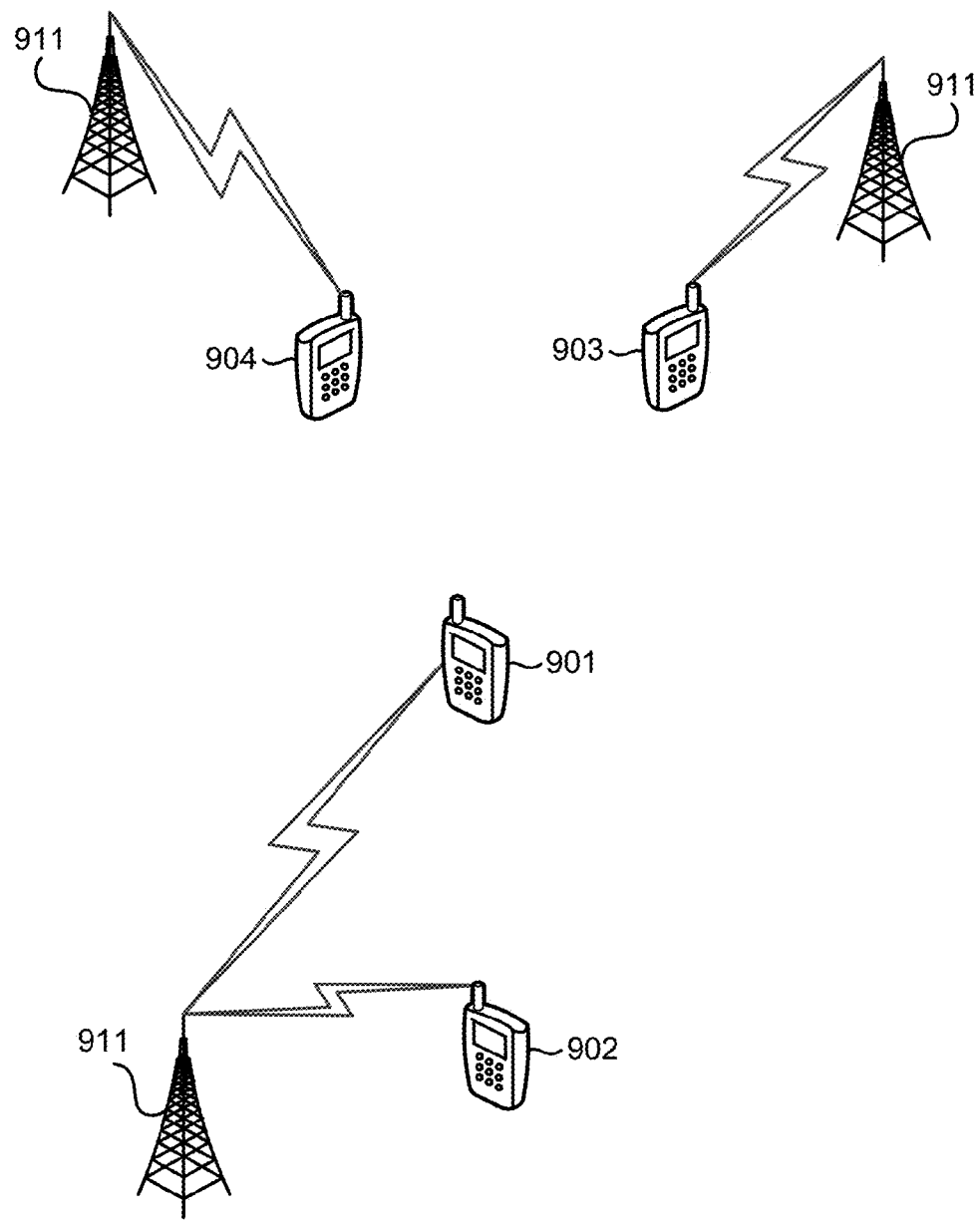
FIGS. 9A-9E are component block diagrams illustrating various logical and functional components, information flows and data suitable for use in various embodiments.

FIGS. 9A-9E illustrate various logical components, information flows and data suitable for use in various embodiments. FIG. 9A illustrates that mobile devices 901, 902, 903, and 904 are communicating with the wireless network via multiple cell sites/radio access points/eNodeBs 911. The mobile devices 901, 902, 903, and 904 may compute a relative fix on their initial location using any of the location determination solutions discussed above. A first mobile device 901 may be instructed to find and communicate with the other mobile devices 902, 903, and 904, and/or any or all of mobile devices 902, 903, and 904 may be instructed to communicate with the first mobile device 901. The mobile devices 901, 902, 903, and 904 may be grouped together (e.g., via one of the grouping methods discussed above). The network may also designate one of the mobile devices 901 (e.g., a mobile device having a high position confidence) to be used as the reference or beacon for the other mobile devices 902, 903, and 904 within the group of mobile devices 901, 902, 903, and 904.

Figure 9B:
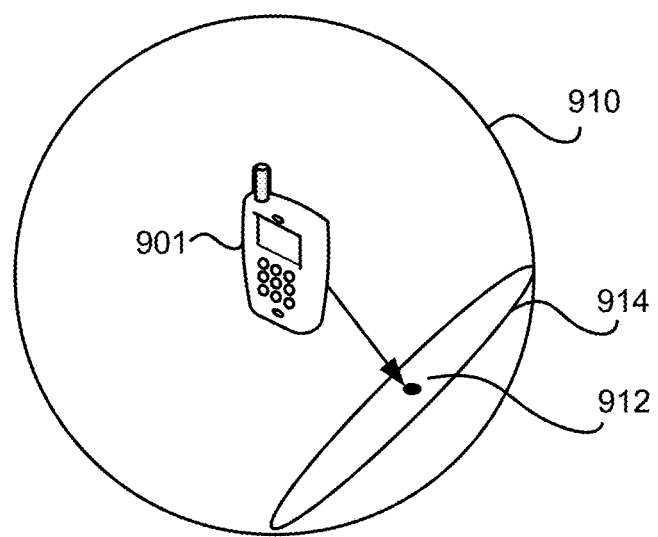

FIG. 9B illustrates that a combination of circular and hyperbolic trilateration operations may be performed as part of an embodiment location determination solution. For example, if any of the coordinate data provided by the sensors and/or mobile devices is in latitude and longitudinal coordinates, it may be converted to Cartesian coordinates to facilitate a hybrid lateration calculation. In the example illustrated in FIG. 9B, the mobile devices 901 has been designated as reference mobile device, reference number 912 identifies the position to be determined/computed (i.e., with a high level of accuracy) with respect to mobile device 901, reference number 910 identifies a three dimensional sphere that encompass the mobile device 901, and reference number 914 identifies an area of the three dimensional sphere (with x, y, and z coordinates) within which the device exists.

Figure 9C:
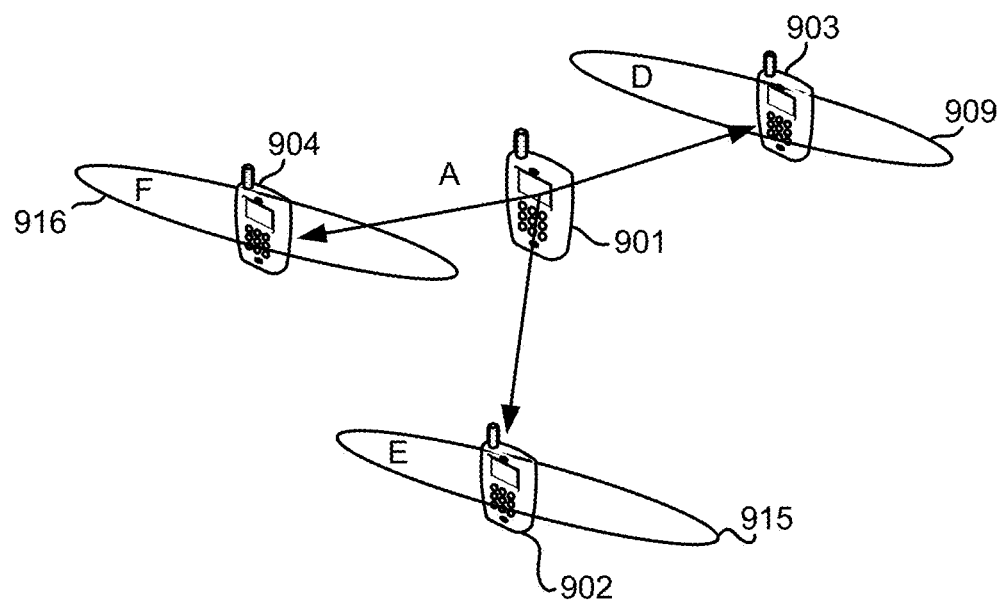
Figure 9D:
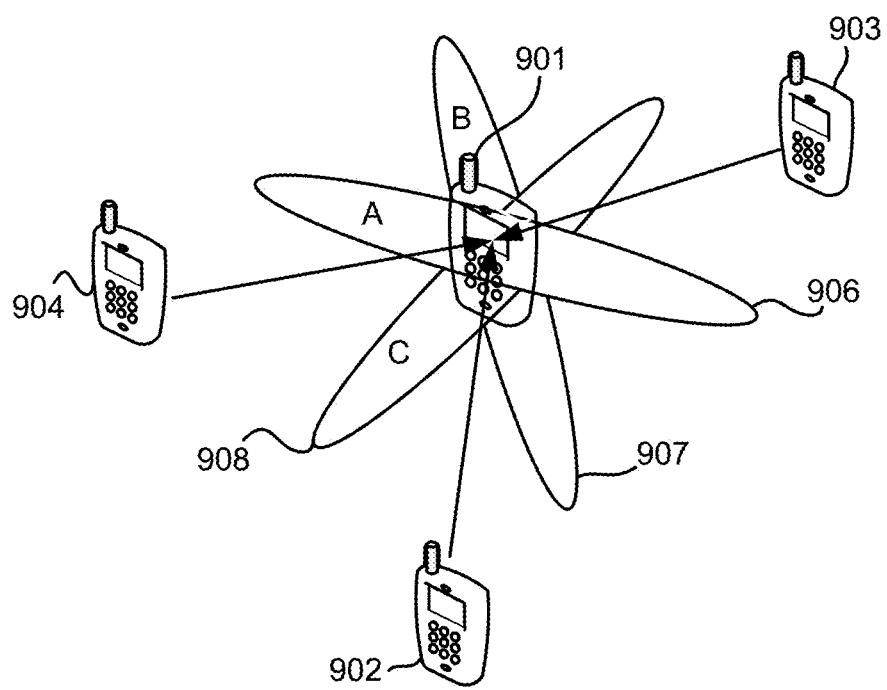

FIG. 9C-9D illustrate that distance vectors may be computed between the mobile devices 901, 902, 903, and 904 as part of an embodiment location determination solution. In FIG. 9C mobile 901 using the hybrid trilateration method determines is relative position with respect to mobile devices 902, 903, and 904 respectively. Additionally, reference numbers 915, 909, and 916 identify the relative areas of mobile devices 902, 903, and 904, respectively. As part of the hybrid trilateration operations of the embodiment location determination solution, mobile devices 902, 903, and 904 may locate mobile device 901, and the mobile device 901 may compute a distance vector between itself and mobile devices 902, 903, and/or 904. The mobile device 901 may initiate communications with mobile device 902 (although mobile device 902 could initiate the communication) and exchange time stamps, positional information, sensor data. The same process may occur with respect to mobile devices 904 and 903, in which positional and sensor information is exchanged.

As illustrated in FIG. 9D, the mobile devices 902, 903, and 904 may establish a distance vector between themselves and mobile device 901. The same process may occur with respect to mobile devices 902, 903, and/or 904, in which positional and sensor information is exchanged. Where mobile device 902 undergoes the same process as that done with mobile device 901 as part of the hybrid trilateration process, mobile device 901 may use mobiles 902, 903, 904 to enhance it positional information and mobile device 902 may use mobiles 901, 903, and 904 to enhance its positional information, and so forth for all the mobile devices that are grouped together.

The three circles or ellipses 909, 915, and 916 illustrated in FIG. 9C and the three circles or ellipses 906, 907, and 908 illustrated in FIG. 9D do not intersect at a given point, but span an area of a particular size depending on the range involved.

Figure 9E:
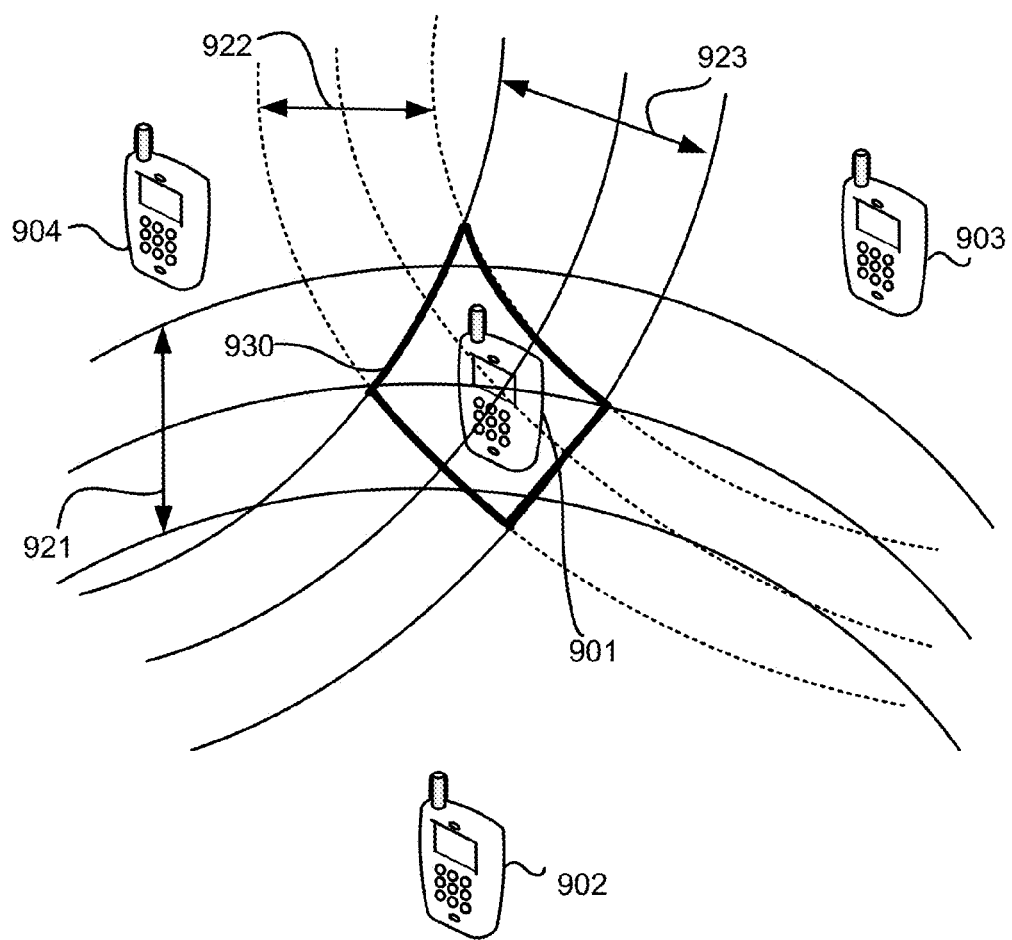

FIG. 9E illustrates an embodiment hybrid trilateration method in which the position of mobile device 901 is validated or improved upon. As part of the hybrid lateration method, a separate calculation operation may be required for each x, y, and z coordinates, in addition to accounting for velocity. However, the ability to have three mobile devices 902, 903, and 904 locate mobile device 901 may present an error window (or an error area) for each coordinate plane represented by reference number 930. The error window/area may be a combination of range errors from the mobile devices 902, 903, and 904. Contributing to the error window/area is the hybrid range errors illustrated by reference numbers 921, 922, and 923, where: reference number 921 is the hybrid range error associated with mobile device 902; reference number 922 is the hybrid range error associated with mobile device 903; and reference number 923 is the hybrid range error associated with mobile device 904. Additionally this process can be done with less or more mobile devices than used in the above example.

For each axis (x, y, or z), a similar process occurs where the error area 930 is a combination of determining the range between the other mobile devices and mobile device 901. The hyperbolic lateration is a typical calculation method used in location based systems and is based on the principal that the range between two locations is the same. However the range determined for the points may not be constant since both can be moving toward, away or together at a similar velocity and trajectory.

With the hybrid lateration method proposed a corrective distance vector Δx, Δy, Δz is used that can be used to apply to the estimated position.

The three circles or ellipses 909, 915, and 916 illustrated in FIG. 9C and the three circles or ellipses 906, 907, and 908 illustrated in FIG. 9D do not intersect at a given point, but span an area of a particular size depending on the range involved. Therefore range is "r" and is denoted by the subscript representing the distance vector involved. Thus:

$$r = p_i + \text{error}$$

The pseudo range $p_i$ deviated from the actual range in any axis due to the inaccuracy in synchronization or propagation in a multipath environment or due to sensor induced errors. Where the distance vector accounting for change in direction is:

$$r_i = \sqrt{(X_i - x)^2 + (Y_i - y)^2 + (Z_i - z)^2}$$

Three range calculations are then averaged to determine the distance vector that is used. If the previous range calculation $r_j$ as compared to that of the current calculation has an error in excess of a user defined percentage or variance, then the new measurement is disregarded. Included with the distance vector validation may be the fusion sensor information where expected position vector calculated may be included for the confidence interval.

$$\text{Range difference} = d_{ij} = r_i - r_j$$

An iterative process may be used for position improvement, which may include the use of a least squares calculation fit to approximate the position solution in a step wise basis. The process may continue until the range difference measured does not produce any noticeable accuracy improvement, which may be user-defined, either at the mobile device or network or both.

The multi-lateration calculations may include estimating a location of a mobile device based upon estimated distances to three or more measurement locations (i.e., locations of three other mobile devices or wireless transceivers). In these calculations, the estimated distance from a measurement location (location of another mobile device) to the mobile device may be derived from the measured signal strength. Since signal strength roughly decreases as the inverse square of the separation distance, and the transmission power of the mobile device can be presumed, the distance $d_i$ can be simply calculated as:

$$d_i = \sqrt{(S_0/S_i)}$$

where:

$d_i$ is the estimated separation distance between a measurement location and the mobile device;

$S_i$ is the measured signal strength; and $S_0$ is the strength of the signal transmitted by the other mobile device.

Alternatively, the signal strength readings may be translated into distances using a path loss model, such as the following:

$$RSSI_i = a - cb \log_{10}(d_i)$$

where:

a is the signal strength at $d_i = 1$ meter;

b is the path loss exponent; and c is the pathloss slope with 20 being used for free space.

The lateration operations may include performing a least squares computation, which may accomplished by a processor calculating the following formula:

$$\min_{(x,y)} \Sigma (d_i - \|MS_i - (x,y)\|)^2$$

where:

$d_i$ is the distance calculated based on a measured signal strength value;

$MS_i$ corresponds to the known location/position of the mobile device; and the minimization value of (x, y) is the estimated position of other mobile devices.

Figure 10:
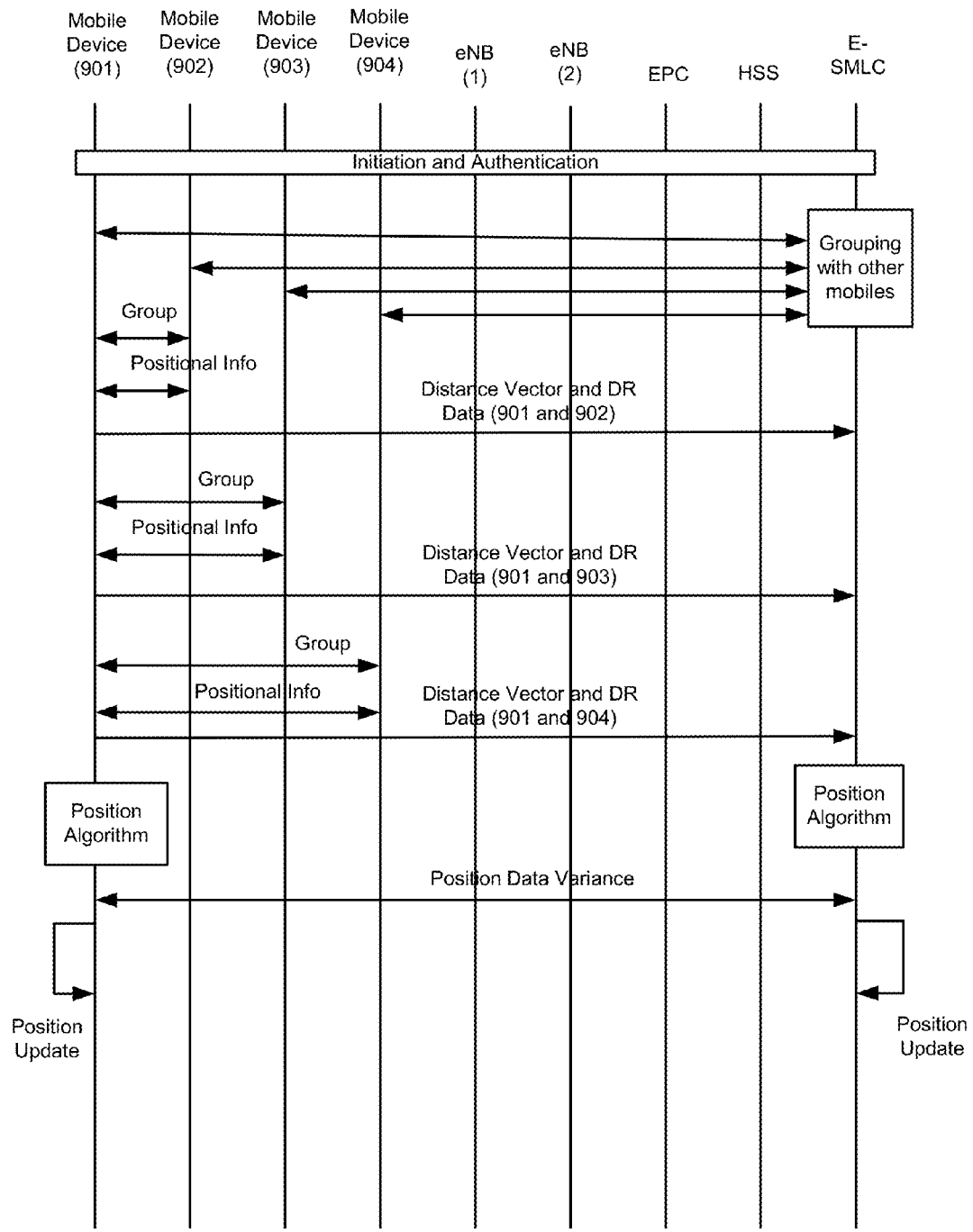
FIG. 10 is a sequence diagram illustrating an embodiment hybrid lateration method by which mobile devices may gain access to the network.

FIG. 10 illustrates an embodiment hybrid lateration method 1000 in which mobile devices may gain access to the network. The mobile devices may be instructed to be grouped by the network. Mobile devices 901 and 902 may initiate sharing of information for position/location, either due to the network driven grouping request or when the mobile device has lost contact with the network and attempts to find a suitable mobile device to help in its position/location and possible connection to the network via a relay or to another network.

Mobile device 901 may send a request for position information to mobile device 902. The information may be sent after the authentication process between mobile devices, and may include a time stamp. The time stamp may be sub seconds in size (e.g., milliseconds). The mobile device 902 may respond with a message that also has a time stamp, and timing information pertaining to when the mobile device 902 received the time stamp from mobile device 901. Three messages may be transferred quickly to establish time synchronization. The time differences may then be compared, along with possible pulses or pings, to establish an estimated distance vector between the mobile devices. Knowing the distance vector and the x, y, and z coordinates of both 901 and 902, a point-to-point fix may be established.

The mobile device 901 may then initiate communication with mobile devices 903, 904 and repeat the operations discussed above with respect to mobile device 902 for each of mobile device 903, 904. After obtaining two or more distance vectors along with positional information, the mobile device 901 may compare the new coordinates to its previously computed current location, and adjust the location computations accordingly.

The positional information distance vectors may be sent to the network for positional processing with other network positional information. Based on the position calculated for the mobile device, the network (i.e., a component in the network, such as a network server or E-SMLC) may instruct the mobile device to adjust its positional information.

Additionally the mobile device 901 may also make a positional correction if the network either does not respond in time, which may result in a message update time out. Alternatively, when the network cannot make the necessary correction, and the positional information may be used by another component and/or other mobile devices to perform the necessary corrections.

If the error is greater than x % for a lower positional confidence level then no update is required. As the mobile receives other sensor data and more than a pre-described distance in any direction or a combined distance vector than the positional update process begins again. If the x % of positional confidence level is less than desired, additional positional updates may be made with the grouped mobile devices (e.g., iteratively) to improve the confidence level of the positional information. Additionally if the positional information from one of the mobile devices that is being attempted to obtain a distance vector appears to be in error, then that mobile devices data may be selected to not be used for this iterative step of performing positional updates with other grouped mobile devices. However it will continue to be queried as part of the process since its position/location could be corrected in one of the steps it is taking to improve its position/location as well.

Additionally, in the event that one or more mobile devices lose communication with the core network it will still be possible to maintain position accuracy through one of the other grouped mobile devices. It will also be possible to continue to maintain a communication link by establishing a network relay connection with another of the mobile devices in the same group which still has communication with the network itself.

Figure 11:
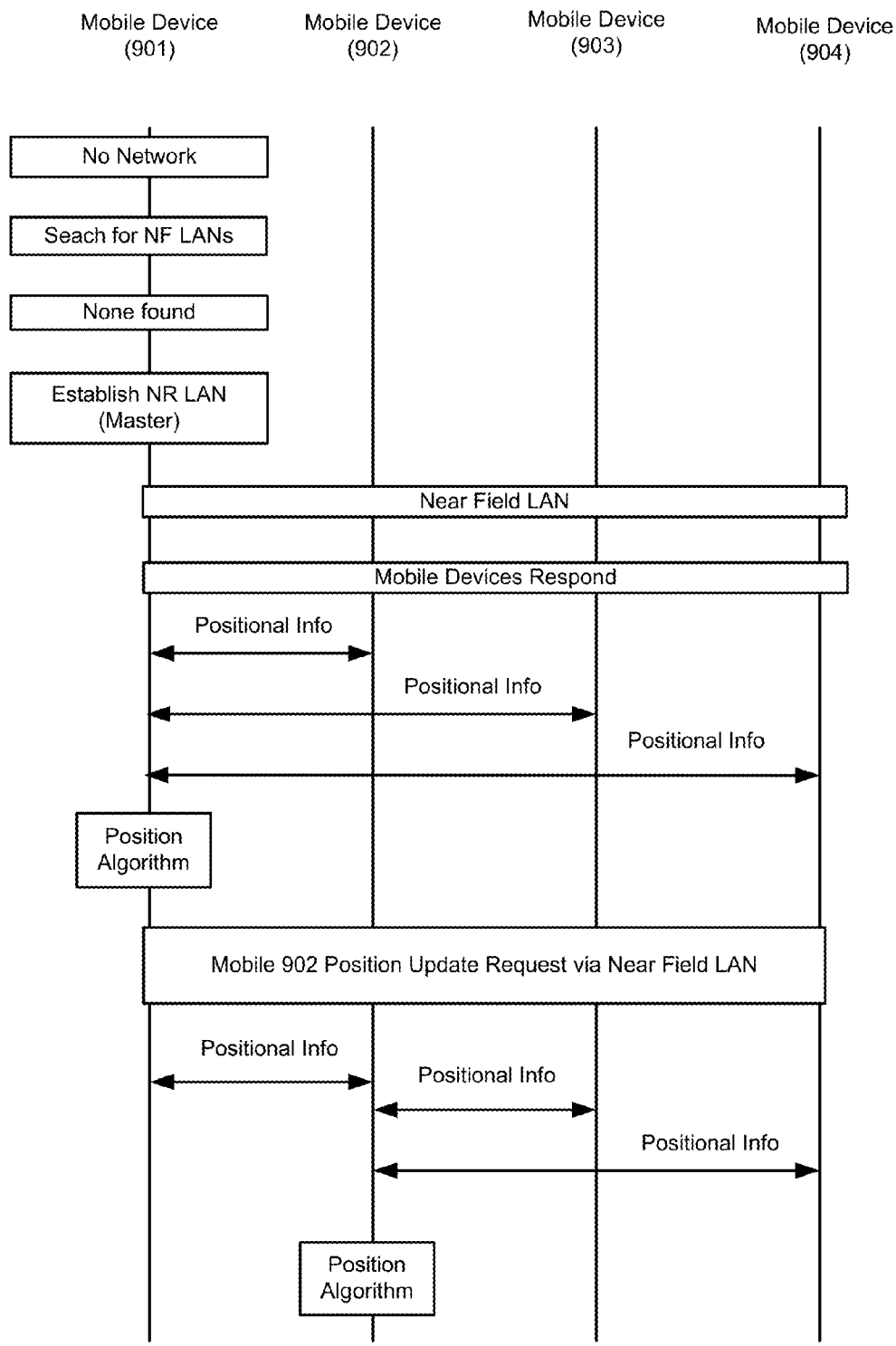
FIG. 11 is a sequence diagram illustrating another embodiment hybrid lateration method in which a mobile device cannot locate a network due coverage problems.

FIG. 11 illustrates another embodiment hybrid lateration method in which a mobile device cannot locate a network due to coverage problems. The mobile device 901 may operate in an autonomous mode and attempt to locate another mobile device. The other mobile device could be used to relay information to the network and possibly set up a near field communication bridge in addition to providing location enhancement capability.

In the example illustrated in FIG. 11, mobile device 901 establishes a near field LAN inviting other mobile devices in proximity to communicate with it. Positional information can then be shared and the mobile device 901 can have its location improved and the positional information can be relayed back to the core network via another mobile device.

The mobile device 901 may also communicate its positional information and establish near field communication link with a mobile device that is not part of the home network associated with mobile device 901.

The mobile devices may have the USIM, SIM, PRL or access point information pre-built in. The mobile device for first responders may have the incident radio system set as their preferred system, or in the case that the radio access system being used as a public safety network.

For first responders to utilize a wireless mobile network (e.g., LTE) the position/location information accuracy needs to improved for in building environments in addition to providing more accurate location information about where the mobile devices are actually located. Whether the mobile device is used by a first responder, commercial cellular user, or a combination of both.

The positional location improvement for first responders may be helpful to improve situation awareness, improved telemetry and overall communication with the incident commander. Since all incidents for first responders tend to be fluid the ability to account for a dynamic environment of mobile devices coming into and out of the incident area. In addition the mobile devices proximity location to other mobile devices can and will change as the incident situation changes where resources are added and/or reassigned as the need arises for operational requirements.

The use of network and terminal driven position enhancement techniques previously discussed may be exploited. The grouping of mobile devices may be done either as part of pre-plan, with intervention by the incident commander or driven from the commercial wireless network, public safety wireless network, or local incident communication system (ICS) 1204 based on reported proximity of the mobile devices.

Figure 12A:
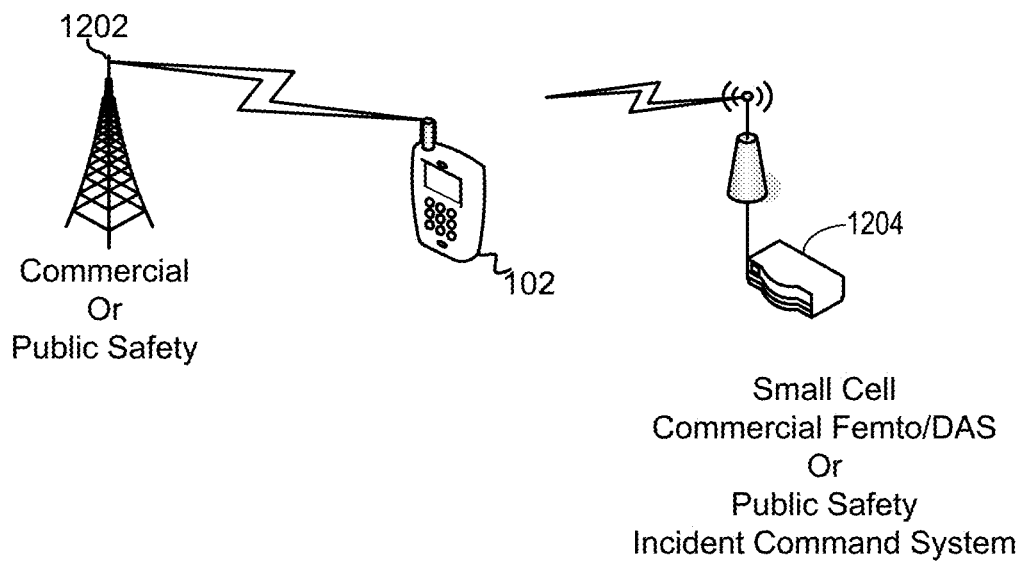
FIGS. 12A-12C are component block diagrams illustrating functional components, communication links, and information flows in an embodiment method of transferring a connection from a local radio system to the small cell system.

FIG. 12A illustrates that upon arriving at the incident scene, a mobile device 102 may recognize the existence of a local radio network 1202. If there is no ICS radio network 1204 with which the mobile device may connect, the mobile device 102 will continue to communicate via a commercial or other wireless network, 1202.

Figure 12B:
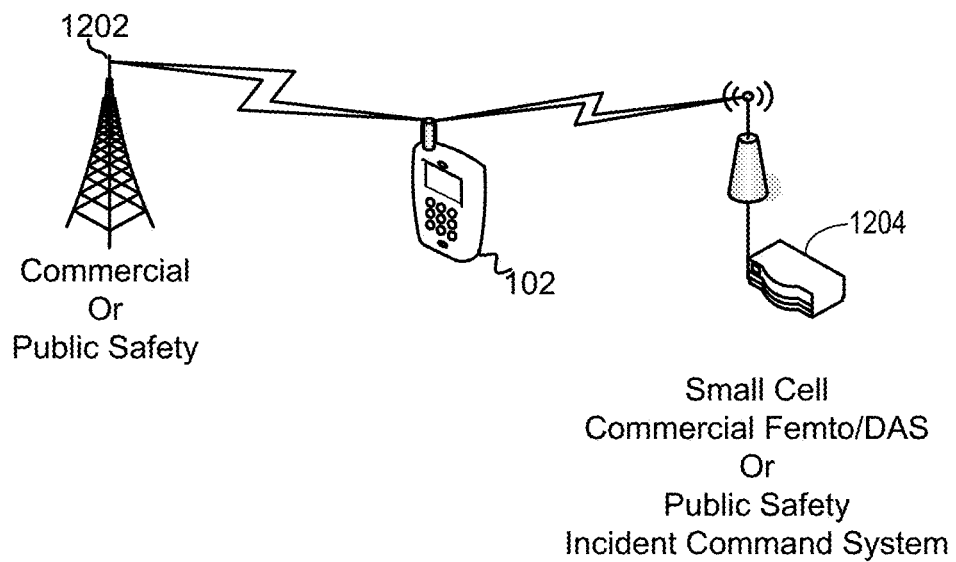

FIG. 12B illustrates that the mobile device 102 may determine that there is a valid local radio system 1202 with which it may communicate, and may have a priority access to small cell system 1204 based on a preferred network and cell selection process the mobile device 102 has been instructed to use.

Figure 12C:
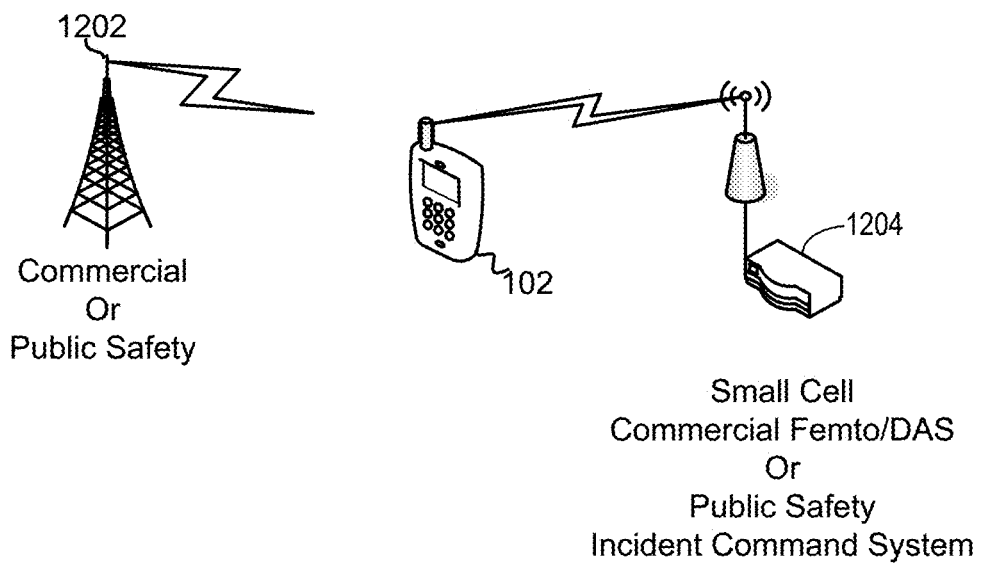

FIG. 12C illustrates that the mobile device 102 may transfer the connection from the local radio system 1202 to the small cell system 1204.

For first responders when a situation arises that requires finding a man down or responding to an emergency call (911) the location based process can be used to help in the search and rescue of the person.

Figure 13A:
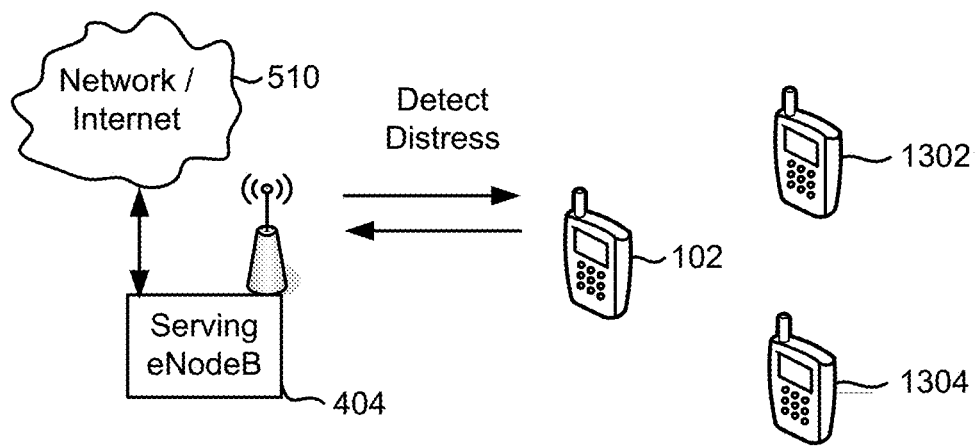
FIGS. 13A-13C are component block diagrams illustrating functional components, communication links, and information flows in an embodiment method of identifying and responding to a distressed mobile device.

FIG. 13A illustrates that the mobile device 102 may be identified by the network as being in distress via network monitoring of the mobile device 102 or via the mobile device transmitting a distress signal. The distressed mobile device 102 may determine that it has lost communication with the network, and may instruct the wearer/user to either disable or initiate a distress signal. The mobile device 102, upon initiation of a distress signal, may begin a grouping process previously defined.

Figure 13B:
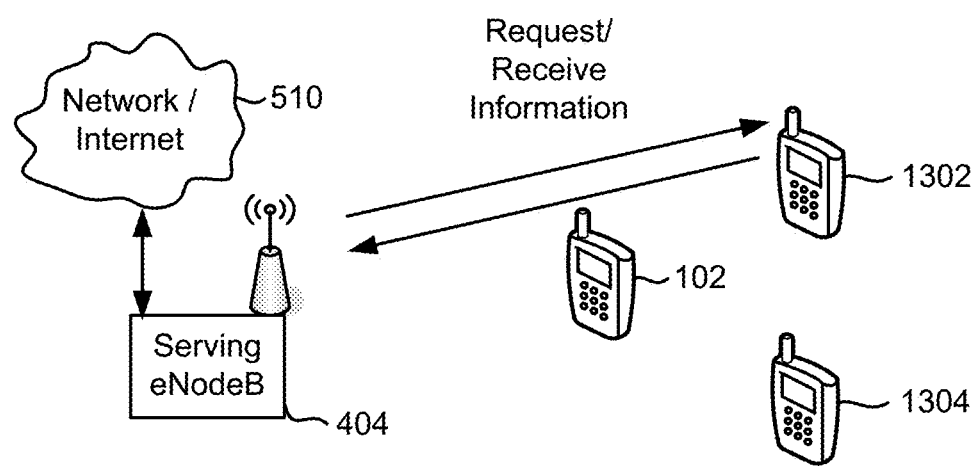

FIG. 13B illustrates that the network 510 to which the serving eNodeB 404 is connected to may instruct a mobile device 1302 in the same group as the distressed mobile device 102 to report the last known location of the mobile device 102 and time stamp.

Figure 13C:
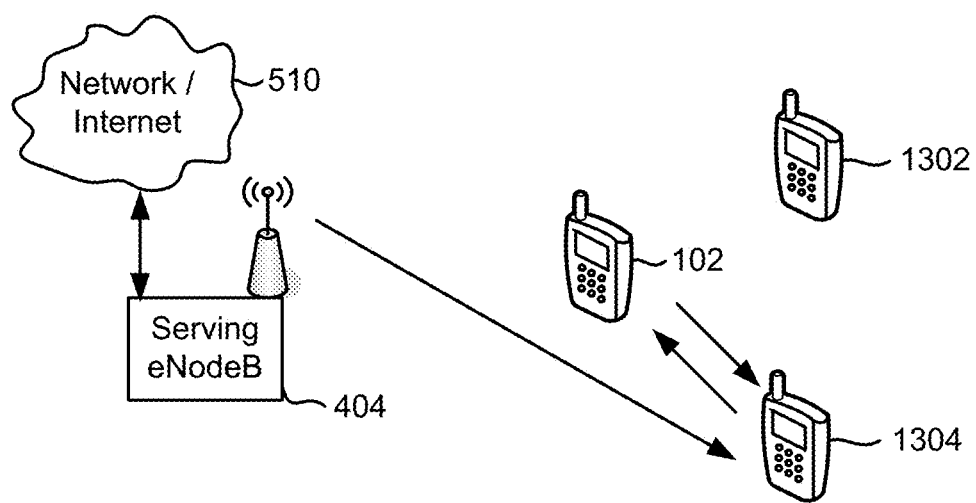

FIG. 13C illustrates that the network 510 may instruct additional mobiles devices 1304 to attempt to group with the distressed mobile device 102.

Figure 14:
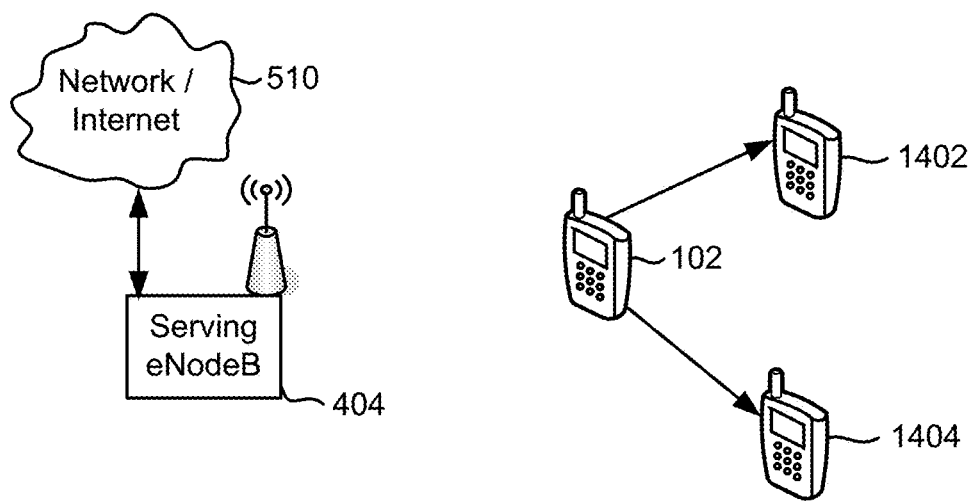
FIG. 14 is a component block diagrams illustrating functional components, communication links, and information flows in an embodiment method of performing dead reckoning grouping mobile devices in an ad-hoc scheme.

FIG. 14 illustrates that when the mobile device 102 is unable to communicate with the network 510, it may be operating under a dead reckoning process and continue to attempt to locate other mobile devices 1402, 1404 and group with them under an ad-hoc scheme.

Once the mobile device has been grouped, or is still connected to the network, the relative location of the mobile device will be sent to all the mobile devices that are in active search for that mobile device. The selection of which mobile devices will be searched may be determined by operator intervention and selection.

Figure 15:
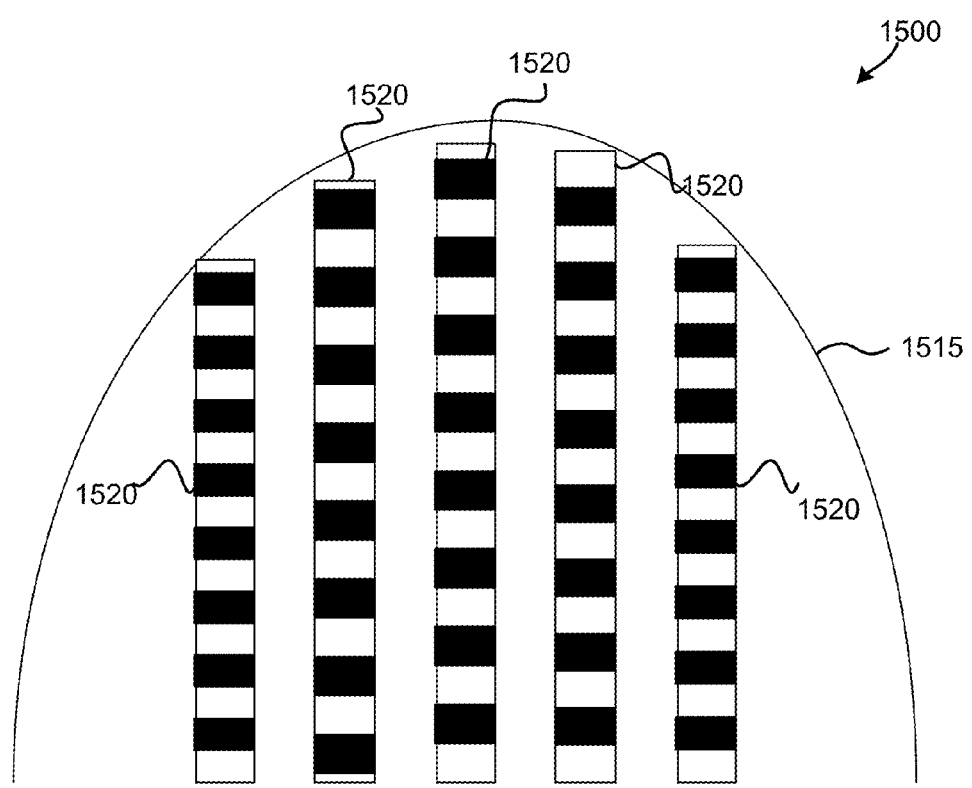
FIG. 15 is an illustration of an enhanced antenna that may be used with various embodiments to further improve positional accuracy.

FIG. 15 illustrates an embodiment enhanced antenna scheme 1500 that may be used by wireless network operators or first responders to improve the positional accuracy for the mobile device. The enhanced antenna scheme 1500 may include a radome 1515 that is curved over a series of patch antennas 1520. Several antennas 1520 may be used achieve better angle of arrival measurement. In an embodiment, the enhanced antenna scheme 1500 may include an array of antennas 1520 on flexible circuit boards so they can conform to the radome 1515.

Figure 16A:
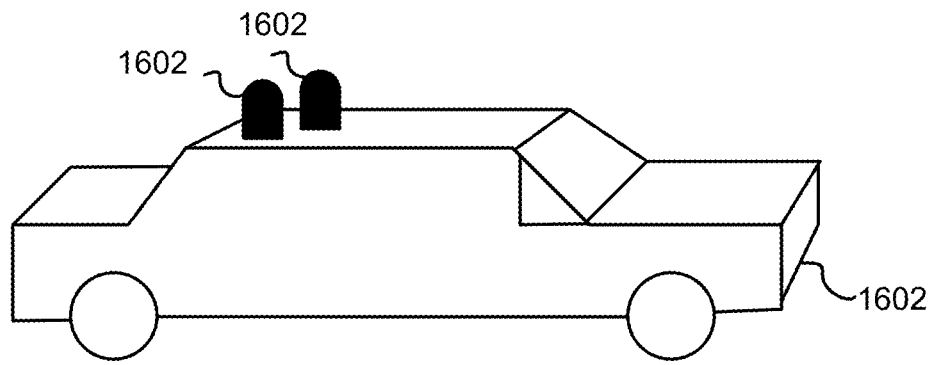
FIG. 16A-B are illustrations of various enhanced antenna configurations that may be used with the various embodiments to further improve positional accuracy.
Figure 16B:
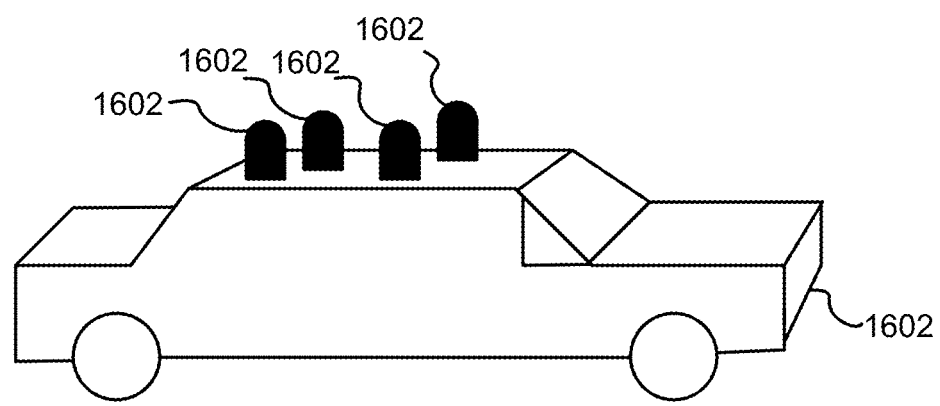

FIG. 16A-B illustrate that the above mentioned enhanced antenna scheme 1500 may be implemented on a vehicle 1602. Specifically, FIG. 16A illustrates an enhanced antenna scheme 1500 that includes two antennas 1602 for this purpose. FIG. 16B illustrates an enhanced antenna scheme 1500 that includes four antennas 1602 for this purpose. Each antenna 1602 may include an array of antennas 1520 on flexible circuit boards so they can conform to the radome 1515.

Figure 17A:
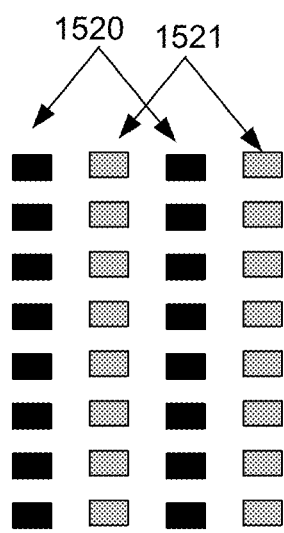
FIG. 17A-B are sectional diagrams illustrating strips of antenna patches that may be used in various embodiments.
Figure 17B:
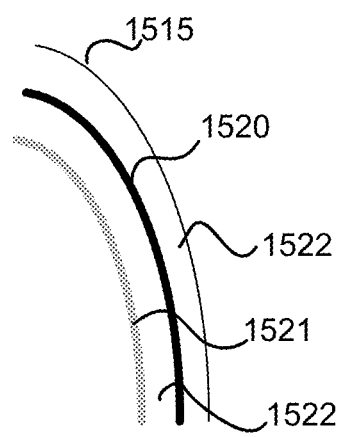

FIG. 17A-B illustrate strips of antenna patches that may be used in various embodiments. FIG. 17A illustrates two strips of antenna patches 1520 and 1521 next to each other in an antenna array (which may be on a flexible circuit board so they conform to a radome). FIG. 17B is an illustration of a cross sectional view of the radome 1515 in which the antenna patches 1520 and 1521 of the antenna array are shown layered. The antenna patch 1520 is closer to the outer radome cover 1515 than is antenna array 1521. A fiber glass or a transparent RF medium 1522 may provide rigidity and enable the antennas to be closely spaced. The antenna array may be cone shaped using a flexible circuit design (for receive only configurations). Envelope detectors may be used to determine which of the antenna patches are receiving the highest quality signal from the mobile device using an amplitude method for detection.

In an embodiment, the detection and tracking of a mobile device may be controlled so that the measurements are in-sync with an eNodeB pulse request to the mobile device for positional information.

Figure 18:
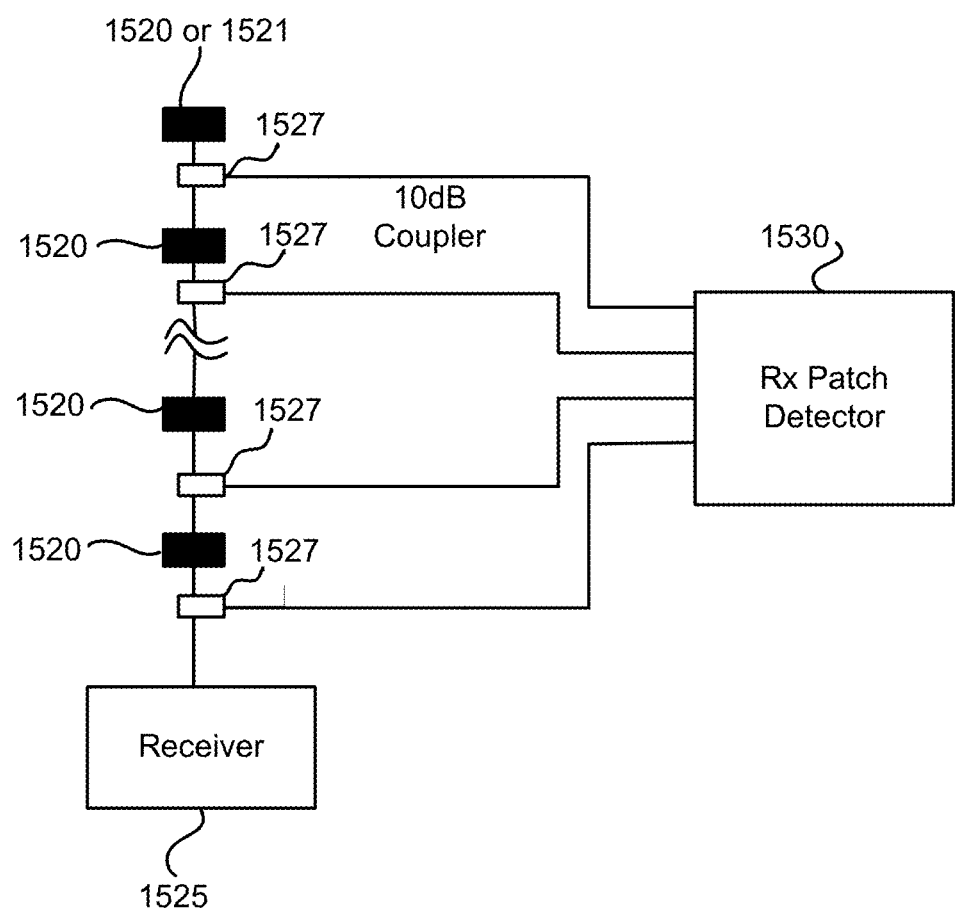
FIG. 18 is a circuit diagram of antenna system suitable for use with various embodiments.

FIG. 18 illustrates an antenna array (1520 or 1521) in which the antenna system is connected to the normal antenna port on a receiver (e.g., eNodeB) 1525. Each of the patch antennas may be matched to a 10 db coupler 1527 and configured to provide a port coupling to a receive patch detector 1530. The receive patch detector 1530 may be configured to determine which patch antenna has the strongest signal, and based on the number of patch antennas and the distance calculation, another altitude measurement may be made by the mobile device.

In an embodiment, the antenna array system may not be connected to the eNodeB receiver 1525 and control coordination may be provided by the E-SMLC for synchronization of the received signal from the mobile device.

Figure 19:
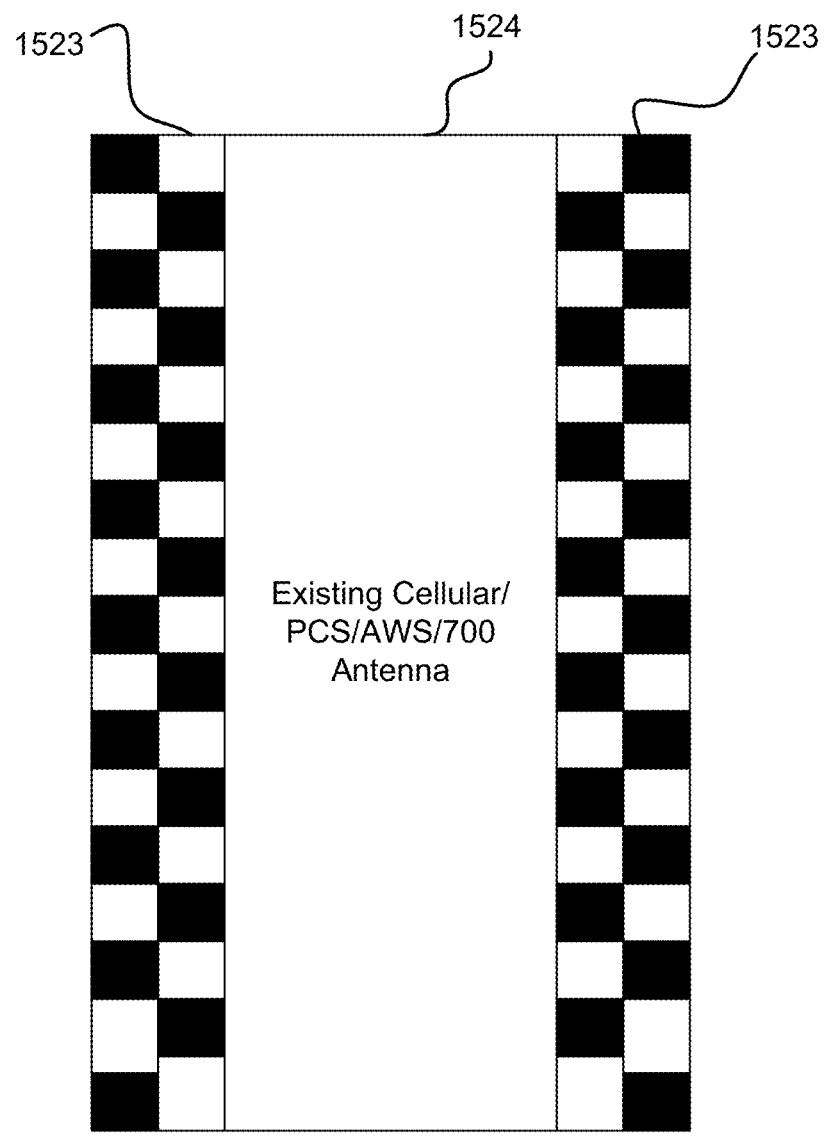
FIG. 19 is an illustration of an embodiment antenna array retrofitted into an existing cellular wireless network in accordance with an embodiment.

FIG. 19 illustrates an embodiment antenna array 1523 retrofitted into an existing cellular wireless network. The array 1523 may be installed in parallel to an existing antenna 1524. A control mechanism that is the same as or similar to the control mechanism illustrated in FIG. 18 may be used for the commercial applications.

Figure 20:
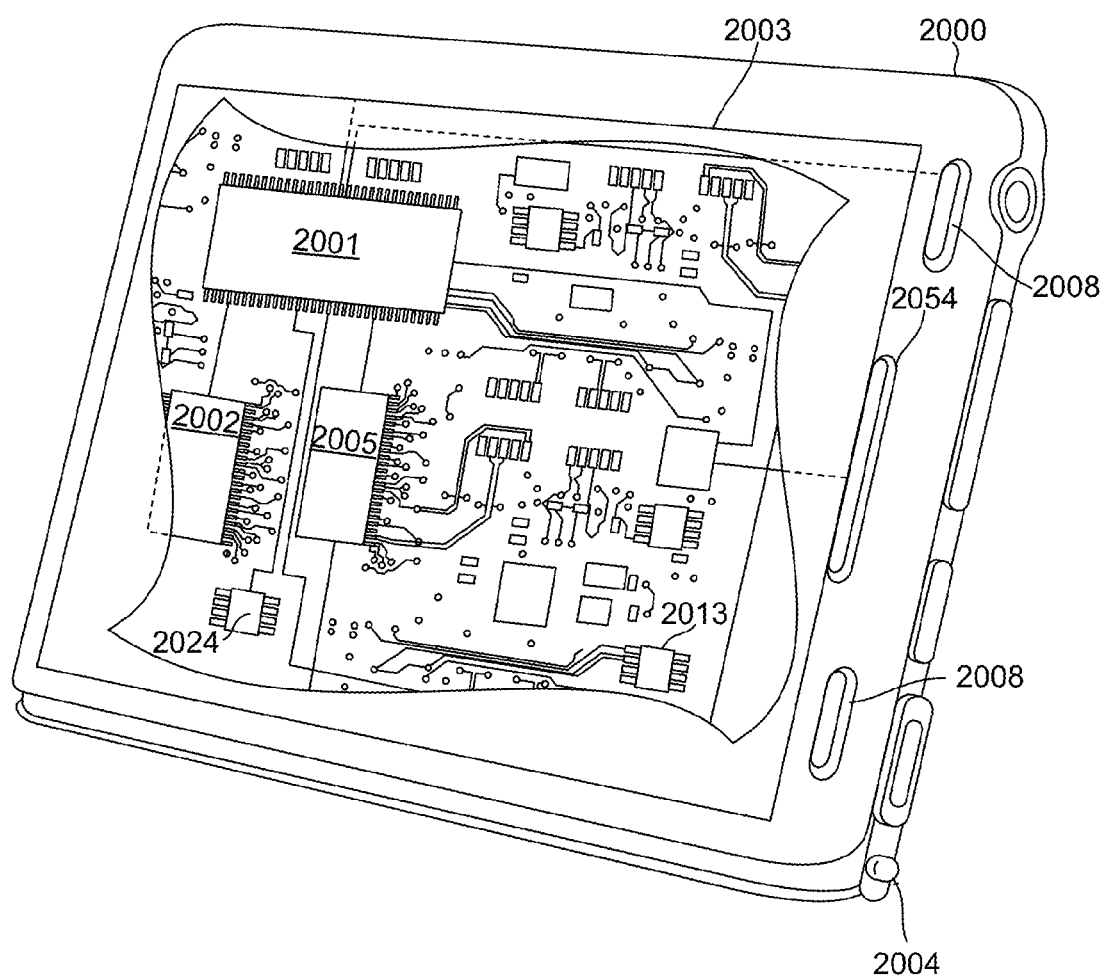
FIG. 20 is a component block diagram of a mobile device suitable for use with an embodiment.

The various embodiments may be implemented on a variety of mobile computing devices, an example of which is illustrated in FIG. 20. Specifically, FIG. 20 is a system block diagram of a mobile transceiver device in the form of a smartphone/cell phone 2000 suitable for use with any of the embodiments. The cell phone 2000 may include a processor 2001 coupled to internal memory 2002, a display 2003, and to a speaker 2054. Additionally, the cell phone 2000 may include an antenna 2004 for sending and receiving electromagnetic radiation that may be connected to a wireless data link and/or cellular telephone transceiver 2005 coupled to the processor 2001. Cell phones 2000 typically also include menu selection buttons or rocker switches 2008 for receiving user inputs.

A typical cell phone 2000 also includes a sound encoding/decoding (CODEC) circuit 2024 which digitizes sound received from a microphone into data packets suitable for wireless transmission and decodes received sound data packets to generate analog signals that are provided to the speaker 2054 to generate sound. Also, one or more of the processor 2001, wireless transceiver 2005 and CODEC 2024 may include a digital signal processor (DSP) circuit (not shown separately). The cell phone 2000 may further include a peanut or a ZigBee transceiver (i.e., an IEEE 802.15.4 transceiver) 2013 for low-power short-range communications between wireless devices, or other similar communication circuitry (e.g., circuitry implementing the Bluetooth® or WiFi protocols, etc.).

Figure 21:
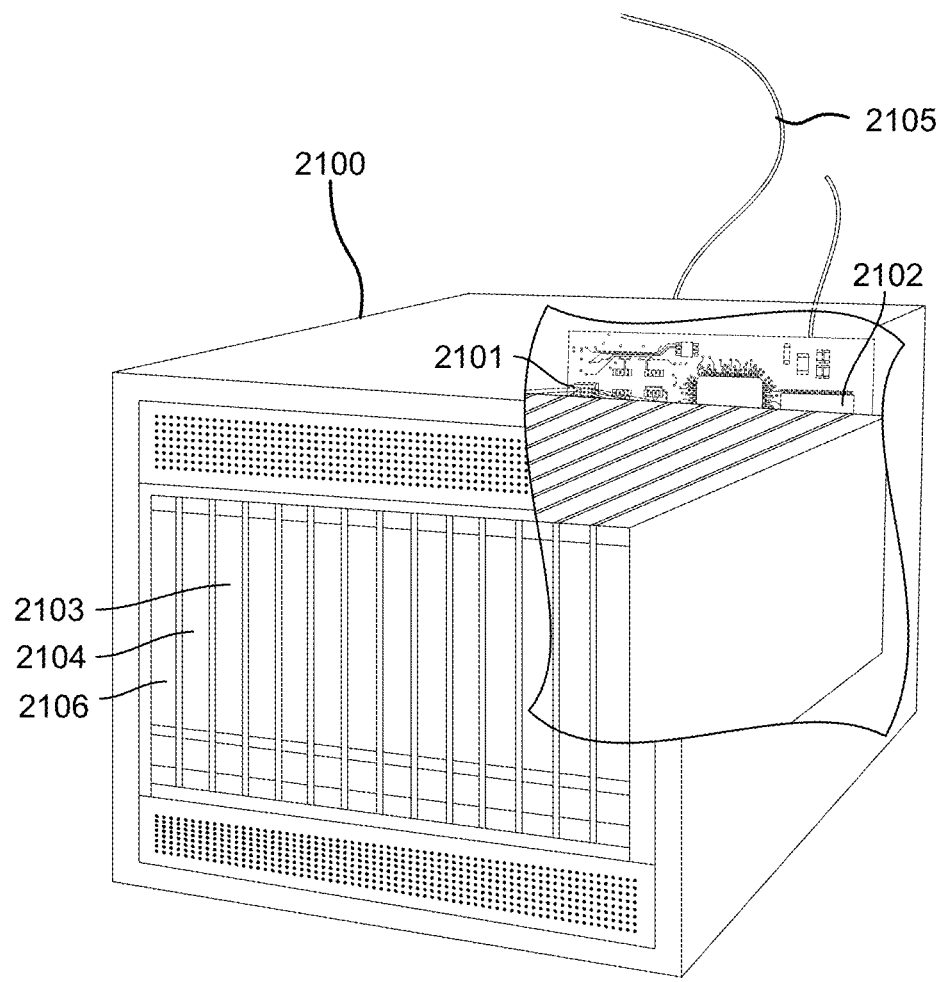
FIG. 21 is a component block diagram of a server suitable for use with an embodiment.

Various embodiments may be implemented on any of a variety of commercially available server devices, such as the server 2100 illustrated in FIG. 21. Such a server 2100 typically includes one or more processors 2101, 2102 coupled to volatile memory 2103 and a large capacity nonvolatile memory, such as a disk drive 2104. The server 2100 may also include a floppy disc drive, compact disc (CD) or DVD disc drive 2106 coupled to the processor 2101. The server 2100 may also include network access ports 2106 coupled to the processor 2101 for establishing data connections with a network 2105, such as a local area network coupled to other communication system computers and servers.

The processors 2001, 2101, and 2102 may be any programmable microprocessor, microcomputer, or multiple processor chip or chips that can be configured by software instructions (applications) to perform a variety of functions, including the functions of the various embodiments described below. In some mobile devices, multicore processors 2102 may be provided, such as one processor core dedicated to wireless communication functions and one processor core dedicated to running other applications. Typically, software applications may be stored in the internal memory 2002, 2103, and 2104 before they are accessed and loaded into the processor 2001, 2101, and 2102. The processor 2001, 2101, and 2102 may include internal memory sufficient to store the application software instructions.

The wireless (or mobile) device location determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Frequency Division Multiple Access (FDMA) network, a Time Division Multiple Access (TDMA) network, an OFDMA network, a 3GPP LTE network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. W-CDMA is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Various embodiments may include enhancements to the current location based service methods and methodologies used for wireless mobile communications, and include improved methods for determining the location of a mobile or wireless device (e.g., mobile device 102).

Commercial and public safety positioning applications are growing in popularity and use, as are other similar services and applications that are based on, or which utilize, precise, accurate, and detailed location information. As a result, it is becoming increasingly important for modern wireless/mobile devices to be able to accurately determine their locations within a wireless network. The various embodiments include mobile devices that are configured to accurately determine their locations within a wireless network to a high degree of confidence/precision.

Public Safety systems are now embarking on the use of commercial cellular technologies, such as the third generation partnership project (3GPP) long-term evolution (LTE), as their communication protocol(s) of choice. As a result, there is a need for improved situation awareness at the site of an incident (e.g., for first responders, mobile device users, etc.). The various embodiments include mobile devices that may be used by first responders for improved situation awareness at the site of an incident. In some embodiments, this may be accomplished by configuring a mobile device to determine its location with a high degree of accuracy and precision.

Under the correct conditions, existing geo-spatial positioning systems, such as GPS systems, provide a good estimate for a mobile device's location. However in many other cases (e.g., in buildings and urban environments) these geo-spatial positioning systems are not available and/or do not generate sufficiently accurate location information. For example, a GPS system may not be able to acquire satellite signals and/or sufficient navigation data to calculate its geospatial location (called "performing a fix") when the device is indoors, below grade, or when the satellites are obstructed (e.g., by tall buildings, etc.). In addition, the presence of physical obstacles, such as metal beams or walls, may cause multipath interference and signal degradation of the wireless communication signals when the mobile device is indoors (or in urban environments that include tall buildings, skyscrapers, etc.). These and other factors often cause existing geo-spatial technologies to function inaccurately and/or inconsistently on mobile devices, and hinder the mobile device user's ability to fully utilize location-aware mobile software applications and/or other location based services and applications.

Similarly, network based solutions for determining the location of mobile device may also not be adequate for locating a mobile device within buildings and/or in urban environments. The introduction of new wireless network systems, such as LTE, has presented some new opportunities and capabilities (e.g., network based solutions). However, despite these advancements, existing solutions are often unable to generate location information with a sufficiently high level of accuracy, precision or detail required to provide enhanced location based services (e.g., applications that improve situational awareness at the site of an incident, etc.).

In some cases, wireless network systems, such as LTE, may be used in conjunction with the public safety band. This combination may allow for excellent coverage in urban and indoor environments. However, using existing solutions, the accuracy and precision of the location information is often limited. For example, location information that is generated via existing network based solutions and/or existing wireless network system technologies often does not include a sufficiently high level of accuracy, precision or detail to provide enhanced location based services (e.g., applications that improve situational awareness at the site of an incident, etc.).

Improving positional location accuracy, confidence and precision in a mobile device has many advantages, particularly when the device is used for emergency location services, commercial location services, internal location services and lawful intercept location services. The various embodiments provide the ability to improve the positional location information for both new and existing wireless networks, and improve the positional location accuracy, confidence and precision in a mobile device.

For commercial applications, a mobile device's ability to generate highly accurate location information (e.g., eLBS information) within a multiple story building, in an urban environment, within a mall, etc. may provide the system with various network radio resource improvements. In addition, eLBS information may also allow for unique advertising targeting capabilities. Moreover, eLBS information may be used for applications related to improved fleet management, asset tracking and various machine to machine communications for which highly accurate location/position information is important. For commercial users, the need for improved position/location information accuracy is most needed for in-building environments where the location of the mobile device can be more accurately pin pointed for location based services. The advantage of law enforcement with improved positional information will enable the tracking of mobile devices inside a building to enable determination of what floor or part of the building the device is being used is located without the need for replacing radio beacons or location aware access points. For emergency services the advantage comes to better positional location of the party in need of assistance, especially in an urban environment where the positional information is most problematic with existing techniques. For first responders this enhancement enables mobile devices which are in the same scene to help augment their position coordinates with each other in a controlled ad-hoc environment. The positional information shared not only includes latitude and longitude but also altitude and velocity. Since this information involves a small amount of data the mobile devices can have the E-SMLC in the case of LTE share the information both on net and off-net.

The use of sensors including accelerometers, gyroscopes, magnetometers and pressure sensors along with GPS receivers with mobile devices is becoming more prevalent. Therefore the enhancements for positional location will give the E-SMLC in the case of LTE the ability to not only utilize GPS or Network derived coordinate information but also to have an augmentation with sensors associated the mobile device which can include accelerometers, gyroscopes, magnetometer and pressure sensors for refining and reducing some of the positional uncertainties that are in inherent to wireless positional determination.

For wireless mobile network like LTE, the position/location information accuracy needs to be improved for in building environments in addition to providing more accurate location information about where the mobile devices are actually located. Whether the mobile device is used by a first responder, commercial cellular user or a combination of both.

Positional location improvement enables improved situation awareness, improved telemetry, and improved overall communication with the incident commander. In addition, the mobile devices proximity location to other mobile devices can and will change dynamically allowing for resources to be added and/or reassigned as the need arises for operational requirements.

As discussed above, the various embodiments include methods, and mobile computing devices configured to implement the methods, of determining a location of a mobile device. The methods may include determining an approximate location of the mobile device, grouping the mobile device with a wireless transceiver in proximity to the mobile device to form a communication group, sending the determined approximate location of the mobile device to the wireless transceiver, receiving on the mobile device location information from the wireless transceiver, and determining a more precise location of the mobile device based on the location information received from the wireless transceiver. As part of determining its approximate location, the mobile device may estimate its position and/or generate a position estimate. It could be beneficial for these position estimates to include latitude, longitude and elevation information that is accurate to within one (1) meter (and many times within one meter accuracy).

In some embodiments, the mobile device may be equipped with a "sensor fusion" system/component. The sensor fusion component may configured to collect and use information from sensors in the mobile device to further improve the location position determinations. As such, the sensor fusion component may allow the device to better determine its approximate location and/or to generate a better position estimate (e.g., a more precise value, more accurate coordinates, etc.).

In further embodiments, the mobile device may be configured to receive (e.g., via an antenna coupled to one or more of its processors, etc.) location information from a multitude of external devices, and use this information to better determine its approximate location and/or to generate a better position estimate (e.g., a more precise value, more accurate coordinates, etc.).

In some embodiments, the mobile device may be configured to receive the location information was waypoints. A waypoint may be an information structure that includes one or more information fields, component vectors, location information, position information, coordinate information, etc. In some embodiments, each waypoint may include coordinate values (e.g., x and y coordinates, latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify the three-dimensional location of the corresponding external device. The timestamp may identify the time that the location was determined/captured. The range value may identify a distance between the external device and the mobile device. In some embodiments, a waypoint may also be, or may include, a location estimate value, a location set, or any other similar location information suitable for adequately conveying or communicating location information.

In an embodiment, the mobile device may be configured to receive location information in the form of a first waypoint from a first external device, a second waypoint from a second external device, a third waypoint from a third external device, and a fourth waypoint from a forth external device. The mobile device may use any combination of the received waypoints (e.g., first through fourth waypoints) in conjunction with stored and historical information (e.g., previously computed waypoints, movement information, etc.) to determine or compute its approximate and/or more precise location with a high degree of accuracy.

In some embodiments, the mobile device may be configured to perform advanced location based operations (e.g., advanced sensor fusion operations) to generate location information (e.g., a location estimate set/value), use a differential $RMS^2$ method (or any other method known in the art) compute confidence values, and compare the computed confidence values to one or more threshold values to determine whether there is a sufficiently high degree of confidence in the accuracy of the generated location information (e.g., location estimate set/value). In some embodiments, the mobile device may be configured to compute a confidence value between 0.0 and 1.0 that identifies a confidence level in the accuracy of the measurement for each data field in the location estimation set (e.g., a confidence value for each of the latitude, longitude and altitude data fields, etc.). For example, confidence values of 0.90, 0.95, and 0.91 may indicate that the x, y, and z coordinates are accurate within 30 meters between 90 and 95 percent of the time.

In some embodiments, the mobile device may be configured to also compute a precision value that identifies, or which is indicative of, the repeatability factor of the computation/measurements over multiple measurements. The precision value may be used to determine how often the device reports the same position/location (i.e., based on evaluating multiple reports indicating that the device has not moved more than X meters, etc.), which may be used to determine the precision of the measurement (e.g., within 1 meter, etc.). The precision value may also be used to determine the likelihood that repeating the computation (e.g., using the same inputs or input sources) will result in substantially the same values.

In some embodiments, the mobile device may be configured to perform normalization operations to normalize/synchronize the timing of the received location information (the "location information timing"). In some embodiments, this may be accomplished via a timing component or mechanism (a timer, system clock, processor cycles, etc.) in the mobile device. The mobile device may use a common time value (or common timer, reference clock, etc.) to synchronize and/or coordinate the information included in the received waypoints. The mobile device may generate normalized waypoints that include normalized values and/or which are normalized, synchronized and/or updated to account for various delays and inconsistencies, including the propagation delay between the mobile device and the corresponding external device, the time difference between when the waypoint was captured in external device and when the waypoint received in the mobile device, the relative movements of the devices, communication pathway time delays, delays associated with processing the requests, etc.

In some embodiments, the mobile device may be configured to associate or assign a time value to each normalized waypoint (e.g., by storing the waypoint relative to the time value in a map or table, etc.), and determine whether each normalized waypoint is valid. For example, mobile device may determine whether the time value associated is within a valid duration or whether the waypoint includes sufficiently accurate information (e.g., by determining whether a precision or confidence value associated with the waypoint exceeds a threshold value, etc.). In response to determining that a waypoint is valid, the mobile device may determine or compute one or more rankings for that waypoint, and associate and/or assign the rankings to the waypoint (by storing it as a field. In some embodiments, the mobile device may determine and assign an overall rank and a device-specific rank to each valid waypoint, and store the waypoints in memory (e.g., in a location database, etc.).

In some embodiments, the mobile device may be configured to determine the number of stored waypoints that are suitable for use in determining the device's current location. For example, the mobile device may determine whether the memory stores four or more valid waypoints, whether the stored waypoints are associated with sufficiently high rankings, whether the stored waypoints identify four or more independent locations, whether the stored waypoints identify the locations of four or more external devices relative to the current location of the mobile device with a sufficiently high level of accuracy, etc. In response to determining that there are four or more suitable waypoints stored in memory, the mobile device may intelligently select the four most suitable waypoints (e.g., waypoints having the highest overall rank and/or device-specific rank, etc.), apply the selected waypoints as inputs to a kalman filter, and use the output of the kalman filter to generate location information that identifies the mobile device's current location with a high level of accuracy (e.g., within one meter in all directions, etc.).

Figure 22:
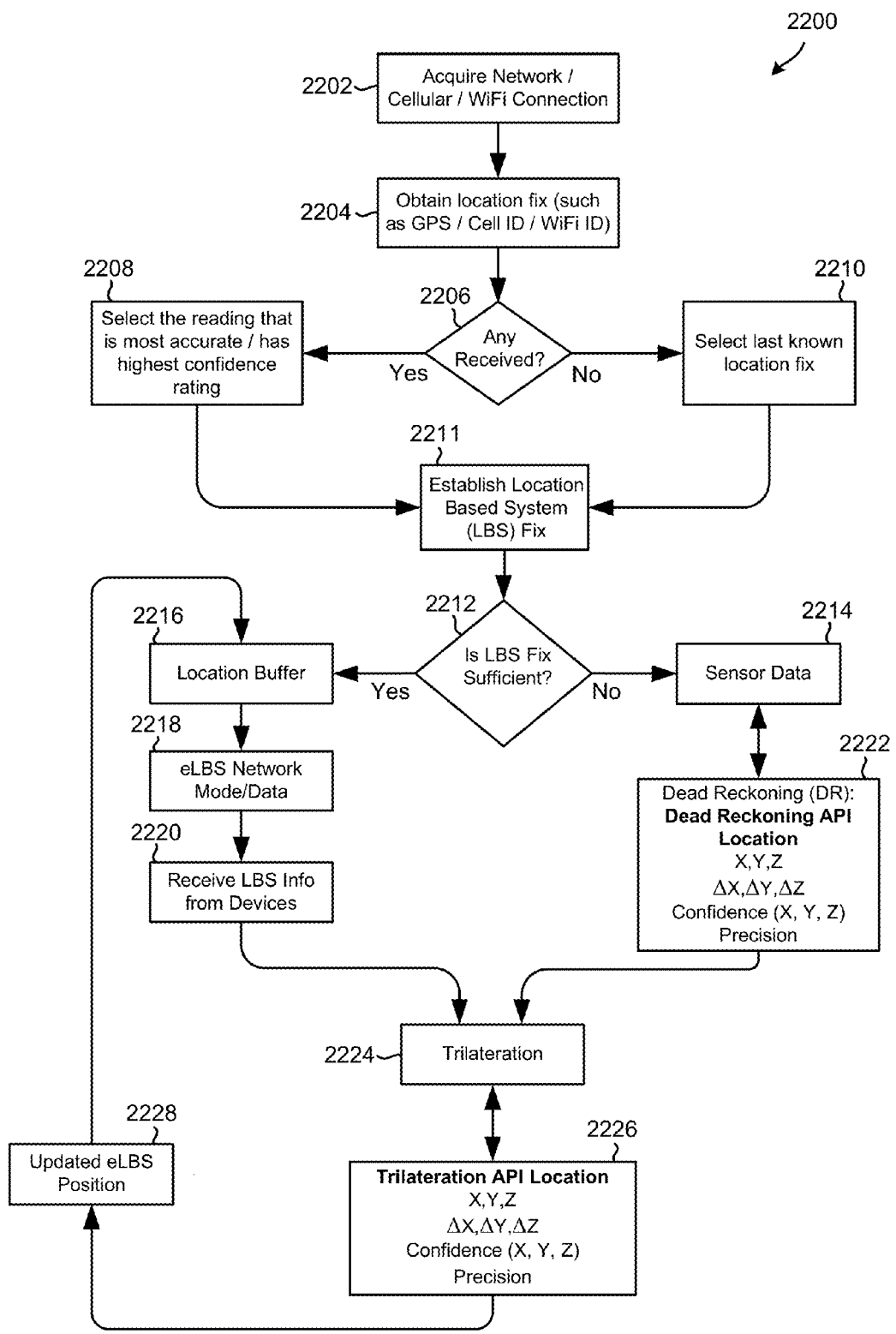
FIG. 22 is a flow diagram that illustrates various components, operations, and information flows in a system configured to perform location-based operations in accordance with an embodiment.

FIG. 22 illustrates an example eLBS method 2200 that may be performed by a processor in a mobile or wireless computing device to better determine its location in accordance with an embodiment. In block 2202, the mobile device may turn on (i.e., power on, etc.) and acquire service from a wireless service provider (e.g., via operations performed by the mobile device processor, etc.). In block 2204, the processor/mobile device may obtain an initial positional fix, and use this information to generate a waypoint (e.g., a current location waypoint) or other location information unit. The mobile device may obtain the initial positional fix by using GPS, CellID, WiFi ID, enhanced LoranC, and/or other similar information that is received by, computed in, or available to the mobile device to perform any or all of the location determination techniques, methods, or operations discussed in this application.

In some embodiments, as part of the operations in block 2204, the processor/mobile device may also obtain, determine, generate or compute a near term positional fix estimate (e.g., latitude and longitude values, etc.) from information received from small cells (e.g., femto cells, etc.) that are positioned in, or suitable for use in, interior locations, such as within buildings, at store entrances in malls, on light posts, in fixtures, etc. In some embodiments, the operations in block 2204 may be accomplished by utilizing RFID chips, quick response (QR) codes, or other similar technologies. For example, an external device may include an RFID chip that transmits its location information to the mobile device. The mobile device may receive and use this information to generate a near term positional fix estimate value, use the near term positional fix estimate value to generate a new waypoint, and use this new waypoint to check or validate an existing waypoint (e.g., the current location waypoint, etc.). The mobile device may also be configured to use the near term positional fix estimate value to compute, replace and/or re-compute the current location waypoint.

In determination block 2206, the mobile device may determine whether additional location information was received and/or whether the mobile device recently reported its location information (which is indicative of the device having acquired an adequate positional fix). In response to determining that additional location information was not received (i.e., determination block 2206="No"), in block 2210 the mobile device may select the last known/trusted location from memory. In various embodiments, this may be accomplished by selecting the most recently computed, generated or stored waypoint (e.g., the previous "current location waypoint," etc.), selecting the waypoint having the most recent timestamp, selecting the waypoint having the highest precision or confidence values, selecting the waypoint having the highest ranking, or any combination thereof.

In response to determining that additional location information was received (i.e., determination block 2206="Yes"), in block 2208, the mobile device may determine whether the received "additional location information" is more accurate (or has higher confidence and/or precision values) than the last known/trusted location stored in memory (or the current location waypoint discussed above), and select the more accurate location information for use in generating a final location waypoint. For example, the mobile device may generate a temporary waypoint based on the received "additional location information," determine whether the temporary waypoint is more accurate than the current location waypoint, and select/set the more accurate of the two waypoints for use in determining the final location waypoint.

In block 2211, the mobile device may use the selected waypoint (e.g., current location waypoint) to establish an LBS fix. In determination block 2212, the mobile device may determine whether the LBS fix is sufficient (e.g., sufficiently detailed, sufficiently accurate, etc.) for use in determining the final location waypoint. In response to determining that the LBS fix is sufficient (i.e., determination block 2212="Yes"), the mobile device may store the location information (e.g., the LBS fix, waypoint associated with the LBS fix, current location waypoint, etc.) in a location buffer in block 2216, enter an eLBS network mode (or receive eLBS network data) in block 2218, and receive LBS information from other devices in block 2220. In response to determining that the LBS fix is not sufficient (i.e., determination block 2212="No"), in block 2214, the mobile device may request, retrieve and/or receive sensor data, and use this information to perform sensor fusion operations. In block 2222, the mobile device may perform dead reckoning operations (e.g., based on the sensor data, results of the sensor fusion operations, etc.) to generate a DR waypoint (or DR data) that includes DR location values (X, Y, Z), a time value, DR location delta values ($\Delta X$, $\Delta Y$, $\Delta Z$), confidence values ($C_X, C_Y, C_Z$), and one or more precision values.

In blocks 2224, 2226 and 2228, the mobile device may perform trilateration operations (e.g., based on the received LBS information, DR data, etc.) to generate updated eLBS information. For example, in blocks 2224 and 2226, the mobile device may use the received LBS information and/r DR data to determine/compute the current location of the device, generate a final location waypoint (or estimate value) that includes trilateration location values (X, Y, Z), a time value, trilateration location delta values ($\Delta X$, $\Delta Y$, $\Delta Z$), confidence values ($C_X, C_Y, C_Z$) and one or more precision values, and/or use the generated final location waypoint to set the current location of the device (e.g., by storing the generated final location waypoint as the current location waypoint, etc.). The mobile device may store any or all of this updated eLBS position information (e.g., the final location waypoint, etc.) in a location buffer in block 2216.

In some embodiments, the mobile device processor attempts to obtain its positional location in block 2204, and based on the types of position/location information that is provided/received, determines a confidence level value for the received information. In some embodiments, the processor may be configured so that, if no responses are provided or received in block 2204, the processor may use the last location of the mobile device to obtain/determine the initial positional fix. After the initial fix is obtained (regardless of its accuracy), the mobile device may determine whether additional improvements are available, possible, acquirable, and/or required. If improvements are required (or when a 911 call is placed), the mobile device may use the information collected from its various sensors to determine, compute and/or provide an estimate (e.g., a waypoint or estimate value) of the change in location/position of the device. In some embodiments, this may be achieved via the mobile device processor performing a combination of sensor fusion and dead reckoning operations (which are described in greater detail above).

As part of the dead reckoning operations (e.g., operations in block 2222, etc.), the sensors/sensor information may be incremented and/or decremented based on any of a variety of weighting filters, including a kalman filter. A kalman filter may be a component in the mobile device that is configured to perform kalman operations on a plurality of input data streams to generate a single output in the form of a location, location information, coordinates, or a waypoint.

In some embodiments, the mobile device may be configured to update or adjust the intervals for the sensors based on each sensor's response characteristics. Adjusting the sensors may allow the mobile device to prevent sensor saturation, thereby improving the device's overall responsiveness. For example, accelerometer data may be updated at 100 Hz intervals, manometer data may be updated at 15 Hz intervals, and the difference in the updates intervals may be included (or otherwise accounted for) in the dead reckoning determinations made in the mobile device (e.g., when the mobile device generates a dead reckoning position estimate in block 2222, etc.).

The trilateration component of the mobile device may be configured to perform various operations/calculations to determine or generate triangulation data (e.g., in blocks 2224 and 2226) that identifies the location of the device with respect to other wireless devices, both fixed and mobile. For example, after the dead reckoning position is estimated (or after the DR data is generated in block 2222, etc.), this information may be passed to the trilateration component (e.g., via memory write operations, wireless transceiver, etc.) that uses these inputs in conjunction with the information received from the wireless/external devices to compute the location of the device (e.g., in blocks 2224 and 2226). In some embodiments, sensor data associated with the dead reckoning estimate/value may include confidence intervals for the x, y, and z axis. These confidence values may identify an individual or overall confidence of the position/location information.

Generally, performing eLBS method 2200 improves the performance of the mobile device by improving the location-based solutions described above (e.g., with reference to FIGS. 1-19, etc.). For example, eLBS method 2200 may allow the mobile device to generate the "more precise location information," updated eLBS position information, or a more accurate waypoint more efficiently than if the information is generated based solely on received location information. This method also allows the mobile device to generate more accurate location information with fewer iterations, thereby freeing up the devices resources and improving its performance characteristics. For all these reasons, method 2200 improves the overall functionality of the mobile device.

In addition, eLBS method 2200 may allow the mobile device to intelligently determine whether or when to request additional location information to perform further location updates/improvements. For example, the mobile device may be configured to not request or initiate a positional improvement (i.e., not generate more precise location information) if/when the mobile device is stationary or when it determines that the device has moved less than one meter. This improves the power consumption characteristics of the device and helps preserve its battery life. Moreover, this allows the mobile device to request a position update (or generate more precise location information) immediately after a subscriber dials 911 or otherwise initiates an emergency call. This also allows the information to be sent/routed to the public service answering point (PSAP) faster, which in turn improves the responsiveness and overall functionality of the mobile device.

In some embodiments, the mobile computing device may be configured to request a position updates from other devices. The mobile device's initial position may be determined through the use of time of flight (TOF) via two message inquiries. The RSSI may be read as well, and using the TOF and RSSI, the mobile device may more accurately determine the distance between the mobile device and each of the other devices. The mobile device may then use this distance information to better determine its current location (via the performance of any or all the methods, operations, or techniques discussed in this application).

Privacy (e.g., data privacy, etc.) is an important aspect of modern systems. The various techniques, solutions, methods, and operations discussed in the application allow for a subscriber to be identified quickly and effectively without requiring the use of that subscriber's IMSI (or other sensitive data) that could be misused by malware or a hacker. For example, rather than using the subscriber's IMSI, the system (e.g., mobile devices, sensors, etc.) could use a PN code to generate an independent device ID when the device turns on, and use this device ID for all subsequent communications. The device ID may change every time the wireless device is powered on. For these and other reasons, performing the above-described operations improves the device's overall functionality (e.g., by improving its privacy and security characteristics, etc.).

Once the initial handshake has taken place the mobile may exchange its location information with another device. The mobile device may provide known points, which may be waypoints, RFID/QC points, WiFi AP points, or any information unit or structure that includes latitude and longitude values (or equivalents thereof). In some embodiments, the mobile device may be configured to receive and/or use four known points to generate more accurate or more precise location information.

Figure 23:
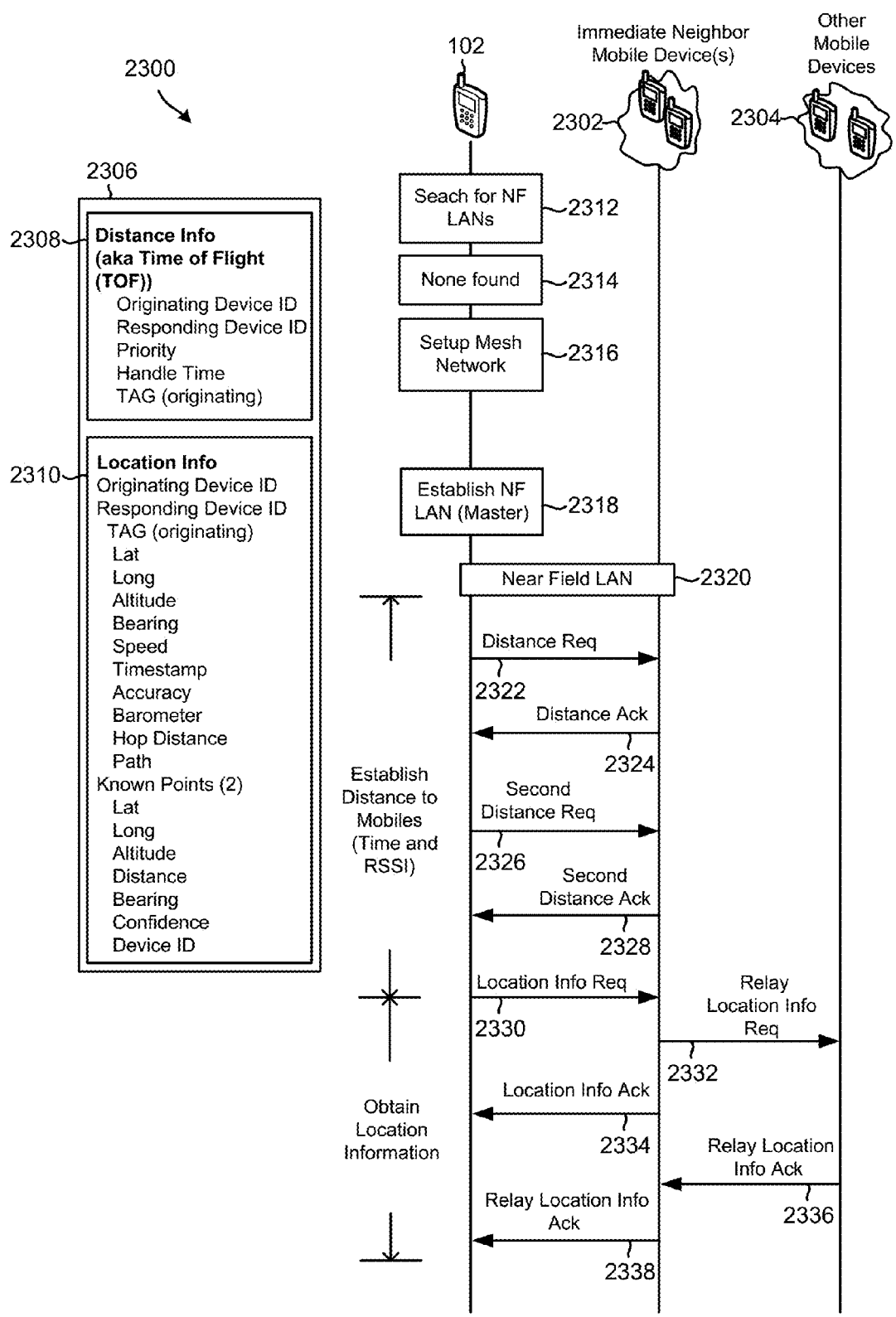
FIG. 23 is a flow diagram that illustrates an embodiment location-based method in which a mobile device operates as a master.

FIG. 23 illustrates a system 2300 for relaying information request messages and obtaining location information from other devices in accordance with an embodiment. The mobile device may then use the obtained location information to determine or compute the more precise location information (or an update final location value, etc.). In the example illustrated in FIG. 23, the system 2300 includes a mobile device 102, immediate neighbor mobile devices 2302, and other mobile devices 2304. In some embodiments, one or more of the components in the system 2300 may be configured to track and report the number of hops in a path (e.g., communication pathway, wireless data path, etc.). This allows devices that are not initially connected to the mobile device 102 in the network to more quickly and efficiently provide data back to the mobile device 102.

In some embodiments, the mobile device 102 may be configured to generate, send, receive and/or use a message/information structure 2306 that includes distance information 2308 and/or location information 2310. The distance information 2308 may include time of flight (TOF) information, an originating device ID field/value, a responding device ID field/value, a priority field/value, a handle time field/value, an originating TAG field/value, RFID information, a latitude field/value, a longitude field/value, an altitude field/value, a bearing field/value, a speed field/value, a timestamp field/value, an accuracy field/value, a barometer field/value, a hop distance field/value, and a path field/value. The location information 2310 may include an originating device ID field/value, a responding device ID field/value, an originating TAG field/value, a latitude field/value, a longitude field/value, an altitude field/value, a bearing field/value, a speed field/value, a time stamp field/value, an accuracy field/value, a barometer field/value, and a hop distance field/value, a path field/value. In some embodiments, the location information 2310 may also include one or more known points, including a latitude field/value, a longitude field/value, an altitude field/value, a distance field/value, a bearing field/value, a confidence field/value, and/or a device ID field/value. In some embodiments, one or more of the points/known points may be a waypoint that includes any or all of the information, fields, or values discussed above. In various embodiments, any or all of the data/values included in the distance information 2308 and/or location information 2310 messages to determine or compute one or more waypoints (e.g., current location waypoint, final location waypoint, etc.).

In operation block 2312, the mobile device 102 may search for near field (NF) LANs and/or determine whether there are NF LANs available. In operation block 2314, the mobile device 102 may determine that there are no NF LANs available. In operation block 2316, mobile device 102 may set up a mesh network in response to determining that there are no NF LANs available. In operation blocks 2318 and 2320, the mobile device 102 may perform various operations to establish an NF LAN, and take on the role of master.

In operations 2322 through 2328, the mobile device 102 may communicate with the immediate neighbor mobile devices 2302 to determine the distance between the mobile device 102 and its neighboring devices. In operations 2330 through 2338, the mobile device 102 may communicate with the immediate neighbor mobile devices 2302 (which relay information to the other mobile devices 2304) to obtain location information. In particular, in operation 2322, the mobile device 102 may generate and send a distance request message to one or more of the immediate neighbor mobile devices 2302. In operation 2324, the mobile device 102 may receive a distance acknowledgment message from one or more of the immediate neighbor mobile devices 2302. In operation 2326, the mobile device 102 may send a second distance request message to the immediate neighbor mobile devices 2302. In operation 2328, the mobile device 102 may receive a second distance acknowledgment message from the immediate neighbor mobile devices 2302.

In operation 2330, the mobile device 102 may send a location information request message to the immediate neighbor mobile devices 2302. In operation 2332, one or more of the immediate neighbor mobile devices 2302 may relay the location information request message to other mobile devices 2304. In operation 2334, the mobile device 102 may receive a location information acknowledgment message from one or more of the immediate neighbor mobile devices 2302. In operation 2336, the immediate neighbor mobile devices 2302 may receive a "relay location information acknowledgment message" from one or more of the other mobile devices 2304, and send the relay location information acknowledgment message to the mobile device in operation 2338.

Figure 24:
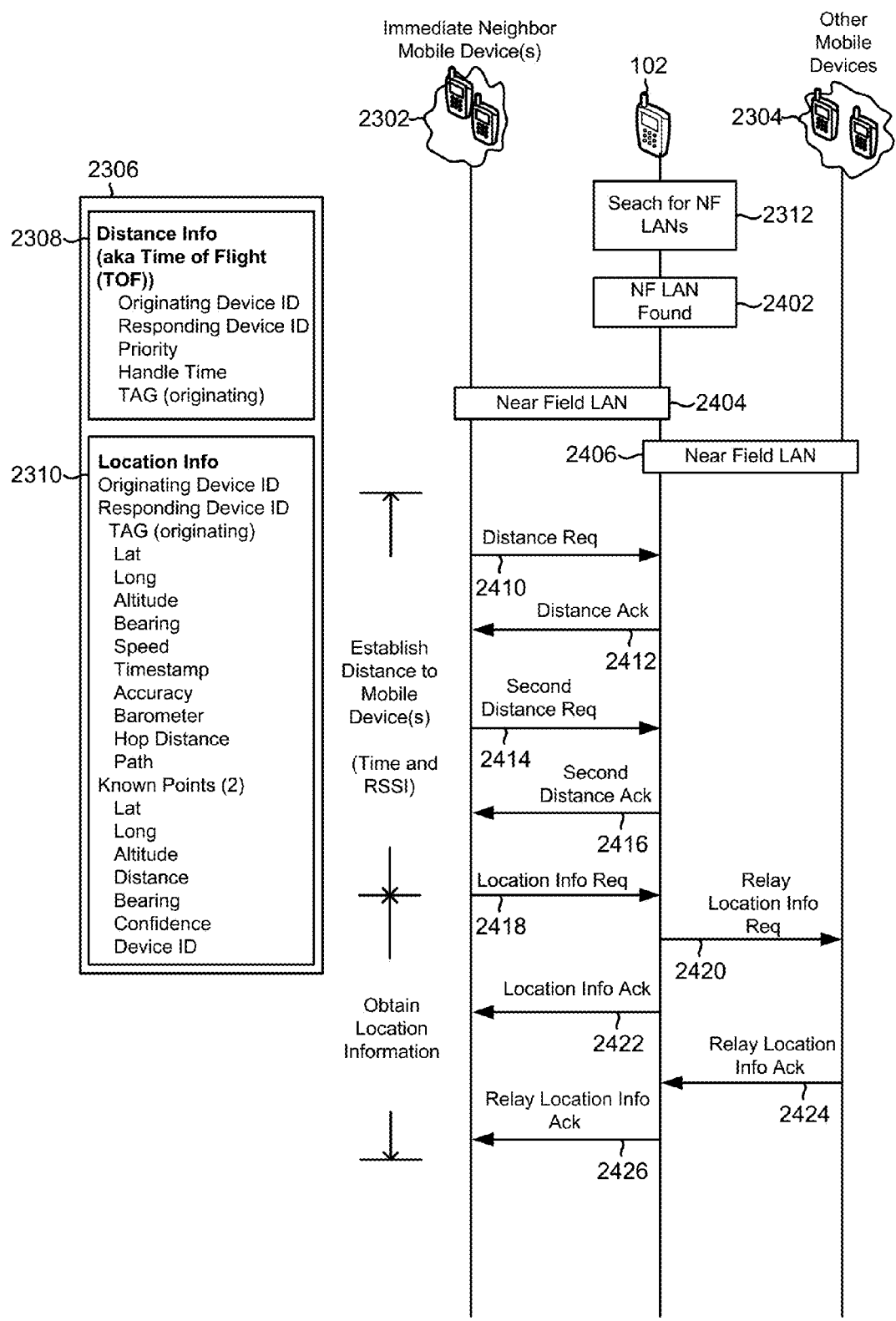
FIG. 24 is a flow diagram that illustrates an embodiment location-based method in which a mobile device operates as a slave

In the example illustrated in FIG. 23, the mobile device 102 operates as the master in the communication flow. FIG. 24 illustrates that the mobile device 102 may also operate as a slave. FIG. 24 further illustrates that the eLBS for communication with other mobile devices 2304 may take on a "listen only" mode when an update is not needed or necessary (e.g., when it is determined to not to be required). In addition, during the active exchange with other mobile devices 2304 and immediate neighbor mobile devices 2302, each device may provide any or all of the information illustrated in FIG. 24.

With reference to FIG. 24, in operation block 2312, the mobile device 102 may search for NF LANs. The mobile device 102 may determine that an NF LAN is available in operation block 2314, and join an NF LAN with one or more of the immediate neighbor devices 2302 and one or more of the other devices 2304 in blocks 2404 and 2406. In blocks 2410 through 2416, the mobile device 102 may communicate with the immediate neighbor devices 2302 to determine or establish the distances to the mobile devices (e.g., via time, RSSI, etc.). In operations 2420 through 2426, the mobile device 102 may communicate with the immediate neighbor devices 2302 and the other mobile devices 2034 to determine, obtain, or provide location information.

Other methods for obtaining an initial fix may include communicating or interacting with ibeacon type devices and/or devices that emit sounds above the audible hearing range of humans. Additional devices that provide location information (e.g., Lat, Long and Altitude of a trusted or known location) to the mobile device 102 may include devices that include or utilize RFID or QR Codes, examples of which are illustrated in FIG. 25.

Figure 25:
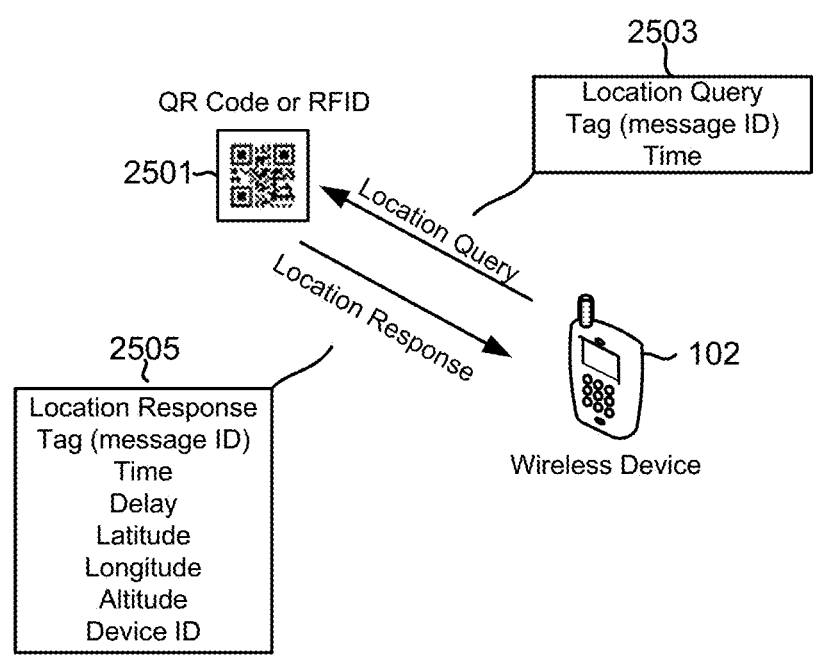
FIG. 25 is a component block diagram illustrating functional components, communication links, and information flows in system configured to perform a method for determining and using the Latitude, Longitude, and Altitude of a trusted or known location in accordance with an embodiment.

FIG. 25 illustrates a system that includes a mobile device 102 configured to utilize RFID or QR Codes in accordance with the various embodiments. In the example illustrated in FIG. 25, an RFID/QR device 2501 provides location information to the mobile device 102. The RFID/QR device 2501 may positioned, placed, or located in any of a variety of locations (e.g., entrances to malls or stores, on street lamp poles, etc.) and configured to send, transmit or broadcast its location to the mobile device 102 (e.g., periodically, in response to receiving a query message, based on the mobile device's location, etc.). The mobile device 102 may be configured to receive and use this information (e.g., as part of the eLBS operations) to determine its current and/or future-estimated location.

In some embodiments, the RFID/QR device 2501 may be configured to send its location in response to receiving a location query message 2503 from the mobile device 102. The mobile device 102 may be configured to scan a QR Code to initiate the process of generating and sending a location query message 2503 to the RFID/QR device 2501. The location query message 2503 may include a Tag (e.g., RFID TAG) value/field, which may used as a message ID in some embodiments. The location query message 2503 may also include a time value that may be used for calculating Time of Flight (TOF) and/or other similar information (e.g., for determining when the message began, etc.).

In response to receiving the location query message 2503, the RFID/QR device 2501 may generate and send a transponded Tag message 2505 to the mobile device 102. The transponded Tag message 2505 may include a time value, a time stamp, a device ID, and location information (e.g., lat, long, alt, etc.) that identifies the location of the QR/RFID device 2501. The device ID may be a name, a street address, store number, etc. Time value may include a delay value that is associated with the RFID/QR device 2501 or the distance between the RFID/QR device 2501 and the mobile device 102.

Generally, four known points in space (e.g. four sets of coordinates) may be used to generate accurate three dimensional location/position information via trilateration. For example, the mobile device 102 could be configured to use the known/relative locations of four different mobile devices to generate three dimensional location/position information. Yet, in a mobile environment, it is often difficult to identify, request and receive location information for four wireless devices that are within the same proximity (i.e., are sufficiently close to one another). Accordingly, the examples below (e.g., discussed with reference to FIGS. 26 through 29) illustrate various techniques that may be implemented and used by the mobile device 102 to generate more accurate three dimensional location/position information with or without the availability of location information from four independent devices.

Figure 26:
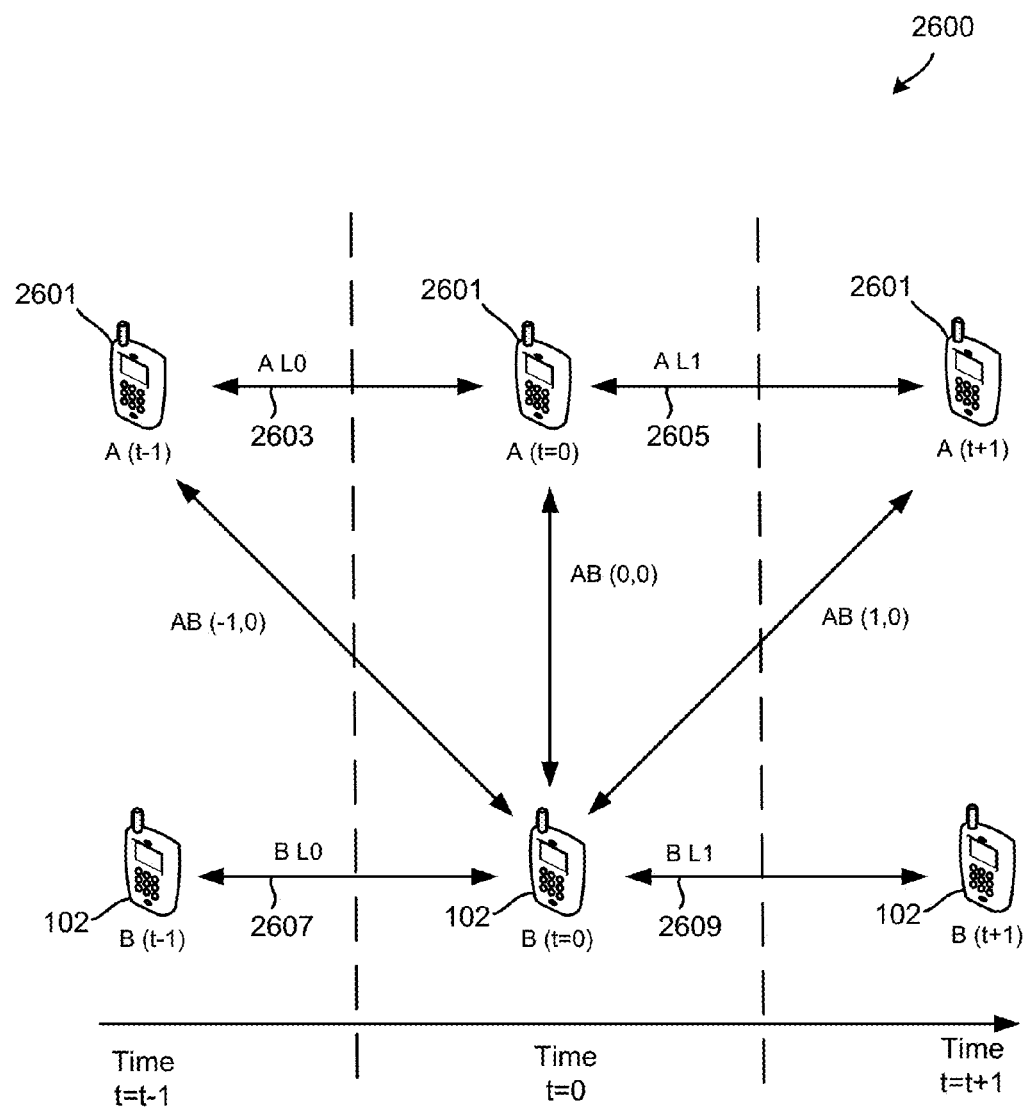
FIGS. 26 through 29 are component block diagrams that illustrate sharing of location based information between mobile devices in accordance with various embodiments.

FIG. 26 illustrates an example system 2600 that includes two mobile devices 102, 2601 that are configured to collaborate or work in concert to determine their respective locations with a high degree of accuracy. In the example illustrated in FIG. 26, the system includes a first mobile device 2601 (Mobile A or "A") and a second mobile device 102 (Mobile B or "B"). The second mobile device 102 may be a target wireless device that is configured to receive and use location information from the first mobile device 2601 to perform eLBS operations (e.g., to generate accurate three dimensional location/position information, generate more precise location information, improve its positional fix, etc.).

The first mobile device 2601 may be configured to determine/compute its location at various times (e.g., at t=t−1; t=0; t=t+1, etc.), and provide this location information (INFO A) to the second mobile device 102. The second mobile device 102 may determine its location at various times (e.g., at t=t−1; t=0; t=t+1, etc.) and generate location information (INFO B), use the received location information (INFO A) to determine, compute, or generate more precise location information (INFO B'). The more precise location information (INFO B') may be a waypoint or another information structure that includes a latitude value, longitude value, altitude value, timestamp, confidence value, precision value, etc. The second mobile device 102 may use the more precise location information (INFO B') to provide its user with an enhanced location based service.

In some embodiments, the second mobile device 102 may be further configured to send the generated more precise location information (INFO B') to the first mobile device 2601. The first mobile device 2601 may be configured to receive and use this information (INFO B') to compute different more precise location information (INFO A'), and send this information (INFO A') back to the second mobile device 102 for use in computing even more precise location information (INFO B"). These operations may be performed repeatedly or continuously by the mobile devices 102, 2601 until a desired level of accuracy is reached (e.g., until a confidence or precision value associated with the generated location information exceeds a threshold value, etc.).

Generally, the accuracy of three dimensional location information improves significantly when the device has access to four data points (e.g., four known/relative locations, four sets of coordinate values, four points in space or space-time, etc.). A mobile device may be configured to generate one or more of such data points based on its location in time, including its past locations and/or estimated-future locations. As such, mobile devices 102, 2601 may determine their past locations (e.g., location at time t=t−1, etc.) by retrieving previously computed location information from memory. Mobile devices 102, 2601 may determine or estimate their current locations (e.g., location at time t=0) via any combination of the methods/techniques discussed in this application. Mobile devices 102, 2601 may determine or estimate their future locations (e.g., location at time t=t+1, etc.) based on sensor data, dead reckoning, or any other suitable technique discussed in this application.

In the example illustrated in FIG. 26, communications between the mobile devices 102, 2601 occur at time t=0 (this includes ranging), and the location of a device at time t=0 may be represented as (0,0). The past locations of a device may be represented as (−1,0) for time t=t−1, (−2,0) for time t=t−2, etc. Similarly, the estimated future location for the device at time t=t+1 may be represented as (1,0), etc. Vector "A L0" represents the distance 2603 that the first mobile device 2601 travels or moves between times t=t−1 and t=0. The vector "A L1" represents the distance 2605 that the first mobile device 2601 is likely to travel or move between times t=0 and t=t+1. Similarly, vectors "B L0" and "B L1" represent the distances 2607, 2609 that the second mobile device 102 travels or moves between times t=t−1 and t=0 and between times t=0 and t=t+1, respectively.

Vector AB (−1,0) represents sounding data (i.e., ranging) that is established between the mobile devices at time t=t−1. Vector AB (0,0) represents sounding data for time t=0. These two vectors may be adjusted based on dead reckoning information (or the information generated via the other techniques discussed in this application) and to account for the relative differences in values for either the first mobile device 2601 (A), the second mobile device 102 (B), or for both devices. In some embodiments, an additional vector may be generated for time t=t+1, which is represented as vector AB (1,0) in FIG. 26. This additional vector may be used as a replacement value and/or as a check value.

Due to the ranging information between A and B at both t=−1 and t=0, points B(t−1), B(t=0), A(t−1) and A(t=0) are known to the mobile device 102 after the communication exchange at time t=0. In some embodiments, the mobile device 102 may be configured to also compute, determine, and/or estimate point A(t+1) and point B(t+1). Based on the confidence values associated with these points, the mobile device may select four points for use in determining its three-dimensional location and/or performing location-based operations (e.g., eLBS operations, etc.).

There are a number of perturbations with the method discussed above, two of which are illustrated in Tables 1 and 2 below.

TABLE 1

Two device Pseudo Position

| | Mobile | Time (t) |
|---|---|---|
| 1 | B | 0 |
| 2 | A | −1 |
| 3 | A | 0 |
| 4 | A | +1 |

TABLE 2

Two device Pseudo Position (example 2)

| | Mobile | Time (t) |
|---|---|---|
| 1 | B | −1 |
| 2 | B | 0 |
| 3 | A | 0 |
| 4 | A | +1 |

Figure 27:
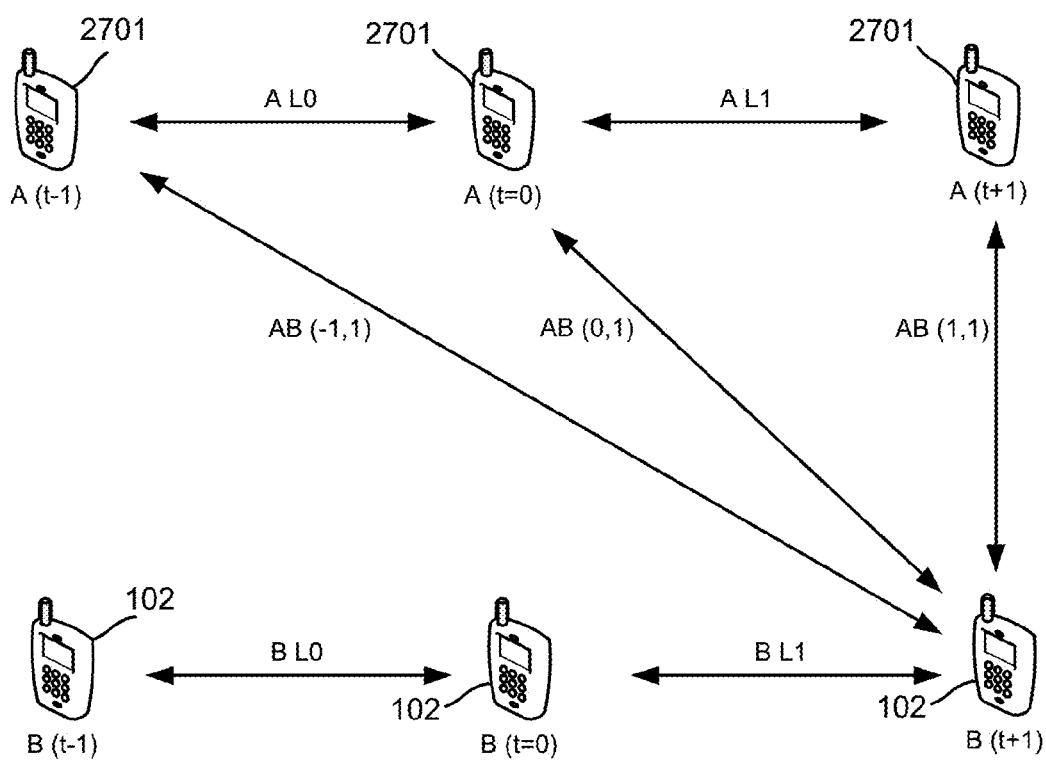

FIG. 27 illustrates an example system in which two mobile devices 2701, 102 are used to obtain four data points based on the motion of one or both of the devices. A first mobile device 2701 (Mobile A) provides location information at times (t=t−1, t=0 and t=t+1) to a second mobile device 102 (Mobile B). The location value at time t=t+1 may be provided at t=0 as an actual position (e.g., for a check) or as a calculated/estimated future position value. The second mobile device 102 at t=+1 may use the current location and two previous locations of the first mobile device 2701 to determine its current location/position. These locations may also be used as a check for dead reckoning and/or positional validation.

In some embodiments, the first mobile device 2701 (Mobile A) may be configured to estimate its future locations (at t=t+1, t=t+2), and send these estimates to the second mobile device 102 (Mobile B). In addition, the sounding data for AB at t=t−1 and AB at t=0 may provide two vectors that may be used to determine the locations of the mobile devices 2701, 102. In some embodiments, these vectors may be adjusted based on DR information to account for relative differences in the first mobile device 2701, second mobile device 102, or both. A third vector may be calculated, determined or computed for AB at t=t+1, and used as a replacement and/or as a check value. In the illustrated example, the vector for AB at t=t−1 is AB (−1, 1), the vector for AB at t=0 is AB (0, 1), and the vector for AB at t=t+1 is AB (+1, 1). The second mobile device 102 (Mobile B) may be configured to intelligently select one or more of these vectors (for use in generating more precise three dimensional location information, etc.) based on a confidence interval associated with the initial calculation (which may be extrapolated).

Figure 28:
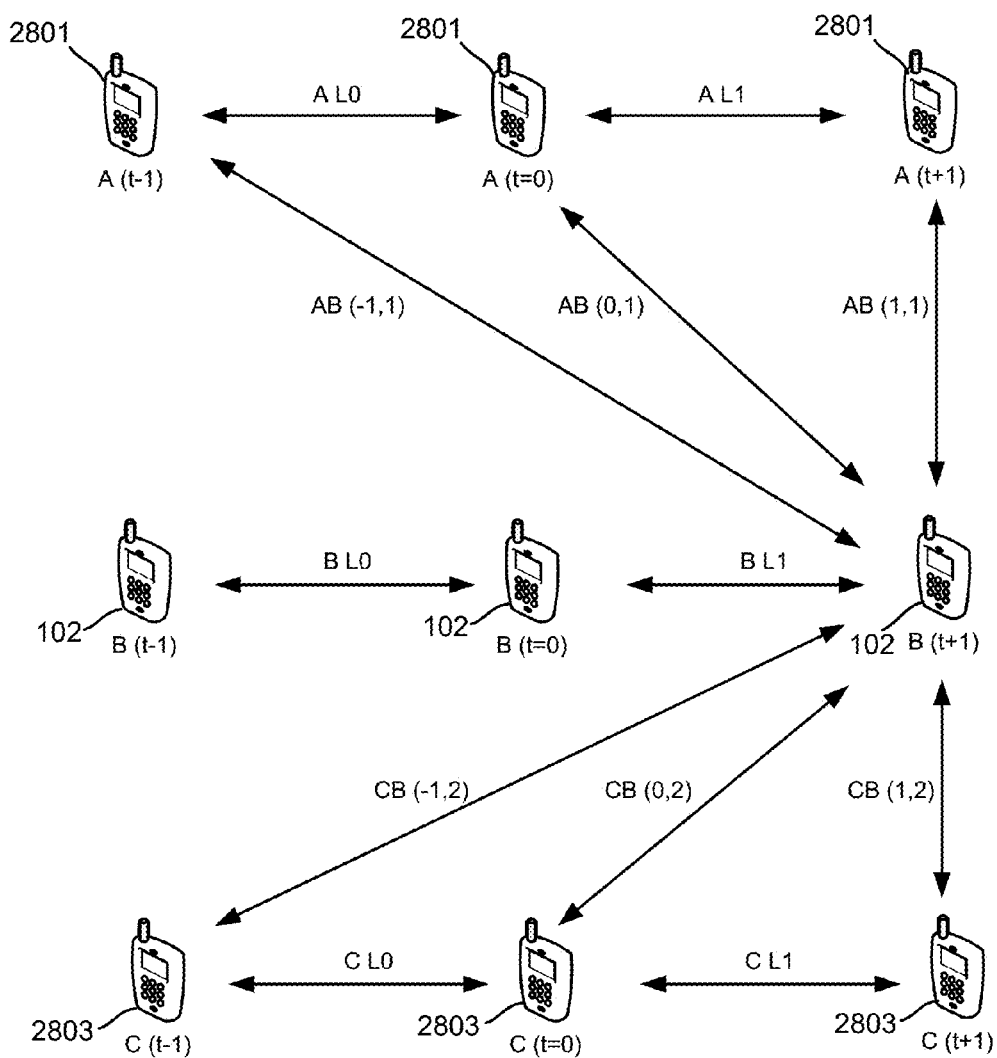

FIG. 28 illustrates an example system in which three mobile devices 2801, 102 and 2803 are used to obtain four data points based on the motion of one or more of the devices. Mobile device 102 obtains information from mobile device 2801 and mobile device 2803. The possibility of having needed for positional location is closer without having to estimate two points. With three mobile devices, it is possible to extract this information by using a similar concept discussed above with reference to FIGS. 26 and 27, with the exception that which positions at t=t−1, t=0, and t=t+1 and vectors AB (−1,1), AB (0,1), AB (1,1), CB (−1,2), CB (0,2) and CB (1,2) selected and used as part of the trilateration operations could be determined based on a confidence interval.

Figure 29:
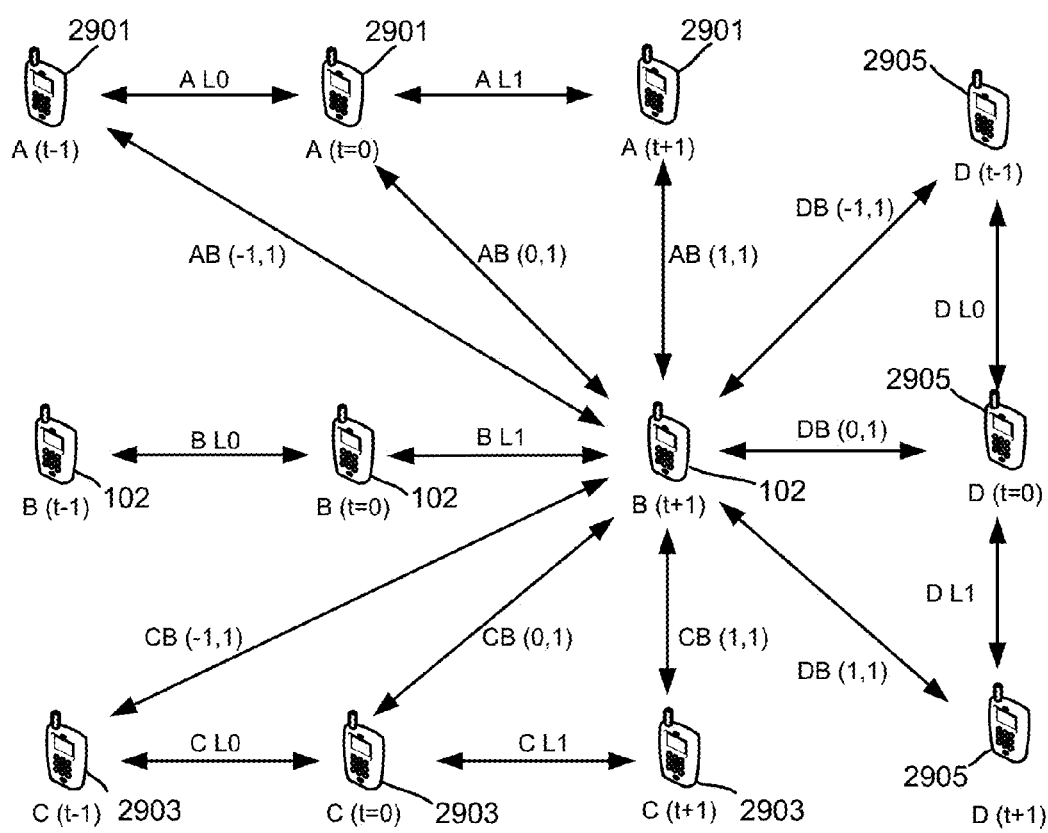

FIG. 29 illustrates an example system in which four mobile devices 2901, 102, 2903, and 2905 are used to obtain four data points based on the motion of one or more of the devices. In this illustrated example, one of the other mobiles 2901, 2903, 2905 at t=0 has a low confidence interval and/or does not report its location information (was not able to obtain an adequate location fix, etc.). The mobile device may perform the same or similar operations as those discussed above with reference to FIGS. 26 and 27, but use one or more data points that have lower confidence values (or approximate or less precise location information) than which would otherwise be optimal or desired. The positions as at t=t−1, t=0 and t=t+1 for the four mobile devices 2901, 102, 2803 and 2805 may be determined based on their movements A L0, A L1, B L0, BL 1, C L0, C L1, D L0 and D L1 or associated vectors AB (−1,1), AB (0,1) AB (1,1), CB (−1,1), CB (0,1), CB (1,1), DB (−1,1), DB (0,1), DB (1,1), any or all of which may be intelligently selected based on one or more confidence values.

Some embodiments may include mobile computing device(s) that are configured to perform enhanced location based trilateration operations. Trilateration for enhanced location based positions may require that a mobile device perform sensor fusion operations. As is discussed further below, when information from a multitude of devices is used to generate accurate three dimensional information the manner in which the sensor fusion operations are performed by a wireless/mobile device become even more important.

Figure 30A:
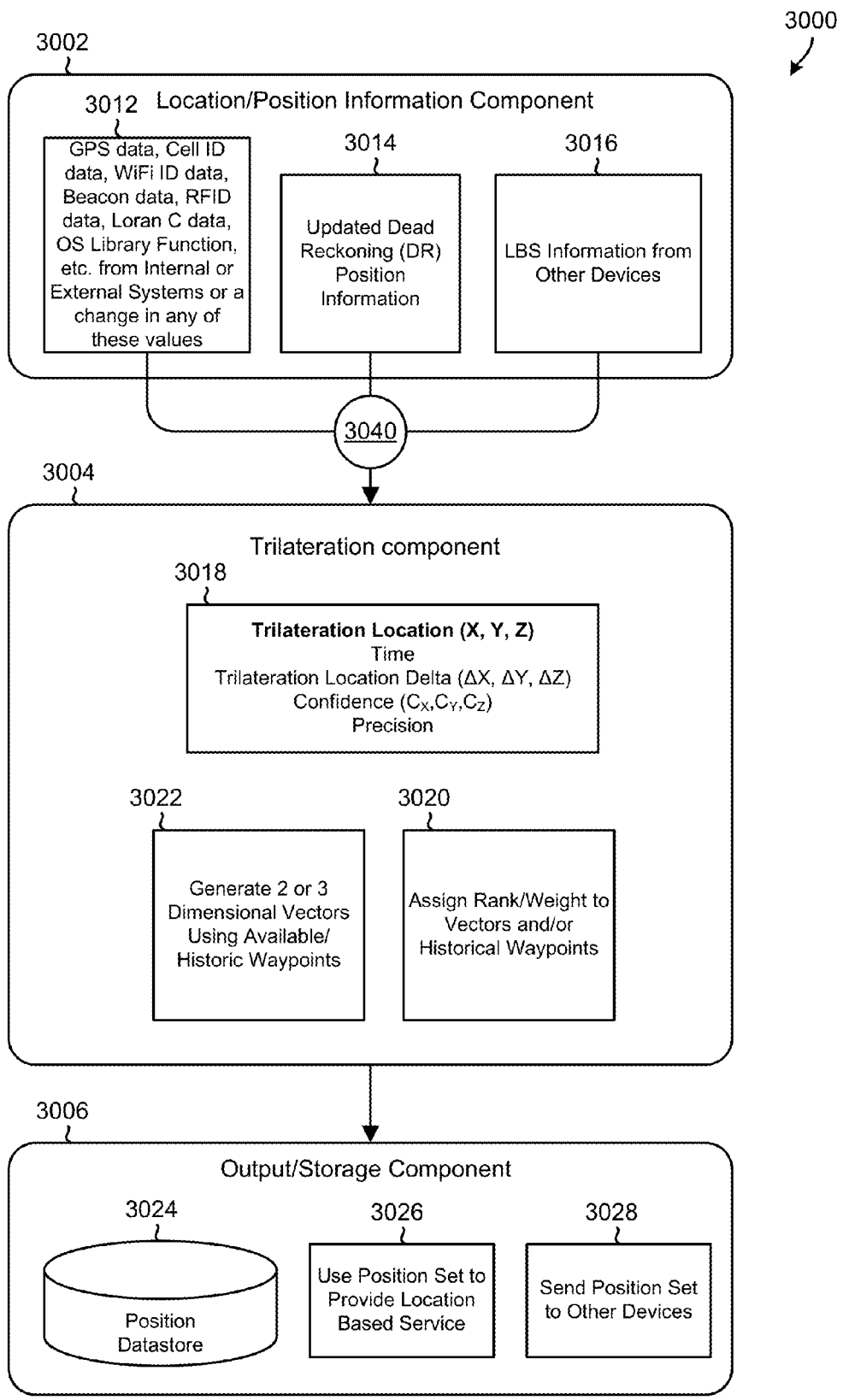
FIG. 30A is a block diagram illustrating various components, information flows, and operations in an example mobile device system configured to perform enhanced location based service (eLBS) trilateration operations in accordance with various embodiments.
Figure 30B:
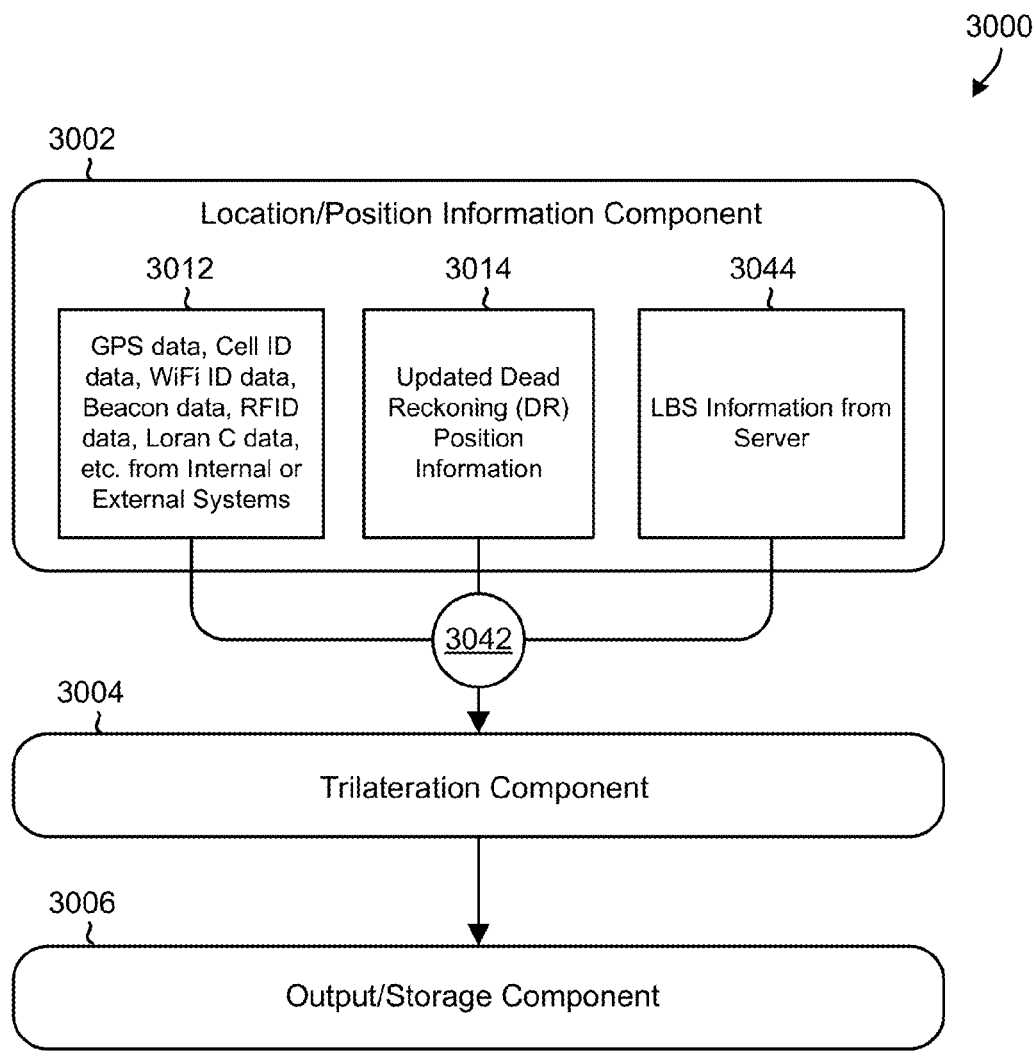
FIG. 30B is a block diagram illustrating various components, information flows, and operations in an example mobile device system configured to perform single device eLBS trilateration operations in accordance with various embodiments

FIG. 30A illustrates various components, information flows, and operations in an example mobile device system 3000 that is configured to perform enhanced location based service (eLBS) trilateration operations in accordance with an embodiment. FIG. 30B illustrates that, in another embodiment, the mobile device system 3000 may be configured to perform single device eLBS trilateration operations that do not require receiving information from other devices in the communication group. In the examples illustrated in FIGS. 30A and 30B, the system 3000 includes a location information component 3002, a trilateration component 3004, and an output/storage component 3006.

In block 3012, a processor of the mobile device may receive information that is suitable for use as, may be used to generate, or which includes, location information, such as GPS data, a Cell ID, a WiFi ID, Beacon data, a RFID, Loran C data, OS Library Function, etc. or changes in any of the these values. In some embodiments, the mobile device may receive location information from active or passive external devices/systems. For example, the mobile device may communicate with an active external device, such as location based server from a fleet management company, to receive location information. As part of these operations, the mobile device may perform various operations (e.g., interrogation, etc.) to establish communication links and receive information from the active external devices. Alternatively or in addition, the mobile device may receive location information from a passive external device, such an RFID chip that scans for the presence of device and/or which broadcasts location information periodically. In addition, the mobile device may generate location information locally (in the device) based on information received from an external system in block 3012. For example, the mobile device may generate GPS data (e.g., GPS coordinates or GPS determined position information) in a local GPS receiver based on GPS information received from an external GPS system. As another example, the mobile device may use received WiFi ID information to determine or compute its proximity to known networks, and generate location information based on the determined proximity to these known networks.

In block 3014, the mobile device may generate and/or receive updated dead reckoning (DR) position information (or dead reckoning position estimate value). As mentioned above, the mobile device may be equipped with sensors (e.g., accelerometer, gyros, magnetic compass, altimeters, odometers, etc.) that allow it to estimate the distance it has traveled or moved over a period of time in any dimension (e.g., x, y or z; latitude, longitude or altitude; etc.). The mobile device may use information collected from these sensors in block 3014 to perform any or all of the dead reckoning operations discussed in this application and generate DR position information. For example, the mobile device may use information from the sensors (e.g., accelerometer, gyros, magnetic compass, altimeters, odometers, etc.) to determine the distance it has traveled (or been moved) since the last time it was able to ascertain its location with a sufficiently high degree of confidence (e.g., Cx, Cy and Cz are all greater than 95, etc.), determine its current location based on the determined distance (e.g., distance it has traveled, etc.), and generate updated DR position information that identifies its current location. In some embodiments, the mobile device may also compute confidence values and/or a precision value for the generated DR position information in block 3014.

In block 3016, the mobile device may receive and process location based service information (LBS information) from other devices, such as from transceiver or other mobile devices in the communication group. Since the LBS information may be received from devices that are being moved and/or which are not stationary, the LBS information may include, or may be used to generate or establish, multiple waypoints at discrete times and/or for discrete durations or periods of time. In some embodiments, the LBS information may include estimated distances between multiple (e.g., three or more) devices/transceivers and the mobile device. Each waypoint may be an information structure that includes one or more information fields, component vectors, location information, position information, coordinate information, etc.

Thus, the location information component 3002 of the mobile device may be configured to receive, process and/or generate standard location information (or a first data set, estimate value, etc.) in block 3012, updated DR position information (or a second data set, estimate value, etc.) in block 3014, and LBS information (a third data set, estimate value, etc.) in block 3016. In operation 3040, the location information component 3002 may send any or all such information (e.g., first, second, and third values/sets) to the trilateration component 3004 as input data.

In blocks 3018-3022, the mobile device/trilateration component 3004 may use the received input data to perform trilateration operations (e.g., trilateration API location operations, etc.), determine the geographical coordinates (e.g., latitude, longitude, and altitude coordinates) of the mobile device, generate a trilateration position estimate value, generate a final position set (e.g., a final location estimate value), generate an updated final position set (e.g., x, y and z coordinates, an updated position estimate value, more precise information, etc.), and send the updated final position set to the output/storage component 3006. The trilateration operations may include operations for implementing any or all of the techniques discussed in this application, including time of arrival, angle of arrival, mobile-to-mobile trilateration, lateration, multilateration, triangulation, etc.

In the example illustrated in FIG. 30A, in block 3018, the mobile device generates/computes/receives trilateration location values (X, Y, Z), a time value, trilateration location delta values ($\Delta X$, $\Delta Y$, $\Delta Z$), confidence values ($C_X, C_Y, C_Z$), and one or more precision values, the combination of which may be stored or used as a waypoint (or a data set or estimate value). In block 3020, the mobile device may rank or assign weights to the current or historical waypoints (i.e., previously computed waypoints). In block 3022, the mobile device may generate two or three dimensional vectors using the waypoints (current and/or historic). In an embodiment, the mobile device may generate the vectors based on their rank/weights (e.g., by including/using only waypoints having a rank that exceeds a threshold value).

As mentioned above, the trilateration component 3004 may send the computed updated final position set to the output/storage component 3006. The output/storage component 3006 may store the updated final position set in a location buffer or the illustrated updated final position datastore 3024. In block 3026, the output/storage component 3006 may use the updated final position set (more precise location information) to provide a location based service. In block 3028, the output/storage component 3006 may send the updated final position set to other devices, such as to a network server or the other mobile devices in the communication group.

In order to accurately compute/determine the updated final position set, the mobile device system 3000 may be required to communicate with other devices in a communication group (e.g., in block 3016). However, mobile devices do not always have access to a communication group (yet alone a sufficiently large communication group) and/or to the robust data that could be required to accurately determine the location of the device. As such, in the example illustrated in FIG. 30B, in block 3044, the mobile device may receive LBS information from a server computing device (e.g., a network provided location service). In operation 3042, the mobile device may send the standard location information (or first data set, estimate value, etc.), updated DR position information (or second data set, estimate value, etc.), and the LBS information received from the server (or third data set, estimate value, etc.) to the trilateration component 3004 as input data. The trilateration component 3004 may receive and use the input data to compute/generate a final position set and/or an updated final position set, and send the generated position set to the output/storage component 3006 for storage and/or use.

Figure 30C:
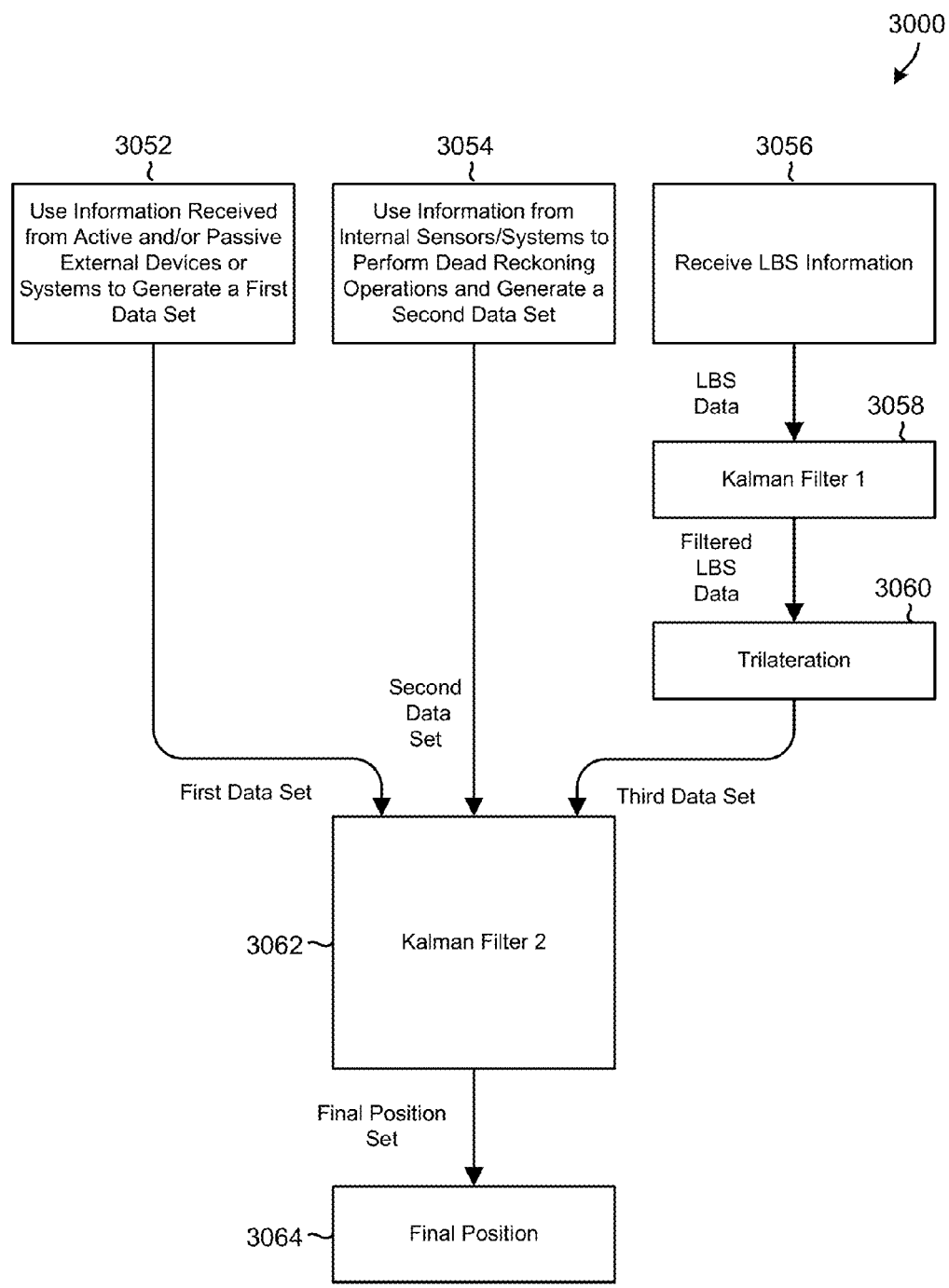
FIG. 30C is a block diagram illustrating various components, information flows, and operations in a device/system configured to perform eLBS trilateration operations in accordance with some embodiments.

FIG. 30C illustrates various additional components, information flows, and operations in an example mobile device system 3000 configured to perform enhanced location based service (eLBS) trilateration operations in accordance with the various embodiments. In block 3052, the mobile device may use information received from active and/or passive external devices or systems to generate a first data set (e.g., x, y and z coordinates, first estimate value, etc.). In block 3054, the mobile device may use information collected from internal sensors and systems to perform dead reckoning operations and generate a second data set (e.g., x, y and z coordinates, second estimate value, etc.). In block 3056, the mobile device may receive location based service (LBS) information from a server (e.g., x, y and z coordinates, LBS estimate value, etc.). In block 3056, the mobile device may pass the received LBS information through a first kalman filter (Kalman Filter 1) to generate filtered LBS data (e.g., a filtered LBS estimate value, etc.). The kalman filter may be a procedure, algorithm, method, technique, or sequence of operations for accomplishing the function of a kalman filter.

In block 3060, the mobile device may perform trilateration operations (e.g., trilateration API location operations, etc.), determine the geographical coordinates of the mobile device, and generate a third data set (e.g., x, y and z coordinates, third estimate value, etc.) based on the determined geographical coordinates. In block 3062, the mobile device may pass the first, second, and third data sets (or estimate values, etc.) through a second kalman filter (Kalman Filter 2) to generate a position set (e.g., final position set, final location estimate value, updated final location estimate value, etc.). In block 3064, the mobile device may use the position set to determine/compute the current location of the device. As part of these operations, the mobile device may generate a waypoint information structure (or estimate value) that includes trilateration location values (X, Y, Z), a time value, trilateration location delta values (ΔX, ΔY, ΔZ), confidence values ($C_X, C_Y, C_Z$), and one or more precision values, and use the generated way point to set the current location of the device. In an embodiment, the mobile device may be configured to store the waypoint in a list (or other information structure) in conjunction with a timestamp.

FIG. 30C illustrates three types of position calculations that are fused creating one position that is reported for the device.

The eLBS Trilaterion process at a high level is illustrated in FIG. 30C. Not only is a kalman filter approach used for the trilateration process involving external devices which the anchor mobile device (AD) determines its position from, but the external trilateration position is fed into another kalman filter process which also uses as inputs the internal position tracking via dead reckoning, and the available external stationary devices and systems, and external mobile device and systems, collectively abbreviated to as external devices (ED), which are reporting what the current devices location is.

Several decisions are made regarding the measurements received as well as the need to obtain previous waypoints based on the amount of devices reporting to the anchor mobile device. A waypoint is location information that has been determined to be valid location information and has a confidence value associated with it. Waypoints generally have an overall rank and a device specific rank also associated with them. Waypoints can be based on location information based on dead reckoning location information, external trilateration location information, or location information received from external devices.

Figure 31:
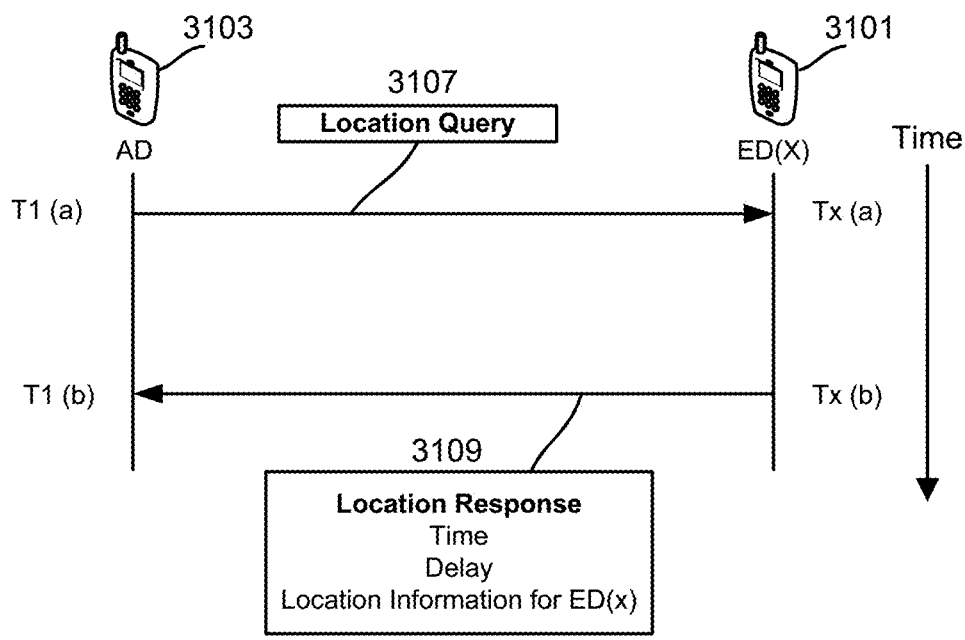
FIG. 31 is a diagram illustrating a method of time normalization in accordance with an embodiment.

FIG. 31 illustrates communication and information flows in a system configured to determine the range between two devices 3101, 3103 when there is no external time source (e.g., a common time value, etc.) with which all the devices may synchronize. The two devices illustrated in FIG. 31 are an anchor mobile device (AD) 3103 and an external device (ED) 3101. These devices may obtain a pseudo synchronization of measurements, taking account communication pathway time delays and the delay associated with processing a request.

Specifically in the illustrated example of FIG. 31, AD 3103 sends a location query request 3107 for position updates to ED(x) 3101. ED(x) 3101 and AD 3103 do not share a common clock. The location query request 3107 may include any or all of information discussed above with reference to FIG. 25, such as the time when the query was sent, etc. ED(x) 3101 may send a location query response 3109 that includes information identifying the time difference between when ED(x) 3101 received the location query request 3107 and when ED(x) 3101 transmitted the location query response 3109.

The location query response 3109 may include the time at which the location query request 3107 was received, the time when the location query response 3109 was sent, or both. The location query response 3109 may also include a delay value that identifies when ED(x) received the location query request 3107 to when ED(x) sent the location query response 3109. It may also include location information and/or any other information requested via the location query request 3107. Similarly, AD 3103 may record the time that it sent the location query request 3107, record the time it received the location query response 3109 from ED(x) 3101, and use this information to determine a total time delay. Knowing the delay in processing the request and communication pathways allows for synchronizing the timing for the location information provided and the clock of the AD 3103.

Figure 32:
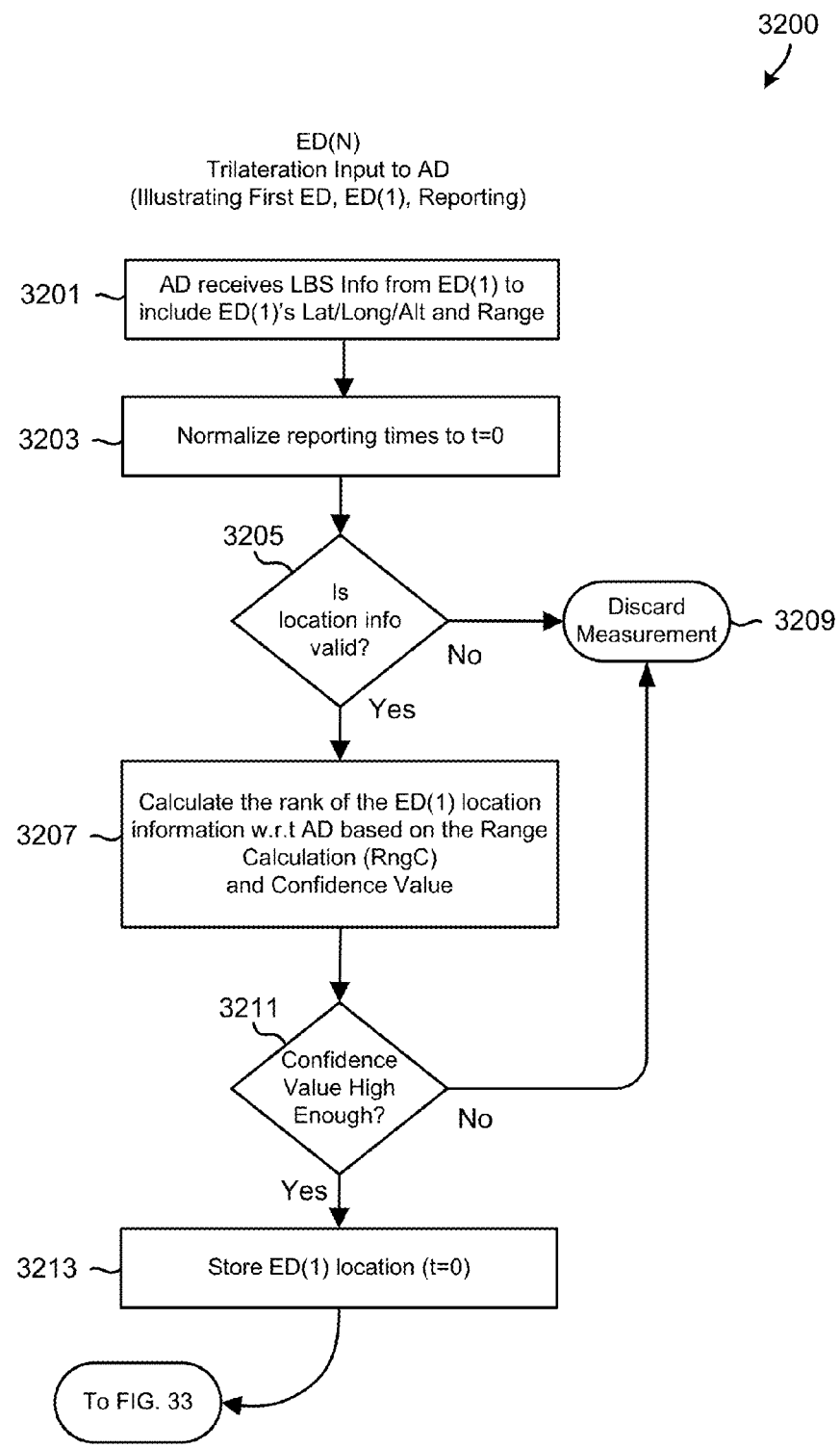
FIG. 32 is a block diagram that illustrates various components, operations, and information flows in a system configured to perform location based operations in accordance with an embodiment.
Figure 33:
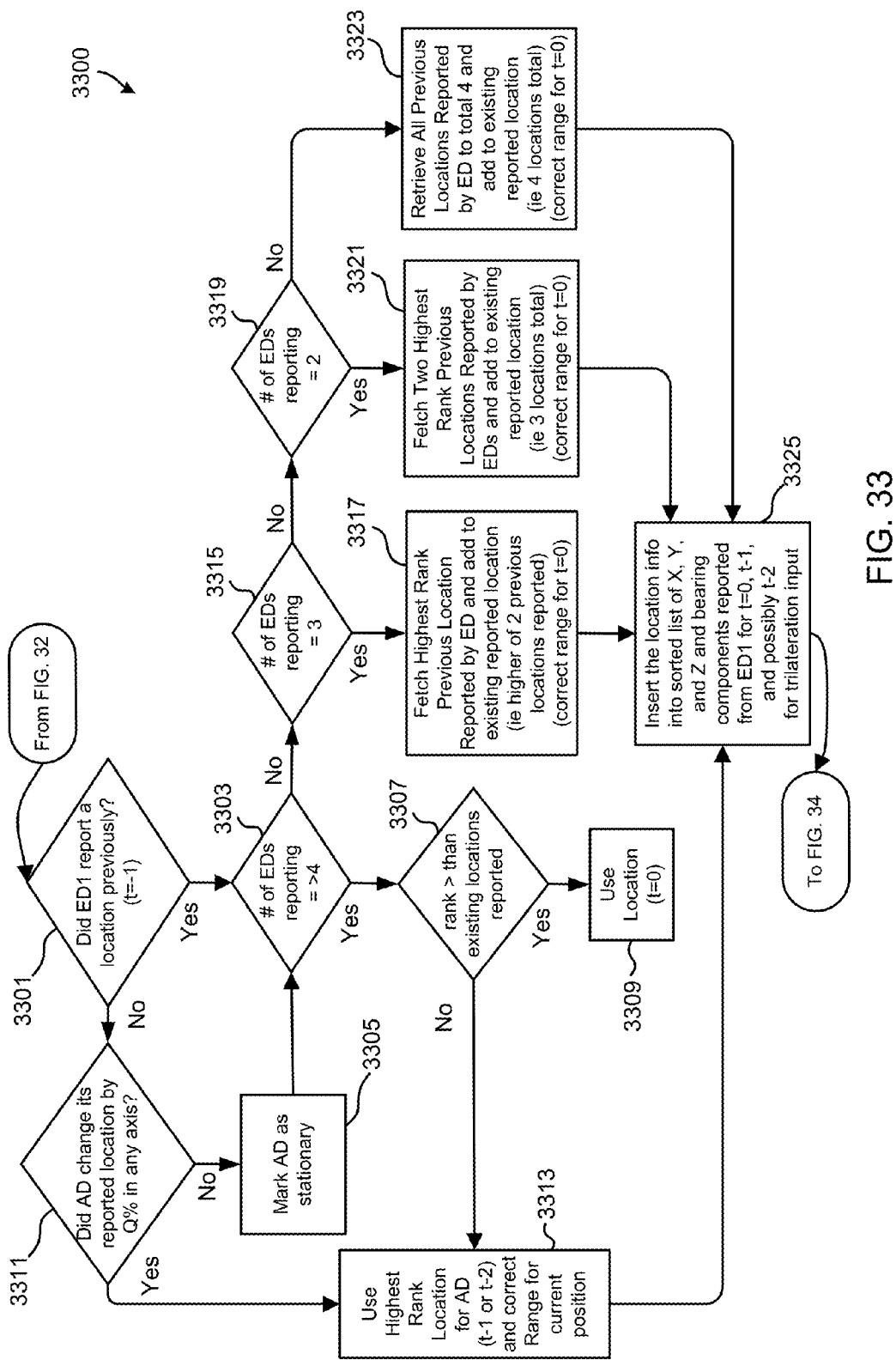
FIG. 33 is a block diagram that illustrates various components, operations, and information flows in a system configured to perform location based operations in accordance with an embodiment.

FIGS. 32 and 33 illustrate methods for receiving and using in an anchor mobile device (AD) an external device's (ED's) position information to prove an enhanced location based service. The AD may be configured to determine the ED's relative position (e.g., relative to itself) and compare the determined relative position to a range value provided by the ED. The range value may be value that is calculated in the ED, and which identifies a distance between the ED and the AD. For ease of legibility, the method illustrated in FIG. 32 represents an example for receiving data from a single mobile device. It should be understood that, in other embodiments, the same or similar operations may be performed based on information received from multiple mobile devices.

At block 3201, an AD may receive location information (e.g., LBS information, etc.) from ED(1). The location information may include a latitude value, a longitude value, an altitude value, range information, and a time value. In an embodiment, the location information may be a waypoint. In block 3203, the AD may normalize the location information timing to a time (e.g., t=0). Said another way, the AD may normalize its measured location and/or received location information to a common time (e.g., based on the processors cycle) so that the ad-hoc positions reported by all the EDs and other sensors are normalized (or synchronized) to a unified time. In some embodiments, in block 3203, the AD may perform a pseudo synchronization method, which is discussed in detail further below. In some embodiments, after normalizing/synchronizing the location information timing, the AD may determine and assign a confidence value to each unit of location information (e.g., each waypoint, etc.) provided by each ED.

In determination block 3205, the AD may determine whether the received location information is valid. Validity may be determined on a variance between expected and actual relative positions. For example, the AD may be configured to compute or determine an expected position (or expected relative position) based on previous trilateration results, previous dead reckoning results, or data received from other external sensors or devices. In some embodiments, the location may calculated based on the location information provided to the AD by the ED.

In response to determining that location information is not valid, (i.e., determination block 3205="No"), the AD may discard the measurement in block 3209. If a location value is determined to not be valid and/or has a confidence that is too low (i.e., does not exceed a threshold value), it can be temporarily stored and marked to be discarded. If the AD receives location information from several EDs having low confidence values associated with the location information which were initially determined not to be valid, but the EDs reported location information have high precision, the AD may take those low confidence measurements as being valid. In this case the measurements have the marker for discarding removed and are stored for use in block 3207. In response to determining that a location information is valid, (i.e., determination block 3205="Yes") the AD may use the information in block 3207.

In particular, in block 3207, the AD may calculate a rank for location information provided by ED(1) with respect to AD based on the range calculation and confidence value of the location information provided by ED(1). In determination block 3211, the AD may determine whether the location information provided by ED(1) has a sufficiently high confidence value. In response to determining that the location information provided by ED(1) does not have a sufficiently high confidence value (i.e., determination block 3211="No"), the AD may mark the location information provided by ED(1) to be discarded in block 3209. This is similar to the AD making a determination that the information is not valid, but the location information has a confidence value, and range value/calculation associated with it. In response to determining that a location information has a sufficiently high confidence value, the AD, in block 3213, may stores the location information as a waypoint (e.g., as a current location waypoint) for ED(1) in its location database.

FIG. 33 illustrates process 3300, which is an expanded and continuation of process 3200 for FIG. 32. In determination block 3301, the AD may determine whether the ED previously reported a location (or sent a valid waypoint, etc.). In response to determining the ED did not previously report a location, (i.e., determination block 3301="No"), in determination block 3311, the AD may determine whether the AD moved (or changed its reported location) by more than a distance or a percentage value in any axis or direction.

In response to determining that the AD did change its position by a set percentage in any axis (i.e., determination block 3311="Yes"), in block 3313, the AD may select and use the highest ranked waypoint, which may be a previously computed and stored waypoint for AD (e.g., for t=t−1 or t=t−2 etc.) with its range corrected to the t=0 for the current position of AD. In block 3325, the AD may insert the waypoint into a sorted list of coordinates X, Y, and Z and bearing components reported from ED1 for t=0, t=t−1, or possibly t=t−2 accordingly.

In response to determining that the AD did not move (or change its reported location) by more than the distance or percentage value in any axis or direction (i.e., determination block 3311="No"), the AD may determine it is stationary (and mark itself as such) in block 3305.

In response to determining that the ED did report a location (i.e., determination block 3301="Yes") or in response to determining that the AD is stationary in block 3305, the AD may determine whether four or more EDs are currently reporting location information (or whether waypoints where received from four or more devices) in determination block 3303. In response to determining that four or more EDs are reporting location information (i.e., determination block 3303="Yes"), the AD may determine whether a rank value associated with reported location information (or reported waypoint) exceeds (e.g., is greater than, etc.) the ranks of the other stored or received location information (or received waypoints) in determination block 3307.

In response to determining that the rank of the reported waypoint exceeds the ranks of the other stored or received waypoints (i.e., determination block 3307="Yes"), in block 3309 the AD may store the location information (or received waypoint) in memory and/or mark the information as being suitable for use as the current location waypoint or location information for t=0. On the other hand, in response to determining that the rank of the reported waypoint does not exceed the ranks of the other stored or received waypoints (i.e., determination block 3307="No"), the AD may select and use the highest ranking waypoint/location information in block 3313.

In response to determining that four or more EDs are not reporting location information (i.e., determination block 3303="No"), in block 3315 the AD may determine whether three EDs are currently reporting location information. In response to determining that three EDs are reporting location information (i.e., determination block 3315="Yes"), in block 3317 the AD may retrieve the highest ranking location information or the highest ranked stored waypoint from memory. The highest ranked stored waypoint may be a previously reported waypoint (received from any of the reporting EDs) that has the highest rank. The retrieved waypoint may added to the existing three reported waypoints (i.e., the waypoints received from each of the three reporting EDs) to obtain a total of four waypoints. The waypoints may time normalized to t=0 and range corrected for t=0, and in block 3325, the AD may insert the waypoints into a sorted list of coordinates X, Y, and Z and bearing components reported from ED1 for t=0, t=t−1, or possibly t=t−2 accordingly.

In response to determining that three EDs are not reporting location information (i.e., determination block 3315="No"), in determination block 3319 the AD may determine whether two EDs are currently reporting location information. In response to determining that two EDs are reporting location information (i.e., determination block 3319="Yes"), in block 3321 the AD may retrieve two previously reported highest ranked waypoints (received from any of the reporting EDs). The AD may add the retrieved waypoints to the existing two reported waypoints to obtain a total of four way points. The previously reported waypoints may be time normalized to t=0 and range corrected for t=0. In block 3325, the AD may insert the waypoints into a sorted list of coordinates X, Y, and Z and bearing components reported from ED1 for t=0, t=t−1, or possibly t=t−2 accordingly.

In response to determining that two EDs are not reporting location information (i.e., determination block 3319="No"), in block 3323 the AD may retrieve three of the highest ranked previously reported waypoints stored in memory to obtain a total of four waypoints. The previously reported waypoints may be time normalized to t=0 and range corrected for t=0. In block 3325, the AD may insert the waypoints into a sorted list of coordinates X, Y, and Z and bearing components reported from ED1 for t=0, t=t−1, or possibly t=t−2 accordingly.

Figure 34:
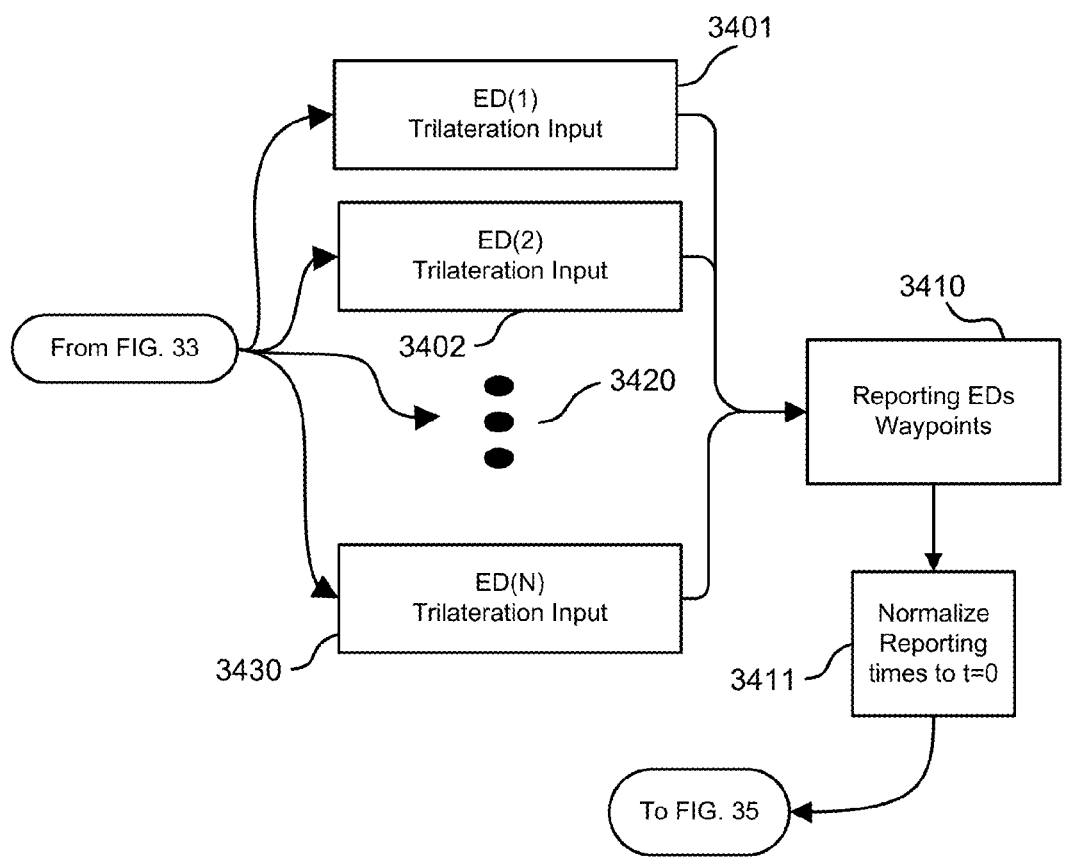
FIG. 34 is a block diagram that illustrates various components, operations, and information flows in a system for receiving trilateration input from up to N units in accordance with an embodiment.
Figure 35:
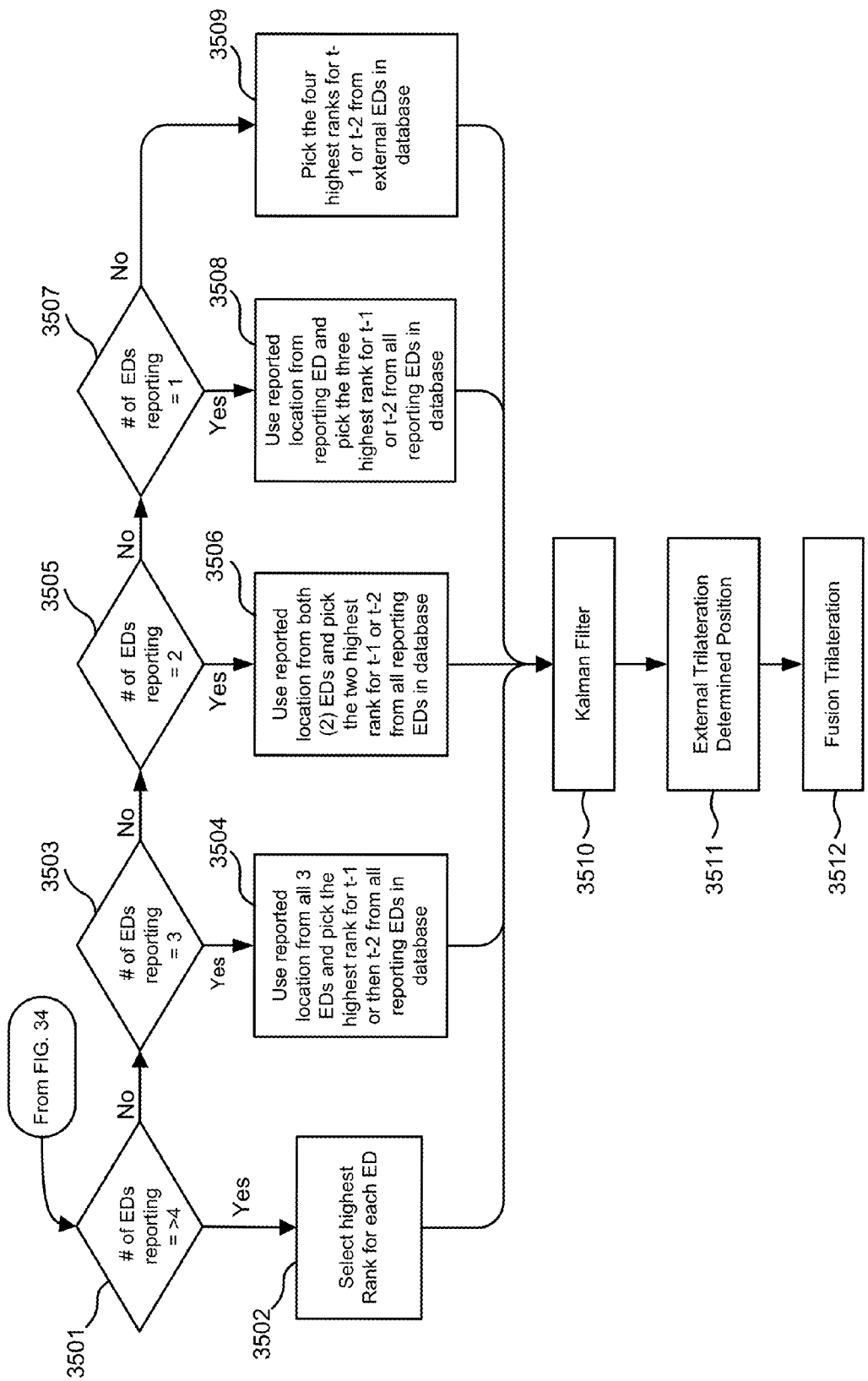
FIG. 35 is a block diagram that illustrates various components, operations, and information flows in a system configured to use a kalman filter in accordance with an embodiment.

Block 3325 uses the waypoints in the sorted list as input for trilateration and continues to FIGS. 34 and 35, which illustrate processes for determining the position location accuracy using the trilateration methods for multiple devices reporting locations. The output of the AD's trilateration for each EDs, the reported positions, may be ranked with respect to each other based on accuracy and confidence. Using these values, possibly discarding or ignoring those values which are considered inferior or invalid, provides for achieving highest position location accuracy to be achieved. The output of the eLBS trilateration operations may be a position/location (or waypoint) that is used by a device to report its current position (or for other functions, such as to provide an enhanced location based service).

In particular, FIG. 34 illustrates the output of FIG. 33 may be used (for each reporting ED) as trilateration input. Block 3401 illustrates the trilateration input for a first ED, ED(1), which is process 3300 for ED(1). Block 3402 illustrates the trilateration input for a second ED, ED(2) which is process 3300 for ED(2). 3420 illustrates one or more EDs providing trilateration input. Block 3430 illustrates the trilateration input for an Nth ED, ED(N) which is process 3300 for ED(N). All of the trilateration input may combined in block 3410 as reporting EDs waypoints. All of the separate ED's waypoints may be normalized to a time, t=0.

In determination block 3501, the AD may determine whether four or more EDs are reporting location information. In response to determining four or more EDs are reporting location information (i.e., determination block 3501="Yes"), in block 3502, the AD may select the highest ranked waypoint reported for each ED. The AD may provide the selected waypoints as inputs to a kalman filter in block 3510.

In response to determining fewer than four EDs are reporting location information (i.e., determination block 3501="No"), in determination block 3503, the AD may determine whether three EDs are reporting location information. In response to determining three EDs are reporting location information (i.e., determination block 3503="Yes"), in block 3504, the AD may use the reported waypoints from all three EDs and selects the highest ranked previously reported waypoint for t=t−1 and/or t=t−2 for any ED in the database (and in so doing obtains a total of four waypoints). The AD may then provide the four waypoints to a kalman filter in block 3510.

In response to determining that fewer than three EDs are reporting location information (i.e., determination block 3503="No"), in determination block 3505 the AD may determine whether two EDs are reporting location information. In response to determining two EDs are reporting location information (i.e., determination block 3505="Yes"), in block 3506 the AD may use the reported waypoints for both EDs and select the two highest ranked previously reported waypoints for t=t−1 and/or t=t−2 (for any reporting ED in the database) to obtain a total of four waypoints. The AD may provide these four waypoints to the kalman filter in block 3510.

In response to determining that fewer than two EDs are reporting location information (i.e., determination block 3505="No"), in determination block 3507 the AD may determine whether one ED is reporting location information. In response to determining that one ED is reporting location information (i.e., determination block 3507="Yes"), in block 3508 the AD may use the reported waypoint and the three highest ranked previously reported waypoints for t=t−1 and/or t=t−2 for the any EDs in the database to obtain a total of four waypoints. The AD may provide these four waypoints to the kalman filter in block 3510.

In response to determining no EDs are reporting location information, (i.e., determination block 3505="No"), in block 3509 the AD may retrieve the four highest ranked waypoints, and provides these four waypoints to a kalman filter in block 3510.

The kalman filter in block 3510 may be used to generate an external trilateration determined position 3511 for time period 0 (t=0). This value may be fed as input to the fusion trilaterion process 3512 to generate filtered LBS data (e.g., a filtered LBS estimate value, etc.). The kalman filter 3510 may be a procedure, algorithm, method, technique, or sequence of operations for accomplishing the function of a kalman filter.

All the reporting EDs may be compared to each other, ranked prior to being sent to a kalman filter with the appropriate matrix and weighting factors.

The trilateration operations discussed above with reference to FIGS. 32-35 may be performed/conducted for various sources. The fusion trilateration operations discussed above enable the device to generate more robust position/location information having high confidence values (e.g., for accuracy, precision, etc.).

Figure 36:
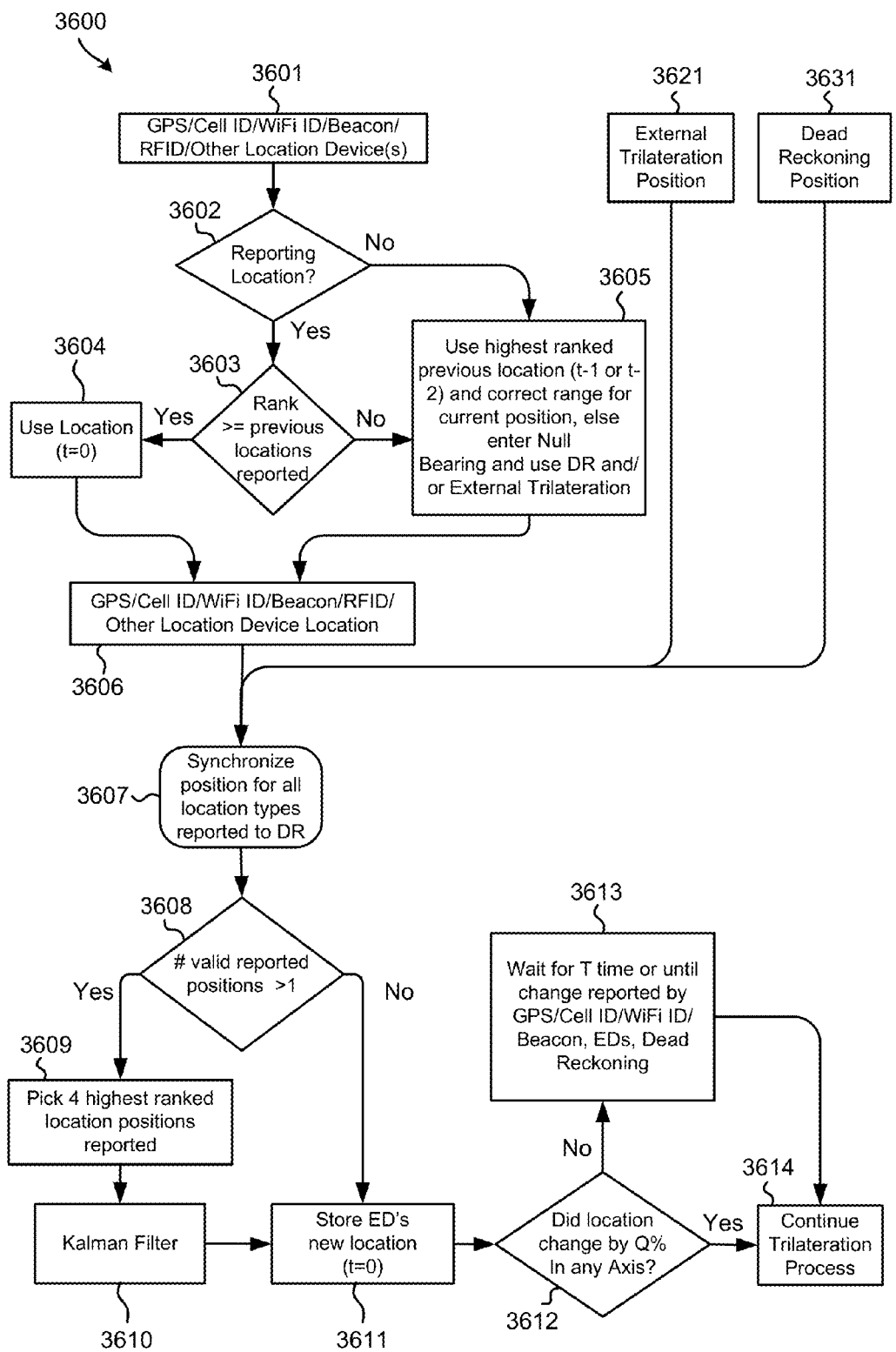
FIG. 36 is a block diagram that illustrates various components, operations, and information flows in a system configured for multiple different types of inputs in accordance with an embodiment.

FIG. 36 illustrates a method 3600 of performing fusion trilateration operations using information from external and internal sources. In block 3601, an anchor mobile device (AD) may receive information from external sources, including include GPS data, Cell ID, WiFiID, Beacon/RFID and other data from external position sources. In block 3602, the AD may determine whether a waypoint or location information has been reported by a specific device having a source type. In response to determining that at least one waypoint or location information has been reported (i.e., determination block 3603="Yes"), in block 3604 the AD may select the received information (for t=0). In response to determining that a waypoint or location information has not been reported (i.e., determination block 3603="No"), in block 3605 the AD may retrieve and use previous reported locations from memory (similar to the operations discussed above with reference to block 3313). If more than the required number of waypoints have been reported (and stored in memory), the AD may select and use the waypoints/location information with the highest ranks in block 3606 as the location information. Alternatively, the if no valid previous locations have been reported, the AD could elect to not use data from that device, but rather use dead reckoning position information and/or external trilateration positioning information to select location information in block 3606.

If the ED is reporting valid location information to AD, it is ranked according to previously received location information for that device. If no previous location information has been received, the most current valid location information being received is used. If the current reported location information is ranked highest, it is used as the location information and stored in the location information database. If previous location information has been received and the ranking of the current received location information is lower than the previous information, the highest ranked previously reported location information is used Having received the location reporting devices from external devices, if any external trilateration position information is received, all location information is synchronized for time values in block 3607, by any means discussed above or below, with the dead reckoning data from the AD. If in block 3608, only one valid position is available, that location information is stored by the AD as the location for the AD. If more than one valid position is reported, these are ranked from best to worse as described previously regarding confidence values, and the four highest positions are used for input into a kalman filter. The output from the kalman filter is stored as the AD's location. If more than one, but less than four locations are reported (e.g., similar to discussed above with reference to FIG. 35, blocks 3503 and 3504, 3505 and 3506, 3507 and 3508 as appropriate), for determining the remaining positions to obtain a total of four positions in block 3609 and inputting these into the kalman filter in block 3610 and storing the best location (output of the kalman filter) in block 3611.

In determination block 3612, the AD may determine whether the new location of AD changed (relative to its previously computed location) more than a given distance or percentage value in any axis, or greater than a location information value. In response to determining that the new location of AD changed (relative to its previously computed location) more than a given distance or percentage value in any axis (i.e., determination block 3612="Yes"), the trilateration process may be continued or repeated in block 2614 to obtain a more precise location information. If there is no change or the change is less than a certain percentage (i.e., determination block 3612="No"), the AD may wait for a set amount of time (T) to obtain any changes in location in block 3613. The procedure can also mark the AD as stationary and wait until a change is reported by any reporting device, external trilateration information, or internal sensors or components that can be used for dead reckoning.

As part of the process involving external device trilateration, the use of previous positions can be used to achieve the necessary set of points from which a three dimension position can be calculated.

Figure 37:
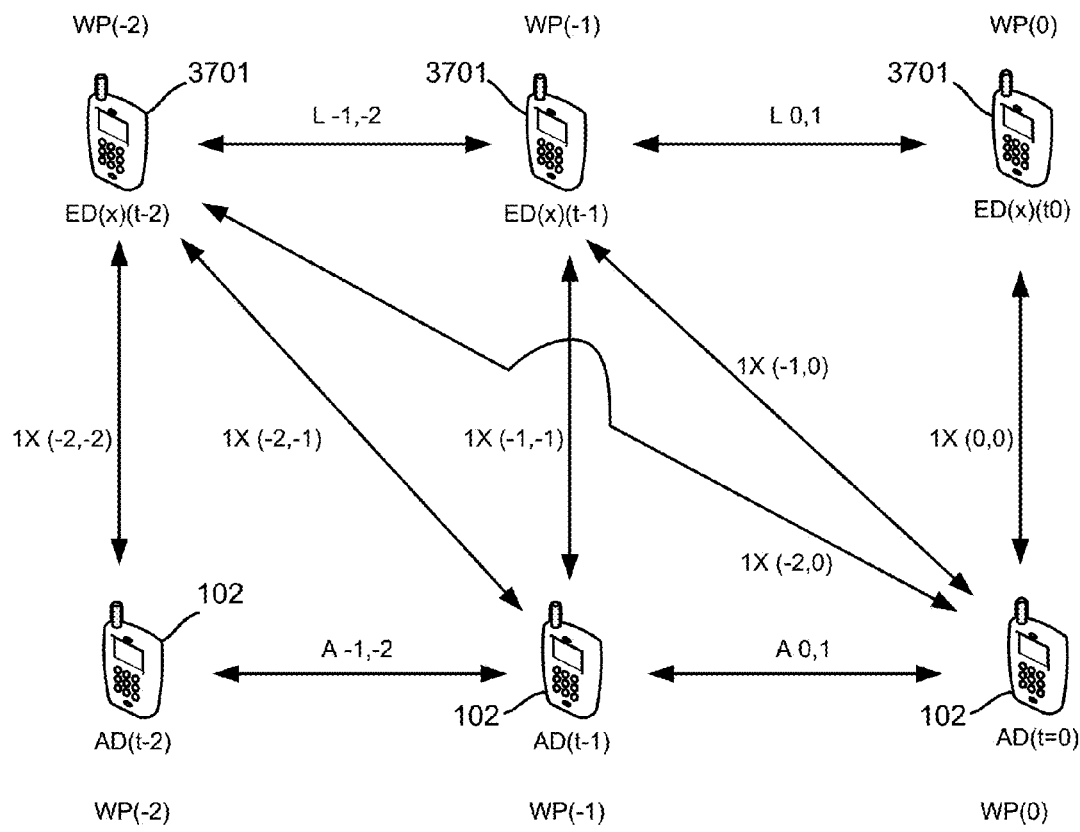
FIG. 37 illustrates sharing of location based information between mobile devices in accordance with various embodiments.

FIG. 37 illustrates a high level diagram showing only two devices for ease of reading however the concept can easily be extrapolated to having multiple devices. In FIG. 37, the position of ED(x) 3701 at t=0, ED(x)(t0) 3701 is reported to AD (mobile device 102). At t=0, AD's position is AD(t0). The range or distance between the two devices is also determined using both a sounding method as well as RSSI. The range can also be used to determine the confidence of the position reported which will be in addition to the confidence the ED(x) 3701 is reporting about its own location. The vector between the two units is 1X (0,0). Moving backward to t=t−1, the previous locations were ED(x)(t−1) 3701 and AD(t−1). The locations moved by ED(x) 3701 is L 0,1 and for AD (mobile device 102) it is A 0,1. Continuing backwards still to t=t−2, the positions are ED(x)(t−2) 3701 and AD(t−2) 102. The movement from t=t−2 to t=t−1 is L −1,−2 for ED(x) 3701 and A −1,−2 for AD (mobile device 102). Ranging vectors can be calculated between each location and the times. A vector between AD(t=0) 102 to ED(x)(t−1) 3701 is represented by 1X (−1,0), between AD(t=0) and ED(x)(t−2) 3701 is 1x (−1,1). The vectors can also be calculated from AD(t−1) 102 to ED(x)(t−1) 3701 and is represented by 1X (−1,−1) and similarly from AD(t−1) 102 to ED(x)(t−2) 3701, this being represented by 1X (−2,−1). For AD(t−2) 102 and ED(x)(t−2) 3701, the vector is 1X (−2,−2). Each location information having a confidence value calculated and associated with it is now a waypoint. WP(0) at t=0, WP(−1) at t=t−1 and WP(−2) at t=t−2. It is appreciated that other vectors, not shown, can be calculated such as from AD(t−1) 102 to ED(x)(t0) 3701 and other such combinations.

Figure 38:
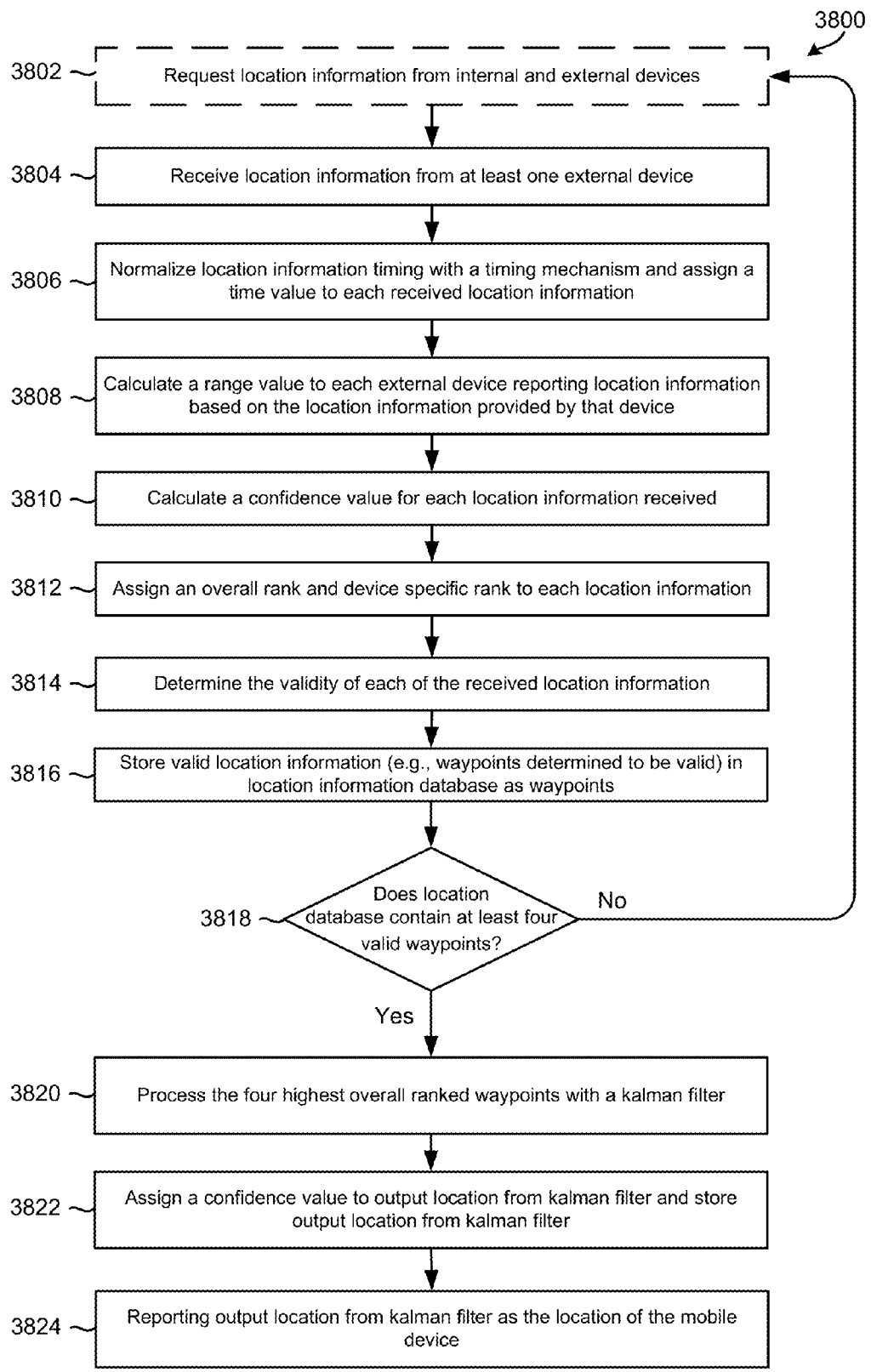
FIG. 38 illustrates a block diagram that illustrates various components, operations, and information flows in a system in accordance to embodiments.

FIG. 38 illustrates a method 3800 for determining a location of a mobile device via enhanced location based trilateration. Method 3800 may include receiving, via a processor of the mobile device, location information from one or more external devices. The received location information may include a waypoint from each of the one or more external devices.

In optional block 3802, a processor in a mobile device may request location information from internal and external devices, which may be accomplished by generating and sending a location request message to the internal/external devices. In some embodiments, the location request message may request location information that includes coordinate values (e.g., lat and long, etc.), an altitude value, and/or a range value. The range value may include information that identifies the distance between the mobile device and an external device (e.g., an external device that sends the location information in response to receiving the location request message, etc.). In listen only mode, or with regard to beaconing devices, the mobile device may skip the operations in block 3802 as these may not be necessary to receive the location information.

In block 3804, the processor may receive location information from one or more external devices. The received location information may include a waypoint or another unit of information (location information unit) from each of a plurality of devices (e.g., the internal and/or external devices). Each waypoint may include a coordinate value (e.g., a latitude value, an longitude, etc.), an altitude value and a range value. The range value may identify a distance from a external device to the mobile device. In some embodiments, if as part of the operations in block 3804, no location information is received during a first period of time (e.g., within a predetermined time period, etc.) or before a timer expires, the mobile device may initiate or reinitiate the trilateration operations by requesting location information from the same or different external devices in optional block 3802 and/or by resetting the timer and waiting for another set period of time for a response or location information.

In block 3806, the processor may determine the validity of each of the received waypoints and/or perform normalization operations to normalize the received valid waypoints (or normalize the received location information timing). Also in block 3806, the processor may obtain or assign a time value to each unit of received information (i.e., to the location information received from each external device, to each waypoint, etc.), which may accomplished via, or as part of, the processor performing any or all of the normalization or synchronization operations discussed in this application.

In block 3808, the processor may determine, compute, or update a range value for each external device that is reporting location information (e.g., for each external device from which location information was received, for each waypoint, etc.). For example, in block 3808, the processor may determine or compute a first range value for a first external device based on the waypoint from the first external device, determine or compute a second range value for a second external device based on a second waypoint provided by the second external device, etc. In an embodiment, the processor may also associate the range value with the waypoint that is used to determine that range value, and store the range value in relation to waypoint in memory and/or as a data field value in the waypoint.

In block 3810, the processor may determine, compute, or calculate a confidence value for each location information unit (or waypoint) that is received. In some embodiments, the processor may also associate the confidence value with the location information unit (or waypoint) for which the confidence value was calculated, and determining the validity of each of the one or more location information in block 3812. In block 3812, the processor may assign an overall rank and/or a device specific rank to each of the normalized waypoints (e.g., each location information unit or waypoint received from an external device, etc.). In block 3814, the processor may determine the validity of each of the received waypoints. In block 3816, the processor may store valid location information in location information database (e.g., as one or more waypoints, a current location waypoint, etc.).

As mentioned above, for valid location information (e.g., waypoints determined to be valid), the processor may assign an overall ranking and a device specific ranking. The overall ranking may be a ranking of the valid location information (e.g., valid waypoint, etc.) for the location information being reported by the external device (e.g., the location information included in the waypoint, etc.) based on a combination of dead reckoning location information (e.g., DR data, etc.), all valid and invalid location information (e.g., all location information received for that general location or device, etc.), to include external trilateration location information, being reported by external devices and stored information/waypoints in the location database for the external devices reporting valid and invalid location information The device specific ranking may be a ranking of location information received by a mobile device for one type of location information from the external device reporting the type of location information and the ranking being based on a calculated range and an associated confidence value with the location information, to the valid location information, and storing the location information and associated data in the location database as a waypoint.

In block 3818, the processor may determine whether the location database contains at least four valid waypoints (or four valid location information units identifying four locations, etc.). In an embodiment, if fewer than four waypoints are stored in the location database, the mobile device may repeat the location determination operations discussed above until it determines that the location database stores at least four valid waypoints. In response to determining that there are fewer than four valid way points (i.e., determination block 3818 "No"), in block 3802, the processor may initiate another request for location information from internal and external devices.

If there are four waypoints in the location database (i.e., determination block 3818 "Yes"), in block 3820 the processor may select four of the highest ranked waypoints from memory based on a combination of the overall ranking, device-specific ranking, confidence value, precision value, range value, etc. associated with each waypoint (e.g., the four highest overall ranked waypoints) and apply the selected waypoints to a kalman filter to generate output in the form of updated location information (or more precise location information). In an embodiment, the processor may store the output of the kalman filter as the currently location of the mobile device. In block 3822, the processor may assign a confidence value (and/or ranking or precision values) to the output of kalman filter. In block 3824, the processor may report output location from kalman filter as the location of the mobile device.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, components, circuits, and algorithm blocks described in connection with the embodiments disclosed herein may be implemented as electronic hardware, computer software, or combinations of both. To clearly illustrate this interchangeability of hardware and software, various illustrative components, blocks, components, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software component which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of determining a location of a mobile device via enhanced location based trilateration, the method comprising:
   receiving, via a processor of the mobile device, location information from one or more external devices, the received location information including a waypoint from each of the one or more external devices;
   performing normalization operations to normalize the received waypoints;
   ranking the normalized waypoints;
   storing the normalized waypoints in memory;

selecting four waypoints from memory based on the rankings; and applying the four selected waypoints to a kalman filter to generate a final location waypoint.

2. The method of claim 1, further comprising:

determining the validity of each of the received waypoints by:
- determining a range value or a confidence value for each waypoint included in the received location information; and
- determining the validity of each of the received waypoints based on the range value or the confidence value.

3. The method of claim 2, wherein receiving location information from one or more external devices comprises:
- establishing communication links to each of a plurality of external devices in a communication group; and
- receiving location information from only the external devices in the communication group.

4. The method of claim 1, wherein selecting four waypoints from memory based on the rankings comprises:
- selecting one of the waypoints included in the received location information and three previously generated waypoints from the memory.

5. The method of claim 1, wherein selecting four waypoints from memory based on the rankings comprises:
- selecting two of the waypoints included in the received location information and two previously generated waypoints from the memory.

6. The method of claim 1, wherein selecting four waypoints from memory based on the rankings comprises:
- selecting three of the waypoints included in the received location information and one previously generated waypoints from the memory.

7. A mobile device, comprising:

a processor configured with processor-executable instructions to perform operations comprising:
- receiving location information from one or more external devices, the received location information including a waypoint from each of the one or more external devices;
- performing normalization operations to normalize the received waypoints;
- ranking the normalized waypoints;
- storing the normalized waypoints in memory;
- selecting four waypoints from memory based on the rankings; and
- applying the four selected waypoints to a kalman filter to generate a final location waypoint.

8. The mobile device of claim 7, further comprising:

determining the validity of each of the received waypoints by:
- determining a range value or a confidence value for each waypoint included in the received location information; and
- determining the validity of each of the received waypoints based on the range value or the confidence value.

9. The mobile device of claim 8, wherein receiving location information from one or more external devices comprises:
- establishing communication links to each of a plurality of external devices in a communication group; and
- receiving location information from only the external devices in the communication group.

10. The mobile device of claim 7, wherein selecting four waypoints from memory based on the rankings comprises:
- selecting one of the waypoints included in the received location information and three previously generated waypoints from the memory.

11. The mobile device of claim 7, wherein selecting four waypoints from memory based on the rankings comprises:
- selecting two of the waypoints included in the received location information and two previously generated waypoints from the memory.

12. The mobile device of claim 7, wherein selecting four waypoints from memory based on the rankings comprises:
- selecting three of the waypoints included in the received location information and one previously generated waypoints from the memory.

13. A non-transitory computer readable storage medium having stored thereon processor-executable software instructions configured to cause a processor in a mobile device to perform operations comprising:
- receiving location information from one or more external devices, the received location information including a waypoint from each of the one or more external devices;
- performing normalization operations to normalize the received waypoints;
- ranking the normalized waypoints;
- storing the normalized waypoints in memory;
- selecting four waypoints from memory based on the rankings; and
- applying the four selected waypoints to a kalman filter to generate a final location waypoint.

14. The non-transitory computer readable storage medium of claim 13, further comprising:

determining the validity of each of the received waypoints by:
- determining a range value or a confidence value for each waypoint included in the received location information; and
- determining the validity of each of the received waypoints based on the range value or the confidence value.

15. The non-transitory computer readable storage medium of claim 14, wherein receiving location information from one or more external devices comprises:
- establishing communication links to each of a plurality of external devices in a communication group; and
- receiving location information from only the external devices in the communication group.

16. The non-transitory computer readable storage medium of claim 13, wherein selecting four waypoints from memory based on the rankings comprises:
- selecting one of the waypoints included in the received location information and three previously generated waypoints from the memory.

17. The non-transitory computer readable storage medium of claim 13, wherein selecting four waypoints from memory based on the rankings comprises:
- selecting two of the waypoints included in the received location information and two previously generated waypoints from the memory.

18. The non-transitory computer readable storage medium of claim 13, wherein selecting four waypoints from memory based on the rankings comprises:
- selecting three of the waypoints included in the received location information and one previously generated waypoints from the memory.

* * * * *